US012563345B2

(12) United States Patent
Nam et al.

(10) Patent No.: US 12,563,345 B2
(45) Date of Patent: Feb. 24, 2026

(54) APPARATUS, DISPLAY APPARATUS AND VEHICLE

(71) Applicant: LG Display Co., Ltd., Seoul (KR)

(72) Inventors: SeulKi Nam, Paju-si (KR); Taehyung Kim, Paju-si (KR); GyungBo Ha, Paju-si (KR); Saseong Moon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 801 days.

(21) Appl. No.: 17/967,033

(22) Filed: Oct. 17, 2022

(65) Prior Publication Data

US 2023/0217184 A1 Jul. 6, 2023

(30) Foreign Application Priority Data

Dec. 31, 2021 (KR) ........................ 10-2021-0194760

(51) Int. Cl.
| | |
|---|---|
| *H04R 17/00* | (2006.01) |
| *B60R 11/02* | (2006.01) |
| *G10K 9/122* | (2006.01) |
| *H04R 1/40* | (2006.01) |

(52) U.S. Cl.
CPC .......... *H04R 17/00* (2013.01); *B60R 11/0217* (2013.01); *G10K 9/122* (2013.01); *H04R 1/403* (2013.01); *H04R 2499/13* (2013.01); *H04R 2499/15* (2013.01)

(58) Field of Classification Search
CPC .... H04R 17/00; H04R 1/403; H04R 2499/13; H04R 2499/15; B60R 11/0217; G10K 9/122
USPC ......................................................... 310/324
See application file for complete search history.

(56) References Cited

U.S. PATENT DOCUMENTS

| | | |
|---|---|---|
| 2014/0079255 A1 | 3/2014 | Ando |
| 2015/0078604 A1 | 3/2015 | Seo et al. |
| 2020/0059733 A1 | 2/2020 | Shin et al. |
| 2021/0200503 A1 | 7/2021 | Lee et al. |

FOREIGN PATENT DOCUMENTS

| | | |
|---|---|---|
| CN | 103535053 A | 1/2014 |
| CN | 104461115 A | 3/2015 |
| CN | 105096778 A | 11/2015 |
| CN | 111711899 A | 9/2020 |
| CN | 113126340 A | 7/2021 |

(Continued)

OTHER PUBLICATIONS

Office Action issued on Dec. 5, 2023 in Japanese Patent Application No. 2022-172899.

(Continued)

*Primary Examiner* — Emily P Pham
*Assistant Examiner* — Monica Mata
(74) *Attorney, Agent, or Firm* — Morgan, Lewis & Bockius LLP

(57) ABSTRACT

An apparatus may include a vibration member, a supporting portion at a rear surface of the vibration member, the supporting portion including a curved portion, and a vibration apparatus at the curved portion to face the rear surface of the vibration member. A display apparatus may include a display member, a supporting portion including a curved portion, a vibration apparatus at the curved portion to face a rear surface of the display member, and a cover member. A vehicle may include an interior material and a vibration generating apparatus.

28 Claims, 25 Drawing Sheets

(56)         References Cited

FOREIGN PATENT DOCUMENTS

| | | | |
|---|---|---|---|
| CN | 113467634 | A | 10/2021 |
| EP | 2947857 | A2 | 11/2015 |
| EP | 4087272 | A1 | 11/2022 |
| JP | 2004-208130 | A | 7/2004 |
| JP | 2015-219528 | A | 12/2015 |
| JP | 2019-153980 | A | 9/2019 |
| JP | 2020-171013 | A | 10/2020 |
| JP | 2021-164165 | A | 10/2021 |

OTHER PUBLICATIONS

Office Action issued in corresponding Chinese Patent Application No. 202211295711.7, dated Jul. 24, 2025. (Note: JP 2004-208130 A was previously cited).
Extended European Search Report of Application No. 22201809.5, dated Apr. 24, 2023, 7 pages.

II-II'

23: 23A ~ 23L

23B: 23B1 ~ 23B3

23D: 23D1 ~ 23D4

24: 24A ~ 24D

23E: 23E1 ~ 23E3

25-1: 25A ~ 25G

24B: 24B1 ~ 24B4

25-2: 25H ~ 25L 25-3: 25M ~ 25P

◯ : WS

23L: 23L1, 23L2      24: 24A, 24B1, 24B2      ◎: WS 25-4: 25Q

APPARATUS, DISPLAY APPARATUS AND VEHICLE

CROSS-REFERENCE TO RELATED APPLICATIONS

This application claims the benefit of and priority to Korean Patent Application No. 10-2021-0194760 filed on Dec. 31, 2021, the entirety of which is hereby incorporated by reference for all purposes.

BACKGROUND

1. Technical Field

The present disclosure relates to apparatuses and particularly to, for example, without limitation, an apparatus for outputting a sound, a display apparatus, and a vehicle.

2. Discussion of the Related Art

Apparatuses, for example, display apparatuses are equipped in home appliances or electronic devices, such as televisions (TVs), monitors, notebook computers, smartphones, tablet computers, electronic organizers, electronic pads, wearable devices, watch phones, portable information devices, navigation devices, and automotive control display apparatuses, and are used as a screen for displaying an image.

Display apparatuses may include a display panel for displaying an image and a sound apparatus for outputting a sound associated with the image. In addition, in display apparatuses, because a sound output from a sound apparatus may travel in a rearward or a downward direction of the display panel, sound quality may be degraded due to interference between sound waves reflected from walls and the floor. For this reason, it may be difficult to transfer an accurate sound, and an immersion experience of a viewer may be reduced.

The description provided in the discussion of the related art section should not be assumed to be prior art merely because it is mentioned in or associated with that section. The discussion of the related art section may include information that describes one or more aspects of the subject technology, and the description in this section does not limit the invention.

SUMMARY

The inventors of the present disclosure have recognized the problems described above as well as the problems and disadvantages of the related art, have performed extensive research and experiments, and developed a new invention so that, when a user in front of a display panel is watching an image, a traveling direction of a sound is a forward direction of the display panel. Thus, sound quality may be enhanced. Through the extensive research and experiments, the inventors have thus invented a display apparatus having a new structure, which may generate a sound traveling in a forward region of the display panel, thereby enhancing sound quality. Accordingly, embodiments of the present disclosure are directed to an apparatus that substantially obviates one or more problems due to limitations and disadvantages of the related art.

One or more aspects of the present disclosure are directed to providing an apparatus and a vibration apparatus for improving sound quality and increasing an immersion experience of a viewer, and a vehicular apparatus including the same.

One or more aspects of the present disclosure are directed to providing an apparatus (or a display apparatus) and a vibration apparatus where a sound characteristic and/or a sound pressure level characteristic may be enhanced, and a vehicle including the same.

One or more aspects of the present disclosure are directed to providing an apparatus (or a display apparatus) and a vibration apparatus where a sound characteristic and/or a sound pressure level characteristic in a low-pitched sound band may be enhanced, and a vehicle including the same.

One or more aspects of the present disclosure are directed to providing an apparatus (or a display apparatus), a vibration apparatus, and a vehicle including the same, which may generate a sound in a forward direction of a vibration member by a vibration member as a sound vibration plate.

Additional features, advantages, and aspects of the present disclosure are set forth in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the appended drawings.

To achieve these and other advantages and aspects of the present disclosure, as embodied and broadly described herein, in one or more aspects, an apparatus may comprise a vibration member, a supporting member at a rear surface of the vibration member and including a curved portion, and a vibration apparatus at the curved portion to face the rear surface of the vibration member.

In one or more aspects of the present disclosure, an apparatus may comprise a base member, a supporting portion including a pair of supporting bars connected to the base member, and a vibration apparatus at the pair of supporting bars and including a curved shape.

In one or more aspects of the present disclosure, an apparatus may comprise a passive vibration member, and a vibration generating apparatus connected to the passive vibration member and configured to vibrate the passive vibration member. The vibration generating apparatus may comprise a vibration member, a supporting member at a rear surface of the vibration member and including a curved portion, and a vibration apparatus at the curved portion to face the rear surface of the vibration member.

In one or more aspects of the present disclosure, an apparatus may comprise a passive vibration member, and a vibration generating apparatus connected to the passive vibration member and configured to vibrate the passive vibration member. The vibration generating apparatus may comprise a base member, a supporting portion including a pair of supporting bars connected to the base member, and a vibration apparatus at the pair of supporting bars and including a curved shape.

An apparatus according to one or more example embodiments of the present disclosure may improve sound quality and may increase an immersion experience of a viewer.

An apparatus according to one or more example embodiments of the present disclosure may generate or output a sound in a forward direction of a display panel by the display panel as a vibration plate.

An apparatus according to one or more example embodiments of the present disclosure may enhance a sound characteristic and/or a sound pressure level characteristic of a sound.

An apparatus according to one or more example embodiments of the present disclosure may enhance a sound characteristic and/or a sound pressure level characteristic of a sound of a low-pitched sound band.

An apparatus according to one or more example embodiments of the present disclosure may output a stereo sound, a stereophonic sound, or a multi-channel sound having an enhanced sound pressure level characteristic.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing description and the following description of the present disclosure are exemplary and explanatory, and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure, and together with the description serve to explain principles of the disclosure.

Figure 1:
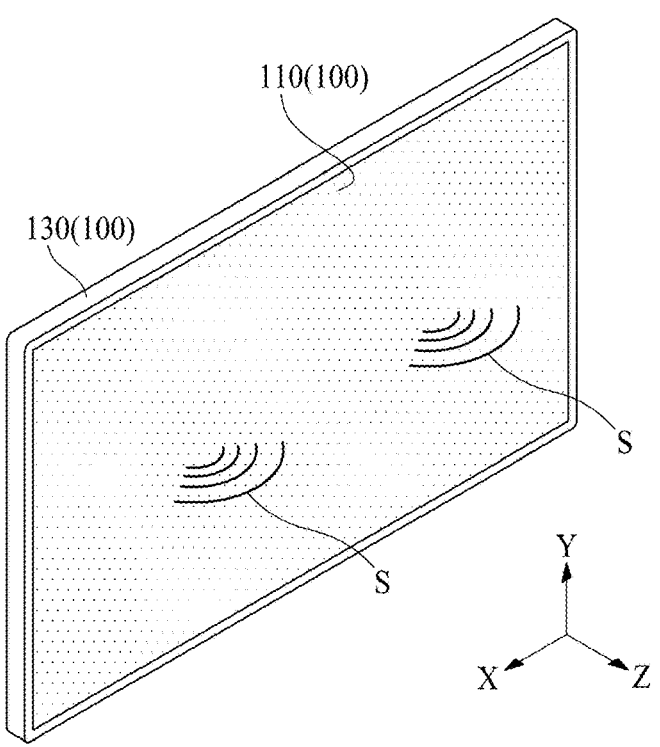
FIG. 1 illustrates an apparatus according to an example embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and convenience.

DETAILED DESCRIPTION

Reference is now made in detail to embodiments of the present disclosure, examples of which may be illustrated in the accompanying drawings. In the following description, when a detailed description of well-known functions or configurations may unnecessarily obscure aspects of the present disclosure, the detailed description thereof may be omitted for brevity. The progression of processing steps and/or operations described is an example; however, the sequence of steps and/or operations is not limited to that set forth herein and may be changed, with the exception of steps and/or operations necessarily occurring in a particular order.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are provided so that this disclosure is thorough and complete and fully conveys the scope of the present disclosure to those skilled in the art.

The shapes, sizes, areas, ratios, angles, numbers, and the like disclosed in the drawings for describing embodiments of the present disclosure are merely examples, and thus, the present disclosure is not limited to the illustrated details.

When the term "comprise," "have," "include," "contain," "constitute," "make up of," "formed of," or the like is used, one or more other elements may be added unless a term such as "only" or the like is used. The terms used in the present disclosure are merely used in order to describe particular embodiments, and are not intended to limit the scope of the present disclosure. The terms used herein are merely used in order to describe example embodiments, and are not intended to limit the scope of the present disclosure. The terms of a singular form may include plural forms unless the context clearly indicates otherwise. The word "exemplary" is used to mean serving as an example or illustration. Embodiments are example embodiments. Aspects are example aspects. Any implementation described herein as an "example" is not necessarily to be construed as preferred or advantageous over other implementations.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, noise, or the like). Further, the term "may" encompasses all the meanings of the term "can."

In describing a positional relationship, where the positional relationship between two parts is described, for example, using "on," "over," "under," "above," "below," "beneath," "near," "close to," or "adjacent to," "beside," "next to," or the like, one or more other parts may be located between the two parts unless a more limiting term, such as "immediate(ly)," "direct(ly)," or "close(ly)," is used. For example, when a structure is described as being positioned "on," "over," "under," "above," "below," "beneath," "near," "close to," or "adjacent to," "beside," or "next to" another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

In describing a temporal relationship, when the temporal order is described as, for example, "after," "subsequent," "next," "before," "preceding," "prior to," or the like, a case that is not consecutive or not sequential may be included unless a more limiting term, such as "just," "immediate(ly)," or "direct(ly)," is used.

It is understood that, although the term "first," "second," or the like may be used herein to describe various elements, these elements should not be limited by these terms. These terms are only used to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. The terms "first," "second," and the like may be used to distinguish components from each other, but the functions or structures of the components are not limited by ordinal numbers or component names in front of the components.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element or layer is "connected," "coupled," or "adhered" to another element or layer, the element or layer can not only be directly connected, coupled, or adhered to another element or layer, but also be indirectly connected, coupled, or adhered to another element or layer with one or more intervening elements or layers disposed or interposed between the elements or layers, unless otherwise specified.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers disposed or interposed between the elements or layers, unless otherwise specified.

The term "at least one" should be understood as including any and all combinations of one or more of the associated listed items. For example, the meaning of "at least one of a first item, a second item, and a third item" denotes the combination of items proposed from two or more of the first item, the second item, and the third item as well as only one of the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression "element A/element B" may be understood as element A and/or element B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise. In one or more aspects, unless stated otherwise, the term "nth" or "n$^{th}$" may refer to "nnd" or "n$^{nd}$" (e.g., 2nd where n is 2), or "nrd" or "n$^{rd}$" (e.g., 3rd where n is 3), and n may be a natural number.

Features of various embodiments of the present disclosure may be partially or wholly coupled to or combined with each other and may be variously inter-operated, linked or driven together. The embodiments of the present disclosure may be carried out independently from each other or may be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

Hereinafter, an apparatus, a vibration apparatus and a vehicle including the same according to various example embodiments of the present disclosure are described in detail with reference to the accompanying drawings. With respect to reference numerals to elements of each of the drawings, although the same elements may be illustrated in other drawings, like reference numerals may refer to like elements unless stated otherwise. In addition, for convenience of description, a scale, dimension, size, and thickness of each of the elements illustrated in the accompanying drawings may differ from an actual scale, dimension, size, and thickness, and thus, embodiments of the present disclosure are not limited to a scale, dimension, size, and thickness illustrated in the drawings.

Figure 2:
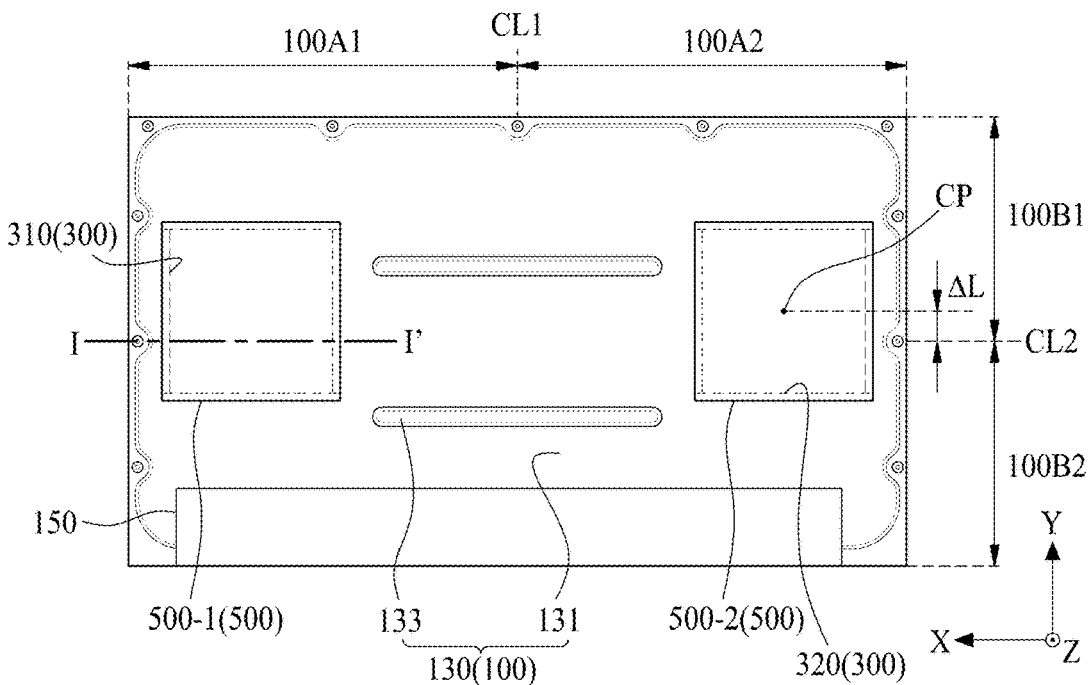
FIG. 2 is a rear view illustrating an apparatus according to an example embodiment of the present disclosure.

FIG. 1 illustrates an apparatus according to an example embodiment of the present disclosure. FIG. 2 is a rear view illustrating an apparatus according to an example embodiment of the present disclosure.

With reference to FIGS. 1 and 2, the apparatus according to an example embodiment of the present disclosure may be a display apparatus, but embodiments of the present disclosure are not limited thereto.

The display apparatus may include a display panel, which includes a plurality of pixels for displaying (or for implementing) a black/white or color image, and a driver for driving the display panel. Each of the pixels may be a subpixel which implements one of a plurality of colors for displaying a color image. The apparatus according to an example embodiment of the present disclosure may include a set electronic apparatus or a set device (or a set apparatus) such as a notebook computer, a television, a computer monitor, an equipment apparatus including an automotive apparatus or another type apparatus for vehicles, or a mobile electronic apparatus such as a smartphone or an electronic pad, which is a complete product (or a final product) including a liquid crystal display panel or an organic light emitting display panel, or the like.

The apparatus according to an example embodiment of the present disclosure may include a vibration member 100, a supporting portion 300, and a vibration apparatus 500.

The vibration member 100 may be used as a vibration plate which generates or outputs one or more of a sound and a vibration. Accordingly, the vibration member 100 may be a vibration plate, a passive vibration plate, or a passive vibration member, but embodiments of the present disclosure are not limited thereto.

The vibration member 100 according to an example embodiment of the present disclosure may include a display member 110 and a cover member 130.

The display member 110 according to an example embodiment of the present disclosure may include a display panel 111 which displays an image. For example, the image may include an electronic image, a digital image, a still image, or a video or a moving image, or the like. For example, the display panel 111 may include a liquid crystal display panel including a plurality of pixels which configure a black/white or color image, but the kind of the display panel 111 is not limited thereto. For example, the display panel 111 may be a display panel, such as an organic light emitting display panel, an electrophoretic display panel, a micro light emitting diode display panel, an electrowetting display panel, a quantum dot light emitting display panel, or the like. For example, in the liquid crystal display panel, a pixel may include a liquid crystal layer between a pixel electrode and a common electrode. For example, in the organic light emitting display panel, a pixel may include an organic light emitting device such as an organic light emitting layer or the like between a pixel electrode and a common electrode.

The cover member 130 may be configured to cover a rear surface of the display member 110. The cover member 130 may include a rear portion 131 which covers the rear surface of the display member 110. For example, the cover member 130 may include a plastic material and/or a metal material or a combination thereof. For example, the cover member 130 may be referred to as a rear cover, a back cover, a system rear cover, a housing, a system housing, a set cover, a rear set cover, an outermost set cover, a product cover, or an outermost product cover, or the like, but embodiments of the present disclosure are not limited thereto.

The rear portion 131 of the cover member 130 may include a first region 100A1 and a second region 100A2. For example, the rear portion 131 of the cover member 130 may be divided into the first region 100A1 and the second region 100A2, with respect to a center line (or a first center line) CL1 having a first length extending in a Y-direction. The first region 100A1 and the second region 100A2 have a first length in a horizontal direction (X-direction). For example, each of the first region 100A1 and the second region 100A2 may have the same size or area in the rear portion 131. For example, the center line CL1 having the first length may be a first center line or a vertical center line, and in the following description, may be referred to as a first center line CL1. For example, the first region 100A1 may be a first rear region, a left region, or a rear left region, and the second region 100A2 may be a second rear region, a right region, or a rear right region. For example, the first direction X may be an X-axis direction in a long-side lengthwise direction, a widthwise direction, a horizontal direction, or one of an XYZ-axis direction of the cover member 130.

Each of the first region 100A1 and the second region 100A2 in the rear portion 131 of the cover member 130 may include a first sub-region 100B1 and a second sub-region 100B2, with respect to a center line CL2 having a second length (or a horizontal length) parallel to a second direction Y intersecting with the first direction X. For example, the first sub-region 100B1 and the second sub-region 100B2 in each of the first region 100A1 and the second region 100A2 may have the same size or area in the rear portion 131. For example, the center line CL2 having the second length may be a second center line or a horizontal center line, and in the following description, may be referred to as a second center line CL2. For example, the second direction Y may be a Y-axis direction in a short-side lengthwise direction, a lengthwise direction, a vertical direction, or another one of an XYZ-axis direction of the cover member 130.

The cover member 130 may further include a reinforcement portion 133 disposed at the rear portion 131.

The one or more reinforcement portions 133 may be implemented to reinforce the stiffness of the cover member 130. Therefore, the reinforcement portion 133 may be a reinforcement member, a reinforcement pattern, a reinforcement pattern portion, a stiffness portion, a stiffness reinforcement member, a stiffness pattern, or a stiffness pattern portion, but embodiments of the present disclosure are not limited thereto.

The reinforcement portion 133 may be disposed along a rear periphery portion and a rear center portion of the cover member 130. The reinforcement portion 133 may be configured to protrude in a direction from a periphery portion of the rear portion 131 of the cover member 130 to the rear surface of the cover member 130 and has a predetermined height. The reinforcement portion 133 may reinforce the stiffness of the cover member 130 or the stiffness of the rear portion 131 of the cover member 130, thereby preventing or decreasing a bending phenomenon of the apparatus or the vibration member 100.

The one or more supporting portions 300 may be disposed at the rear surface of the vibration member 100 and may be configured to support the vibration apparatus 500. For example, the supporting portion 300 may be disposed at the rear surface of the display member 110. For example, the supporting portion 300 may be disposed at the rear surface of the display member 110. For example, the supporting portion 300 may be disposed at the rear surface of the cover member 130 and may be configured to support the vibration apparatus 500. The supporting portion 300 may support the vibration apparatus 500 so that a shape of the vibration apparatus 500 is non-planar (or non-flat). For example, the supporting portion 300 may support the vibration apparatus 500 so that the vibration apparatus 500 has a curved shape or a curved structure. For example, the supporting portion 300 may be configured to apply a pre-stress to the vibration apparatus 500. For example, the supporting portion 300 may be configured to apply only a tension stress to the vibration apparatus 500.

The supporting portion 300 according to an example embodiment of the present disclosure may include a first supporting portion 310 and a second supporting portion 320. Each of the first supporting portion 310 and the second supporting portion 320 may have a similar shape. They may include a shape or a structure for applying a pre-stress to the vibration apparatus 500. For example, each of the first supporting portion 310 and the second supporting portion 320 may include a curved surface or a curved portion which is configured to apply only a tension stress to the vibration apparatus 500. The supporting portion 300 or the first and second supporting portions 310 and 320 will be described below.

The vibration apparatus 500 may be disposed at the supporting member 300 at the rear surface of the vibration member 100 and may be configured to vibrate the vibration member 100. The vibration apparatus 500 according to an example embodiment of the present disclosure may include a film vibration apparatus, a film-type vibration apparatus, or a flexible vibration apparatus. Thus, the vibration apparatus 500 may be referred to as a sound generating apparatus, a sound generating device, a sound generating member, a sound generator, a vibration source, an active vibration member, an active vibration device, an active vibration apparatus, a piezoelectric vibration apparatus, a piezoelectric vibration member, a piezoelectric vibration device, a piezoelectric vibrator, a piezoelectric vibration generator, a flexible vibration generator, a flexible actuator, a flexible speaker, a flexible piezoelectric speaker, a film actuator, a film-type piezoelectric composite actuator, a film speaker, a film-type piezoelectric speaker, or a film-type piezoelectric composite speaker, or the like, but embodiments of the present specification are not limited thereto.

The vibration apparatus 500 may be coupled to or attached on the supporting portion 300. The vibration apparatus 500 may have a non-planar (or non-flat) structure by the supporting portion 300. For example, the vibration apparatus 500 may be disposed in a curved shape or a curved structure by the supporting portion 300. For example, the vibration apparatus 500 may be disposed in a state where a pre-stress is applied thereto by the supporting portion 300.

The vibration apparatus 500 according to an example embodiment of the present disclosure may include a first vibration apparatus 500-1 and a second vibration apparatus 500-2.

Each of the first and second vibration apparatuses 500-1 and 500-2 may be a film vibration apparatus or a film vibration apparatus or a film-type vibration apparatus. Each of the first and second vibration apparatuses 500-1 and 500-2 may be disposed at a rear periphery portion of the cover member 130. For example, the first and second vibration apparatuses 500-1 and 500-2 may be disposed in parallel with the first center line CL1 therebetween. For example, the first and second vibration apparatuses 500-1 and 500-2 may be disposed to have a symmetric structure (or a left-right symmetric structure) or an asymmetric structure (or a left-right asymmetric structure) with respect to the first center line CL1 of the cover member 130.

The first vibration apparatus 500-1 may be disposed at a first rear periphery portion of the cover member 130. For example, the first vibration apparatus 500-1 may be disposed at the first supporting portion 310 at a first region 100A1 of the cover member 130. For example, the first vibration apparatus 500-1 may be disposed close to the first rear periphery portion of the cover member 130.

According to an example embodiment of the present disclosure, a center portion (or a central portion or a middle portion) CP of the first vibration apparatus 500-1 may be aligned or positioned at a second center line CL2 of the cover member 130. For example, the center portion (or the central portion or the middle portion) CP of the first vibration apparatus 500-1 may be disposed between the first center line CL1 of the cover member 130 and a first sidewall (or a first short side or a first side) of the cover member 130 on the second center line CL2 within the first region 100A1 of the cover member 130. For example, the first vibration apparatus 500-1 may be disposed closer to the first sidewall of the cover member 130 than the first center line CL1 of the cover member 130 within the first region 100A1 of the cover member 130 or the distance to the CL1 is larger than the distance to the first side wall.

According to another example embodiment of the present disclosure, the center portion (or the central portion or the middle portion) CP of the first vibration apparatus 500-1 may be spaced apart from the second center line CL2 of the cover member 130. For example, the center portion (or the central portion or the middle portion) CP of the first vibration apparatus 500-1 may be positioned in the first sub-region 100B1 of the first region 100A1. For example, the center portion (or the central portion or the middle portion) CP of the first vibration apparatus 500-1 may be positioned at the first sub-region 100B1 of the first region 100A1 spaced apart from the second center line CL2 of the cover member 130 by a predetermined separation distance ΔL. Accordingly, a sound characteristic and/or a sound pressure level characteristic of a low-pitched sound band generated based on a vibration of the first vibration apparatus 500-1 may be enhanced.

In a further embodiment, the part or area of the first vibration apparatus 500-1 arranged in the first sub-region 100B1 is larger than the part or area arranged in the second sub region 100B2. For example, when the apparatus according to an example embodiment of the present disclosure is applied to a display apparatus, a lowermost portion (or a lowermost end or a lowermost portion) of the second sub-region 100B2 of the cover member 130 may act as a propping portion, and thus, may be a free end capable of freely moving or vibrating toward an uppermost portion of the first sub-region 100B1 from the lowermost portion of the second sub-region 100B2 in a vibration of the cover member 130. Accordingly, when the center portion CP of the first vibration apparatus 500-1 is positioned at the first sub-region 100B1 spaced apart from the second center line CL2 of the cover member 130, a vibration width (or a displacement width) of the first vibration apparatus 500-1 corresponding to the same driving signal may increase more than when the center portion CP of the first vibration apparatus 500-1 is positioned at the second center line CL2 of the cover member 130, and thus, a sound characteristic and/or a sound pressure level characteristic of a low-pitched sound band generated based on a vibration of the first vibration apparatus 500-1 may be enhanced.

The second vibration apparatus 500-2 may be disposed at a second rear periphery portion of the cover member 130. For example, the second vibration apparatus 500-2 may be disposed at the second supporting portion 320 in a second region 100A2 of the cover member 130. For example, the second vibration apparatus 500-2 may be disposed close to the second rear periphery portion of the cover member 130.

According to an example embodiment of the present disclosure, a center portion (or the central portion or the middle portion) CP of the second vibration apparatus 500-2 may be aligned or positioned at a second center line CL2 of the cover member 130. For example, the center portion (or the central portion or the middle portion) CP of the second vibration apparatus 500-2 may be disposed between the first center line CL1 of the cover member 130 and a second sidewall (or a second short side or a second side) of the cover member 130 on the second center line CL2 within the second region 100A2 of the cover member 130. For example, the second vibration apparatus 500-2 may be disposed closer to the second sidewall of the cover member 130 than the first center line CL1 of the cover member 130 within the second region 100A2 of the cover member 130.

The first and second vibration apparatus 500-1, 500-2 are symmetrically arranged to the first center line CL1. Both have a similar distance to the respective side wall, and both have a similar distance to the first center line CL1.

According to another example embodiment of the present disclosure, the center portion (or the central portion or the middle portion) CP of the second vibration apparatus 500-2 may be spaced apart from the second center line CL2 of the cover member 130. For example, the center portion (or the central portion or the middle portion) CP of the second vibration apparatus 500-2 may be positioned in the second sub-region 100B2 of the second region 100A2. For example, the center portion (or the central portion or the middle portion) CP of the second vibration apparatus 500-2 may be positioned at the first sub-region 100B1 of the second region 100A2 spaced apart from the second center line CL2 of the cover member 130 by a predetermined separation distance ΔL. Accordingly, a sound characteristic and/or a sound pressure level characteristic of a low-pitched sound band generated based on a vibration of the second vibration apparatus 500-2 may be enhanced.

Each of the first vibration apparatus 500-1 and the second vibration apparatus 500-2 may vibrate based on a driving signal, e.g. a sound signal (or a voice signal) or including the sound signal and a haptic feedback signal input from the outside to vibrate the vibration member 100, and thus, may generate a sound S based on a vibration of the vibration member 100 or may generate a haptic feedback (or a haptic vibration) responding to a user touch.

The apparatus according to another example embodiment of the present disclosure may generate the sound S and/or the haptic feedback (or the haptic vibration) based on a vibration of the vibration member 100 based on driving of the vibration apparatus 500. For example, the sound S generated based on a vibration of the vibration member 100 may be output in a forward direction of the vibration member 100 or a forward direction of a screen. For example, the apparatus according to an example embodiment of the present disclosure may output a left sound and a right sound in the forward direction of the vibration member 100 or the forward direction of the screen by a vibration of the vibration member 100 based on driving of each of the first vibration apparatus 500-1 and the second vibration apparatus 500-2 and may implement a sound, for example, a stereo sound through the left sound and the right sound. Accordingly, the apparatus according to an example embodiment of the present disclosure may output a sound in the forward direction of the vibration member 100 or the forward direction of the screen using the vibration member 100, including the display panel, as a vibration plate for generating a sound (or outputting a sound), and thus, may transfer a more accurate sound, thereby improving sound quality and/or a sound and enhancing the immersion of a viewer.

Figure 3:
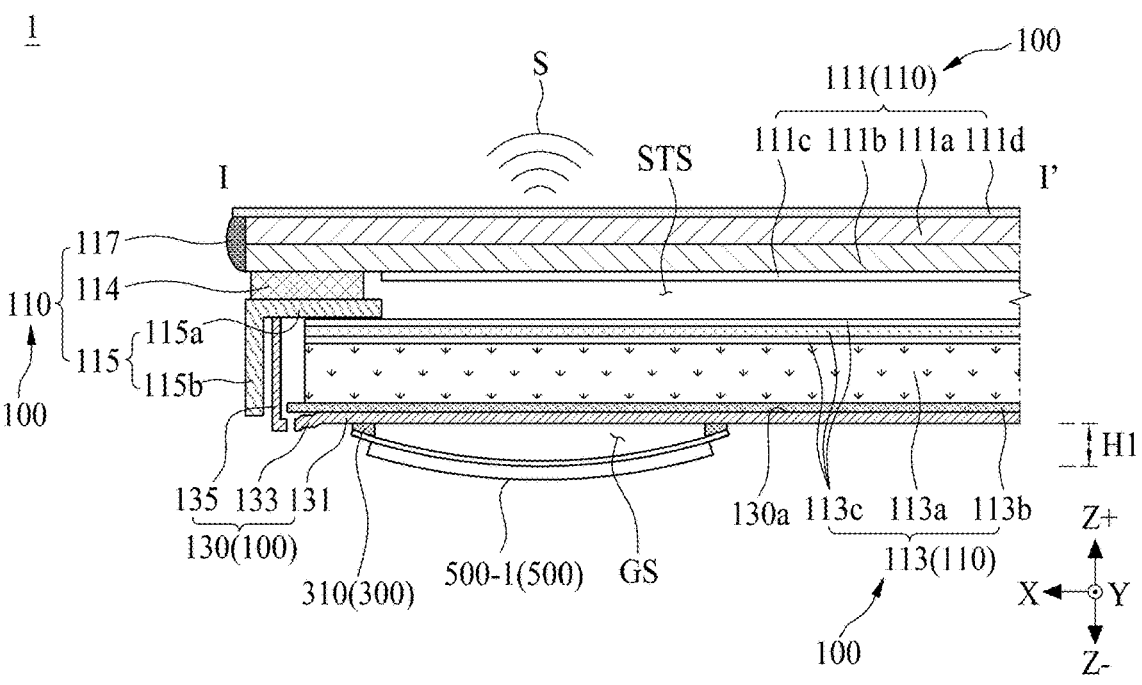
FIG. 3 is an example of a cross-sectional view taken along line I-I' illustrated in FIG. 2.
Figure 4:
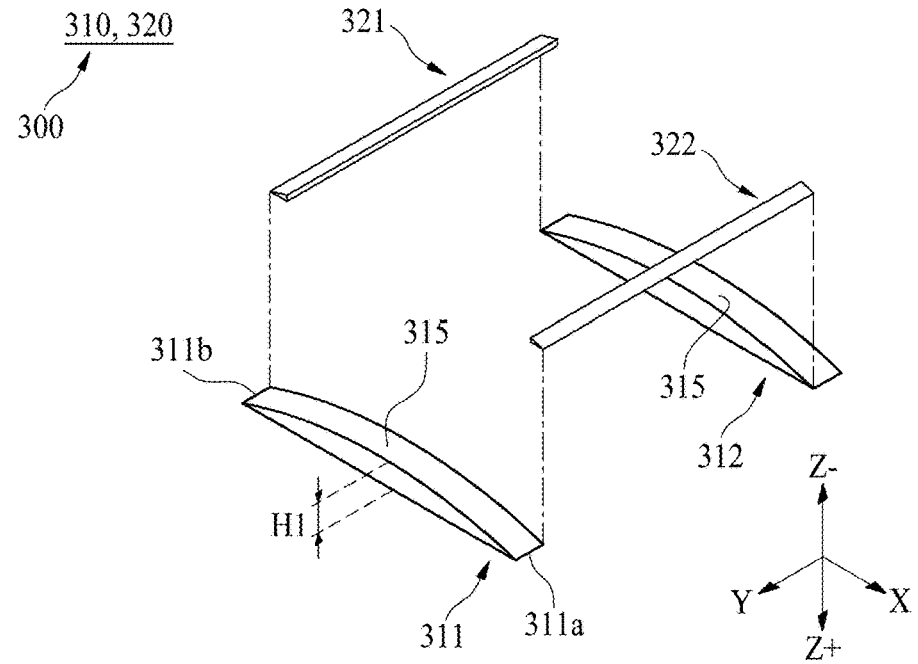
FIG. 4 is an example of a perspective view illustrating a supporting portion illustrated in FIGS. 2 and 3.

FIG. 3 is an example of a cross-sectional view taken along line I-I' illustrated in FIG. 2. FIG. 4 is an example of a perspective view illustrating a supporting portion illustrated in FIGS. 2 and 3. FIGS. 3 and 4 illustrate an apparatus according to a first example embodiment of the present disclosure.

With reference to FIGS. 2 and 3, an apparatus 1 according to an example embodiment of the present disclosure may include a vibration member 100, a supporting portion 300, and a vibration apparatus 500.

The vibration member 100 may include a display member 110 which may display an image or directly outputs a sound while displaying an image. The vibration member 100 may include a display member 110 and a cover member 130.

The display member 110 may include a display panel 111 and a guide member 115.

The display panel 111 may be a liquid crystal display panel, but embodiments of the present disclosure are not limited thereto. For example, the display panel 111 may be a light emitting display panel, an electrophoretic display panel, a micro light emitting diode display panel, an electrowetting display panel, a quantum dot light emitting display panel, or the like.

When the display panel 111 is a liquid crystal display panel, the display member 110 or the vibration member 100 may further include a backlight 113 between the display panel 111 and the cover member 130.

The display panel 111 according to an example embodiment of the present disclosure may include a first substrate 111a, a second substrate 111b, a first polarization member 111c, and/or a second polarization member 111d.

The first substrate 111a may be an upper substrate or a thin film transistor (TFT) array substrate and may include a pixel array (or a display portion or a display area) including a plurality of pixels which are respectively provided in a plurality of pixel areas defined by intersections between a plurality of gate lines and/or a plurality of data lines. Each of the plurality of pixels may include a TFT connected to a gate line and/or a data line, a pixel electrode connected to the TFT, and a common electrode which is provided adjacent to the pixel electrode and is supplied with a common voltage.

The first substrate 111a may further include a pad part, which is provided at a first periphery (or a first non-display portion) and is connected to a panel driving circuit, and a gate driving circuit which is provided at a second periphery (or a second non-display portion) and is connected to the plurality gate lines. For example, the panel driving circuit may be connected to the pad part and may be disposed at a rear surface of the cover member 130. For example, the panel driving circuit may be disposed in the second sub-region 100B2 of each of the first and second regions 100A1 and 100A2 of the cover member 130 illustrated in FIG. 2.

The panel driving circuit may be covered or protected by a protection portion (or a protection member) 150. For example, the protection portion 150 may be coupled or fixed to the second sub-region 100B2 of each of the first and second regions 100A1 and 100A2 of the cover member 130 to cover a portion, other than a user connector, of the panel driving circuit, and thus may protect the panel driving circuit.

The second substrate 111b may be a lower substrate or a color filter array substrate and may include a pixel opening pattern including an opening area corresponding to each of the plurality of pixels formed at the first substrate 111a, and a color filter layer formed at the opening area. The second substrate 111b may be bonded to a portion, other than a first periphery, of the first substrate 111a with a liquid crystal layer therebetween by a sealant.

The liquid crystal layer may be disposed or interposed between the first substrate 111a and the second substrate 111b and may include a liquid crystal including liquid crystal molecules where an alignment direction thereof is changed based on an electric field generated by the common voltage and a data voltage applied to a pixel electrode for each pixel.

The first polarization member 111c may be attached on a lower surface of the second substrate 111b and may polarize light which is incident from the backlight 113 and travels to the liquid crystal layer. The second polarization member 111d may be attached on an upper surface of the first substrate 111a and may polarize light which passes through the first substrate 111a and is output to the outside.

In the display panel 111 according to an example embodiment of the present disclosure, the liquid crystal layer may be driven based on an electric field which is generated in each pixel by the data voltage and the common voltage applied to each pixel, and thus, an image may be displayed based on light passing through the liquid crystal layer.

In the display panel 111 according to an example embodiment of the present disclosure, the first substrate 111a implemented as the TFT array substrate may configure an image display surface, and thus, a whole front surface of the display panel 111 may be exposed to the outside without being covered by a separate mechanism or a separate structure.

In the display panel 111 according to another example embodiment of the present disclosure, the first substrate 111a may be implemented as the color filter array substrate, and the second substrate 111b may be implemented as the TFT array substrate. For example, the display panel 111 according to another example embodiment of the present disclosure may have a type where an upper portion and a lower portion of the display panel 111 according to an example embodiment of the present disclosure are reversed therebetween, in this case, a pad part of the display panel 111 may be covered by a separate mechanism or a separate structure.

The display panel 111 according to an example embodiment of the present disclosure may further include a buffer member 119. The buffer member 119 may be formed to surround one or more or all side surfaces of the display panel 111. The buffer member 119 may protect the side surfaces of the display panel 111 from an external impact, or may prevent light leakage through the side surfaces of the display panel 111.

The backlight (or an illumination portion or a backlight portion) 113 may be disposed at a rear surface of the display panel 111 and may irradiate light onto the rear surface of the display panel 111. The backlight 113 according to an example embodiment of the present disclosure may include a light guide plate 113*a*, a light source part, a reflective sheet 113*b*, and an optical sheet part (or an optical member) 113*c*, but embodiments of the present disclosure are not limited thereto.

The light guide plate (or a light guide member) 113*a* may be disposed at the cover member 130 to overlap the display panel 111 and may include a light input surface which is provided at one side thereof. The light guide plate 113*a* may include a light-transmitting plastic or glass material, but embodiments of the present disclosure are not limited thereto. The light guide plate 113*a* may transfer (output) light, which is incident through the light input surface from the light source part, to the display panel 111.

The light source part may irradiate light onto the light input surface provided at the light guide plate 113*a*. The light source part may be disposed at the cover member 130 to overlap a periphery portion of the display panel 111. The light source part may include a plurality of light emitting diode devices which are mounted at a light-source printed circuit board (PCB) and irradiate lights onto the light input surface of the light guide plate 113*a*.

The reflective sheet 113*b* may be disposed at the cover member 130 to cover a rear surface of the light guide plate 113*a*. The reflective sheet 113*b* may reflect light, which is incident from the light guide plate 113*a*, to the light guide plate 113*a* to minimize the loss of the light.

The optical sheet part 113*c* may be disposed on a front surface of the light guide plate 113*a* and may enhance a luminance characteristic of light output from the light guide plate 113*a*. The optical sheet part 113*c* according to an example embodiment of the present disclosure may include a lower diffusive sheet, a lower prism sheet, and an upper prism sheet, but embodiments of the present disclosure are not limited thereto. For example, the optical sheet part 113*c* may be configured as one layer including the lower diffusive sheet, the lower prism sheet, and the upper prism sheet. However, embodiments of the present disclosure are not limited thereto, and the optical sheet part 113*c* may be configured by a stacked combination of one or more sheets among a diffusive sheet, a prism sheet, a dual brightness enhancement film, and a lenticular sheet, or may be configured with one composite sheet having a light diffusing function and a light collecting function.

The guide member 115 may be disposed at a rear periphery portion of the display panel 111 and may support the rear periphery portion of the display panel 111. The guide member 115 may be supported by or accommodated into the cover member 130 to overlap the rear periphery portion of the display panel 111. The guide member 115 may be disposed under the rear periphery portion of the display panel 111 not to protrude to the outside of each side surface of the display panel 111.

The guide member (or a supporting frame) 115 according to an example embodiment of the present disclosure may include a guide frame 115*a* and a guide side portion 115*b*. For example, the guide member 115 may have a cross-sectional structure having a "⌐"-shape (a gamma shape or L-shape) or a "⌐"-shape (a rotated "⌐"-shape or rotated L-shape) based on a coupling structure or a connection structure of the guide frame 115*a* and the guide side portion 115*b*, but embodiments of the present disclosure are not limited thereto.

The guide frame 115*a* may be connected to the rear periphery region of the display panel 111 and may be supported by the cover member 130. For example, the guide frame 115*a* may have a tetragonal band (or belt) shape including an opening portion overlapping a center portion, other than the rear periphery region, of the display panel 111, but embodiments of the present disclosure are not limited thereto. For example, the guide frame 115*a* may directly contact an uppermost surface of the backlight 113 (for example, an uppermost surface of the optical sheet part 113*c*), or may be spaced apart from the uppermost surface of the optical sheet part 113*c* by a certain distance.

The guide side portion 115*b* may be connected to the guide frame 115*a* and may surround one portion or side surfaces of the cover member 130. For example, the guide side portion 115*b* may be bent from the guide frame 115*a* to the side surfaces of the cover member 130 and may surround the side surfaces of the cover member 130 or may be surrounded by the side surfaces of the cover member 130.

The guide member 115 according to an example embodiment of the present disclosure may include a plastic material, a metal material, or a mixed material of a plastic material and a metal material, but embodiments of the present disclosure are not limited thereto. For example, the guide member 115 may act as a vibration transfer member which transfers a sound vibration, generated by the vibration apparatus 500, to the periphery portion of the display panel 111. Therefore, the guide member 115 may transfer the sound vibration, generated by the vibration apparatus 500, to the display panel 111 without being lost in a state of maintaining stiffness of the display panel 111. For example, the guide member 115 may include a metal material for transferring the sound vibration, generated by the vibration apparatus 500, to the display panel 111 without being lost in a state of maintaining stiffness of the display panel 111, but embodiments of the present disclosure are not limited thereto.

The guide member 115 according to an example embodiment of the present disclosure may be connected or coupled to the rear periphery portion of the display panel 111 by a coupling member (or a panel coupling member) 114. The coupling member 114 may be disposed between the rear periphery portion of the display panel 111 and the guide member 115 and may dispose or couple the display panel 111 to the guide member 115. For example, the coupling member 114 may include an acrylic-based adhesive member or a urethane-based adhesive member, but embodiments of the present disclosure are not limited thereto. For example, the coupling member 114 may include the acrylic-based adhesive member which is relatively better in adhesive force and hardness than the urethane-based adhesive member so that the vibration of the guide member 115 can be well transferred to the display panel 111. For example, the coupling member 114 may include a double-sided foam adhesive pad having an acrylic-based adhesive layer, or an acrylic-based adhesive resin curing layer.

A front surface of the coupling member 114 according to an example embodiment of the present disclosure may be disposed at the second substrate 111*b* or the first polarization member 111*c* of the display panel 111. The coupling member 114 may be directly coupled to a rear periphery portion of the second substrate 111*b* to enhance an adhesive force to the display panel 111. For example, the coupling member 114 may surround side surfaces of the first polarization member 111*c*, thereby preventing light leakage of the side surface from occurring in the first polarization member 111*c*.

The coupling member 114 may have a certain thickness (or height). Thus, the coupling member 114 may provide a sound transfer space STS between the display panel 111 and the backlight 113 together with the guide frame 115*a* of the guide member 115. The coupling member 114 may be provided in a four-side-closed shape or a closed loop shape in the guide frame 115a of the guide member 115, but embodiments of the present disclosure are not limited thereto. For example, the coupling member 114 may seal (or close) the sound transfer space STS between a rearmost surface of the display panel 111 and an uppermost surface of the backlight 113 which face each other with an opening portion of the guide member 115 therebetween, thereby preventing or minimizing the leakage (or loss) of a sound pressure transferred to the sound transfer space STS. The sound transfer space STS may also act as a sound pressure level generating space where a sound pressure is generated based on a vibration of the backlight 113 or a panel vibration space which enables a vibration of the display panel 111 to be smoothly performed. For example, the sound transfer space STS may be a sound wave transmission portion or a sound transmission portion, but embodiments of the present disclosure are not limited thereto.

The cover member 130 may be configured to support the display member 110. The cover member 130 may include a rear portion 131 and a lateral portion 135.

The rear portion 131 may be disposed at the rear surface of the display member 110. The rear portion 131 may include a floor surface (or a supporting surface or a bottom surface) 130a which supports the display member 110. The rear portion 131 may be substantially the same as the rear portion 131 described above with reference to FIGS. 1 and 2, and thus, the repetitive description thereof may be omitted for brevity.

The lateral portion 135 may be connected to a periphery portion of the rear portion 131 and may be configured to support the display member 110. The lateral portion 135 may be configured to have a predetermined height along the periphery portion of the rear portion 131, and thus, an accommodating space may be provided over the floor surface 130a of the rear portion 131. For example, the lateral portion 135 may be bent from the periphery portion of the rear portion 131. For example, the lateral portion 135 may be a sidewall portion or a lateral cover portion, and embodiments of the present disclosure are not limited thereto.

The supporting portion 300 may be configured at the rear surface of the vibration member 100. The supporting portion 300 may be disposed at the rear surface of the cover member 130 configured at the vibration member 100 and may be configured to support the vibration apparatus 500. The supporting portion 300 may support the vibration apparatus 500 so that a shape of the vibration apparatus 500 is non-planar (or non-flat). For example, the supporting portion 300 may be configured to apply a pre-stress to the vibration apparatus 500. For example, the supporting portion 300 may be configured to apply only a tension stress to the vibration apparatus 500. For example, the supporting portion 300 may include a curved portion 315 which has a curved shape (or a curved structure) for applying only a tension stress to the vibration apparatus 500.

The supporting portion 300 according to an example embodiment of the present disclosure may include a first supporting portion 310 and a second supporting portion 320.

Each of the first supporting portion 310 and the second supporting portion 320 may include a shape or a structure for applying a pre-stress to the vibration apparatus 500. For example, each of the first supporting portion 310 and the second supporting portion 320 may include a curved portion 315 which is configured to apply only a tension stress to the vibration apparatus 500.

Each of the first supporting portion 310 and the second supporting portion 320 may include a pair of first supporting members 311 and 312.

The pair of first supporting members 311 and 312 may be parallel to each other along the first direction X. Each of the pair of first supporting members 311 and 312 may include a curved portion 315 having a predetermined curvature.

The curved portion 315 may have a curved structure having one curvature (or a single curvature) having no inflection point. For example, the curved portion 315 may have a structure which protrudes convexly from the rear portion 131 of the cover member 130. For example, the curved portion 315 may have a single convex curved shape having a certain curvature. For example, the pair of first supporting members 311 and 312 including the curved portion 315 may be a curved supporting portion, a supporting bar, a protrusion bar, a curvature guide portion, a curved structure, a curvature structure, a curved protrusion portion, an arch portion, or a stress application portion, but embodiments of the present disclosure are not limited thereto.

According to an example embodiment of the present disclosure, a height (or a distance) H1 between the curved portion 315 of the supporting portion 300 and the vibration member 100 may increase progressively toward a center portion of the curved portion 315 from a periphery portion of the curved portion 315. According to an example embodiment of the present disclosure, the height H1 of the curved portion 315 may be set within a range which enables a pre-stress to be applied to the vibration apparatus 500. For example, the height H1 of the curved portion 315 may be 2 mm to 200 mm, but embodiments of the present disclosure are not limited thereto, and the height H1 of the curved portion 315 may vary based on a size of a vibration apparatus 500. When the height H1 of the curved portion 315 is less than 2 mm, it may be difficult or insufficient to apply a pre-stress to the vibration apparatus 500 due to a relatively small curvature, and due to this, there may be no effect. When the height H1 of the curved portion 315 is more than 200 mm, the reliability of the vibration apparatus 500 may be reduced due to a relatively large curvature and a thickness of an apparatus or a display apparatus may increase, and due to this, it may be difficult to slim.

The pair of first supporting members 311 and 312 may be disposed at the rear portion 131 of the cover member 130 in parallel with the first direction X. Each of the pair of first supporting members 311 and 312 may support a pair of first periphery portions parallel to the first direction X among periphery portions of the vibration apparatus 500. Therefore, the vibration apparatus 500 may be bent in a curved shape by the curved portion 315 of each of the pair of first supporting members 311 and 312. For example, the vibration apparatus 500 may be bent in a curved shape by a curved surface of the curved portion 315 of each of the pair of first supporting members 311 and 312. Each of the pair of first supporting members 311 and 312 may include an arch shape having a predetermined curvature between a pair of short sides 311a and 311b parallel to the second direction Y.

Each of the first supporting portion 310 and the second supporting portion 320 may further include a pair of second supporting members (or supporting bars) 321 and 322.

The pair of second supporting members 321 and 322 may be parallel to each other along the second direction Y. Each of the pair of second supporting members 321 and 322 may be connected or disposed between the pair of first supporting members (or supporting bars) 311 and 312. Each of the pair of second supporting members 321 and 322 may be disposed at the rear portion 131 of the cover member 130 in parallel with the second direction Y. Each of the pair of second supporting members 321 and 322 may support a pair of second periphery portions parallel to the second direction Y among the periphery portions of the vibration apparatus 500.

In FIG. 4, it is illustrated that each of the pair of first supporting members 311 and 312 and each of the pair of second supporting members 321 and 322 are spaced apart from each other, but embodiments of the present disclosure are not limited thereto. For example, each of the pair of first supporting members 311 and 312 and each of the pair of second supporting members 321 and 322 may be provided as one body to have one frame shape.

According to an example embodiment of the present disclosure, when the vibration apparatus 500 have a rectangular shape including a long side and a short side, the curved portion 315 of each of the pair of first supporting members 311 and 312 may support a periphery portion of a short side of the vibration apparatus 500 in a curved shape. For example, when each of the pair of first supporting members 311 and 312 is disposed at the rear portion 131 of the cover member 130 in parallel with the first direction X and supports the periphery portion of the short side of the vibration apparatus 500, a long side of the vibration apparatus 500 may be disposed in parallel with the second direction Y. For example, when each of the pair of first supporting members 311 and 312 is disposed at the rear portion 131 of the cover member 130 in parallel with the second direction Y and supports the periphery portion of the short side of the vibration apparatus 500, the long side of the vibration apparatus 500 may be disposed in parallel with the first direction X.

According to an example embodiment of the present disclosure, each of the first supporting portion 310 and the second supporting portion 320 may include one or more of a metal material, a plastic material, and an elastic material, but embodiments of the present disclosure are not limited thereto. For example, the metal material may be electronic galvanized sheet iron, but embodiments of the present disclosure are not limited thereto. The plastic material may be a compound of polycarbonate (PC) resin and acrylonitrile butadiene styrene (ABS) resin, but embodiments of the present disclosure are not limited thereto. For example, the elastic material may be a foam pad. For example, the elastic material may include epoxy resin, acrylic resin, silicone resin, or urethane resin, but embodiments of the present disclosure are not limited thereto.

According to an example embodiment of the present disclosure, each of the first supporting portion 310 and the second supporting portion 320 may be coupled to or attached on the rear surface of the vibration member 100 by an adhesive member. For example, each of the first supporting portion 310 and the second supporting portion 320 may be coupled to or attached on the rear portion 131 of the cover member 130 by an adhesive member.

According to an example embodiment of the present disclosure, each of the first supporting portion 310 and the second supporting portion 320 may be coupled or fastened to the rear surface of the vibration member 100 by a fastening member such as a screw or a nut, or the like. For example, each of the first supporting portion 310 and the second supporting portion 320 may be coupled or fastened to the rear portion 131 of the cover member 130 by the fastening member.

According to an example embodiment of the present disclosure, each of the first supporting portion 310 and the second supporting portion 320 may include a metal material and may be coupled or fixed to the rear surface of the vibration member 100 by welding or the like. For example, each of the first supporting portion 310 and the second supporting portion 320 may be coupled or fixed to the rear portion 131 of the cover member 130 by welding or the like.

According to an example embodiment of the present disclosure, each of the first supporting portion 310 and the second supporting portion 320 may include a metal material and may be integrated into or provided as one body with the rear surface of the vibration member 100 without a separate intermediate medium material. For example, each of the first supporting portion 310 and the second supporting portion 320 may be integrated into or provided as one body with the rear portion 131 of the cover member 130 without a separate intermediate medium material.

The vibration apparatus 500 may be coupled to or attached on the curved portion 315 of the supporting portion 300. For example, the vibration apparatus 500 may be coupled to or attached on the curved portion 315 to have an equiangular shape (or a conformal shape) based on a curvature of the curved portion 315, but embodiments of the present disclosure are not limited thereto. For example, the vibration apparatus 500 may be coupled to or attached on the curved portion 315 to have an equiangular shape which conforms to the contour of a curvature of the curved portion 315. For example, the vibration apparatus 500 may be coupled to or attached on the curved portion 315 to have a non-equiangular shape (or a non-conformal shape) which is not based on a curvature of the curved portion 315 or have a curvature which differs from that of the curved portion 315. For example, the vibration apparatus 500 may be coupled to or attached on the curved portion 315 to have a non-equiangular shape which is not based on the contour of a curvature of the curved portion 315 or have a curvature which differs from that of the curved portion 315.

According to another example embodiment of the present disclosure, the vibration apparatus 500 may be coupled to or attached on the curved portion 315 of the supporting portion 300, and thus, may have a pre-stress or receive the pre-stress based on the curved portion 315. For example, the vibration apparatus 500 may be coupled to or attached on the curved portion 315 of the supporting portion 300, and thus, may be maintained in a state where the vibration apparatus 500 has the pre-stress or receives the pre-stress based on the curved portion 315 of the supporting portion 300. For example, the vibration apparatus 500 may receive a tension stress or include the tension stress based on a curvature of the curved portion 315 of the supporting portion 300. For example, the curved portion 315 of the supporting portion 300 may be configured to apply only the tension stress to the vibration apparatus 500, in order to enhance a vibration characteristic of the vibration apparatus 500. For example, when the vibration apparatus 500 receives a compression stress instead of a tension stress based on the curved portion 315 of the supporting portion 300, a vibration characteristic of the vibration apparatus 500 may be reduced.

According to another example embodiment of the present disclosure, the vibration apparatus 500 may include a state in which the vibration apparatus 500 is bent in a curved shape or may receive a pre-stress (or a pre-tension stress), based the curved portion 315 of the supporting portion 300, and thus, a second moment of inertia may increase. In the vibration apparatus 500, the number of resonance frequencies occurring in vibrating may decrease because a second moment of inertia increases, and thus, the number of nodes (or joint points) may decrease, thereby enhancing a sound characteristic and/or a sound pressure level characteristic of a sound. For example, in the vibration apparatus 500, because the number of resonance frequencies is reduced due to an increase in second moment of inertia, a mode shape may be corrected, and thus, a sound pressure level characteristic and/or a sound characteristic may be enhanced.

According to another example embodiment of the present disclosure, the vibration apparatus 500 may vibrate in a state in which the vibration apparatus 500 is bent in a curved shape or receives a pre-stress (or a pre-tension stress), based on the curved portion 315 of the supporting portion 300, and thus, a vibration direction (or a displacement direction or a bending direction or a driving direction) thereof may be implemented as a single direction and a dynamic displacement may extend. Accordingly, a sound generated based on a vibration of the vibration apparatus 500 may concentrate in a direction toward a center of the curved portion 315 and a sound pressure level transferred to the vibration member 100 may increase or may be amplified, and thus, a sound characteristic and/or a sound pressure level characteristic generated based on a vibration of the vibration member 100 may be enhanced.

The first vibration apparatus 500-1 of the vibration apparatus 500 may be coupled to or attached on the curved portion 315 of the first supporting portion 310. The first vibration apparatus 500-1 may be coupled to or attached on the curved portion 315 to have an equiangular shape based on a curvature of the curved portion 315, but embodiments of the present disclosure are not limited thereto. For example, the first vibration apparatus 500-1 may be coupled to or attached on the curved portion 315 to have an equiangular shape which conforms to the contour of a curvature of the curved portion 315. For example, the first vibration apparatus 500-1 may be coupled to or attached on the curved portion 315 to have a non-equiangular shape which is not based on a curvature of the curved portion 315 or have a curvature which differs from that of the curved portion 315. For example, the first vibration apparatus 500-1 may be coupled to or attached on the curved portion 315 to have a non-equiangular shape which is not based on the contour of a curvature of the curved portion 315. Therefore, the first vibration apparatus 500-1 may vibrate in a state in which the first vibration apparatus 500-1 receives a pre-stress (or a pre-tension stress) or is bent in a curved shape, based on the curved portion 315, thereby generating or outputting a sound or a sound wave. Accordingly, a first region of the vibration member 100 overlapping the first vibration apparatus 500-1 may receive a sound or a sound wave generated based on a vibration of the first vibration apparatus 500-1 to vibrate, and thus, may generate or output a sound and/or a haptic feedback.

The second vibration apparatus 500-2 of the vibration apparatus 500 may be coupled to or attached on the curved portion 315 of the second supporting portion 320. The second vibration apparatus 500-2 may be coupled to or attached on the curved portion 315 to have an equiangular shape based on a curvature of the curved portion 315, but embodiments of the present disclosure are not limited thereto. For example, the second vibration apparatus 500-2 may be coupled to or attached on the curved portion 315 to have an equiangular shape which conforms to the contour of a curvature of the curved portion 315. For example, the second vibration apparatus 500-2 may be coupled to or attached on the curved portion 315 to have a non-equiangular shape which is not based on a curvature of the curved portion 315 or have a curvature which differs from that of the curved portion 315. For example, the second vibration apparatus 500-2 may be coupled to or attached on the curved portion 315 to have a non-equiangular shape which is not based on the contour of a curvature of the curved portion 315. Therefore, the second vibration apparatus 500-2 may vibrate in a state in which the second vibration apparatus 500-2 receives a pre-stress (or a pre-tension stress) or is bent in a curved shape, based on the curved portion 315, thereby generating or outputting a sound or a sound wave. Accordingly, a second region of the vibration member 100 overlapping the second vibration apparatus 500-2 may receive a sound or a sound wave generated based on a vibration of the second vibration apparatus 500-2 to vibrate, and thus, may generate or output a sound and/or a haptic feedback.

The apparatus 1 according to the first example embodiment of the present disclosure may further include a gap space GS provided between the vibration member 100 and the vibration apparatus 500 by the supporting member 300.

The gap space GS may be provided between the rear portion 131 of the cover member 130 and the vibration apparatus 500 by the supporting member 300. For example, the gap space GS may be provided between the curved portion 315 and the reflective sheet 113*b* of the backlight 113. The gap space GS may include a space where a sound or a sound pressure level is generated based on a vibration of the vibration apparatus 500, a space where a vibration of the vibration apparatus 500 is smoothly performed, or a space or a path where a sound wave generated based on a vibration of the vibration apparatus 500 is propagated to the vibration member 100. For example, the gap space GS may be an air gap, a sound pressure level generating space, a sound space, a sound pressure level space, a sounding portion, a sounding box, a sound wave propagation path, a sound energy incident portion, or a sound path, but embodiments of the present disclosure are not limited thereto.

The vibration apparatus 500 may vibrate in a state in which the vibration apparatus 500 receives a pre-stress (or a pre-tension stress) or is bent in a curved shape based on the curved portion 315 of the supporting member 300, and thus, may generate or output a sound or a sound wave in the gap space GS. Accordingly, the vibration member 100 may vibrate based on a sound (or a sound wave) in the gap space GS to generate or output a sound and/or a haptic feedback. For example, in the display member 110, a sound (or a sound wave) generated by a vibration of the backlight 113 based on a vibration of the cover member 130 may be output to the sound transfer space STS, and a sound and/or a haptic feedback may be generated by a vibration of the display panel 111 based on a sound of the sound transfer space STS.

Therefore, the apparatus 1 according to the first example embodiment of the present disclosure may include the vibration apparatus 500 which vibrates in a state in which the vibration apparatus 500 receives a pre-stress (or a pre-tension stress) or is bent in a curved shape based the supporting member 300, and thus, a second moment of inertia in the vibration apparatus 500 may increase or a vibration direction of the vibration apparatus 500 may be implemented as a single direction, thereby enhancing a sound characteristic and/or a sound pressure level characteristic of a sound generated by the vibration member 100 which vibrates based on a vibration of the vibration apparatus 500.

Figure 5:
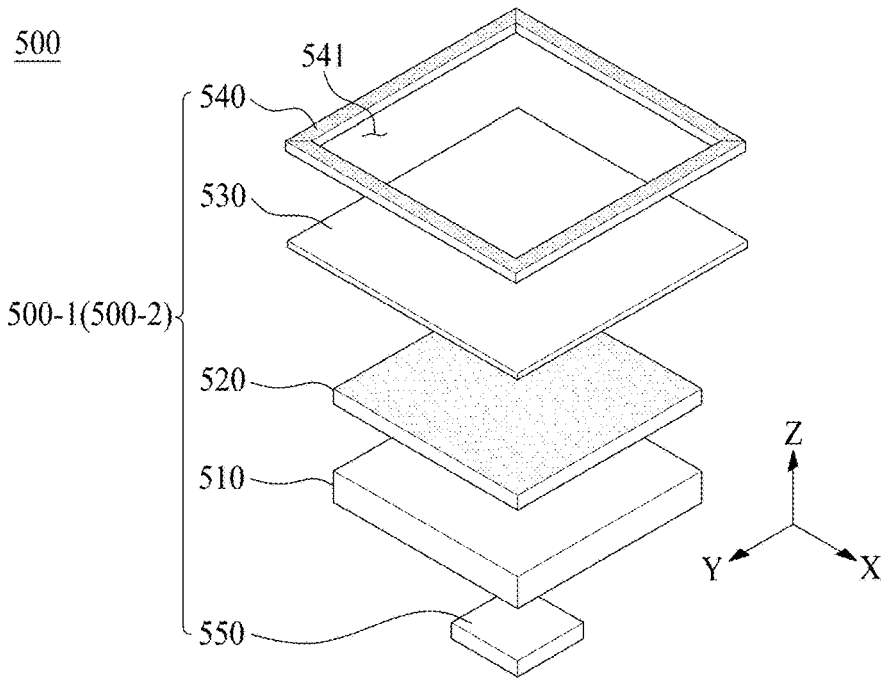
FIG. 5 is a perspective view illustrating a vibration apparatus according to an example embodiment of the present disclosure.

FIG. 5 is a perspective view illustrating a vibration apparatus according to an example embodiment of the present disclosure. FIG. 5 illustrates the vibration apparatus or the first and second vibration apparatuses illustrated in FIGS. 2 and 3.

With reference to FIG. 5, a vibration apparatus 500 or first and second vibration apparatuses 500-1 and 500-2 according to a first example embodiment of the present disclosure may include a vibration generator 510, a first connection member 520, a plate 530, and a second connection member 540.

The vibration generator 510 may be configured to vibrate (or displace or drive) based on a driving signal (or an electrical signal or a voice signal) applied thereto to vibrate (or displace or drive) the vibration member 100. For example, the vibration generator 510 may be referred to as a vibration device, a vibration structure, a vibrator, a vibration generating device, a sound generator, a sound device, a sound generating structure, or a sound generating device, but embodiments of the present disclosure are not limited thereto.

The vibration generator 510 according to an example embodiment of the present disclosure may include a piezoelectric material (or an electroactive material) having a piezoelectric characteristic. The vibration generator 510 may autonomously vibrate (or displace or drive) based on a vibration (or a displacement or driving) of a piezoelectric material generated by the driving signal applied thereto, or may vibrate (or displace or drive) the vibration member 100. For example, the vibration generator 510 may vibrate (or displace or drive) as contraction and/or expansion are alternately repeated by a piezoelectric effect (or a piezoelectric characteristic). For example, the vibration generator 510 may vibrate (or displace or drive) in a vertical direction (or a thickness direction) Z as contraction and/or expansion are alternately repeated by an inverse piezoelectric effect.

The vibration generator 510 may be configured to have flexibility. For example, vibration generator 510 may be configured to be bent in a non-planar shape including a curved surface.

The vibration generator 510 according to an example embodiment of the present disclosure may include a tetragonal shape which has a first length parallel to a first direction X and a second length parallel to a second direction Y intersecting with the first direction X. For example, the vibration generator 510 may include a square shape where the first length is the same as the second length, or may include a rectangular shape where the first length differs from the second length.

The first connection member 520 may be connected or coupled to one of a first surface and a second surface, which is different from (or opposite to) the first surface, of the vibration generator 510. For example, in the vibration generator 510, the first surface may be a top surface, a front surface, a forward surface, or an upper surface. In the vibration generator 510, the second surface may be a lower surface, a rear surface, a bottom surface, a backside surface, or a backward surface. For example, the first connection member 520 may be an adhesive member or a first adhesive member.

The first connection member 520 according to an example embodiment of the present disclosure may include an adhesive layer (or a tacky layer) which is relatively strong in adhesive force or attaching force. For example, the first connection member 520 may include a double-sided adhesive tape, a double-sided foam pad, or a tacky sheet. For example, when the first connection member 520 includes a tacky sheet (or a tacky layer), the first connection member 520 may include only an adhesive layer or a tacky layer without a base member such as a plastic material or the like.

The adhesive layer (or a tacky layer) of the first connection member 520 according to an example embodiment of the present disclosure may include epoxy, acrylic, silicone, or urethane, but embodiments of the present disclosure are not limited thereto. The adhesive layer (or a tacky layer) of the first connection member 520 according to another example embodiment of the present disclosure may include a pressure sensitive adhesive (PSA), an optically clear adhesive (OCA), or an optically clear resin (OCR), but embodiments of the present disclosure are not limited thereto.

The plate 530 may be connected to or attached on the first connection member 520. For example, the plate 530 may have a size or an area which is greater than the vibration generator 510. For example, a center portion of the plate 530 may be aligned or positioned at a center portion of the vibration generator 510. The plate 530 may be coupled to or attached on the curved portion 315 of the supporting portion 300 illustrated in FIG. 3 by the second connection member 540.

According to an example embodiment of the present disclosure, the vibration generator 510 may have a modulus which is greater than a modulus (or a young's modulus) of each of the first connection member 520, the plate 530, and the second connection member 540 or may have a modulus which is equal to a modulus (or a young's modulus) of each of the first connection member 520 and the second connection member 540 and is greater than a modulus (or a young's modulus) of the plate 530. Accordingly, the vibration generator 510 may be bent in a curved shape. For example, the plate 530 may have a modulus which is smaller than the vibration generator 510. Therefore, the vibration generator 510 may be bent in a shape corresponding to the curved portion 315 of the supporting portion 300 through the first connection member 520, the plate 530, and the second connection member 540, thereby enhancing the reliability of sound reproduction.

In addition, the vibration generator 510 according to an example embodiment of the present disclosure may have enhanced adhesiveness to the curved portion 315 of the supporting portion 300 by the first connection member 520, the plate 530, and the second connection member 540, thereby enhancing the reliability of sound reproduction and enhancing a sound characteristic and/or a sound pressure level characteristic of the low-pitched sound band. For example, when a modulus of the plate 530 is greater than the vibration generator 510, the vibration generator 510 may be difficult to be bent in a shape corresponding to the curved portion 315 of the supporting portion 300, and adhesiveness to the curved portion 315 of the supporting portion 300 by the first connection member 520, the plate 530, and the second connection member 540 may be reduced. Accordingly, the reliability of sound reproduction may be reduced, and a sound characteristic and/or a sound pressure level characteristic of the low-pitched sound band may be reduced.

According to an example embodiment of the present disclosure, the plate 530 may include a material having a material characteristic suitable for that the vibration generator 510 is bent in a curved shape. For example, the plate 530 may include a material having stiffness which is smaller than a bending stiffness of the vibration generator 510. The plate 530 may include one or more materials of metal, glass, plastic, rubber, fiber, leather, wood, cloth, and paper. For example, the plate 530 may be a supporting plate, a stiffness plate, a transmission plate, an intermediate plate, or a vibration transmission plate, but embodiments of the present disclosure are not limited thereto.

The second connection member 540, as illustrated in FIG. 5, may connect or couple the plate 530 to the curved portion 315 of the supporting portion 300. For example, the second connection member 540 may be disposed between the curved portion 315 of the supporting portion 300 and the plate 530. For example, the second connection member 540 may interposed between the curved portion 315 of the supporting portion 300 and a front periphery portion of the plate 530.

The second connection member 540 may include an adhesive layer (or a tacky layer) which is relatively strong in adhesive force or attaching force. The second connection member 540 may include an adhesive material having a modulus which differs from the first connection member 520. For example, the first connection member 520 may have a modulus (or an adhesive force or hardness) which is greater than the second connection member 540, so that the plate 530 and the vibration generator 510 are smoothly bent in a curved shape.

The second connection member 540 according to an example embodiment of the present disclosure may include an opening portion 541. Thus, the second connection member 540 may be disposed or interposed between the curved portion 315 of the supporting portion 300 and the front periphery portion of the plate 530. For example, the second connection member 540 may be configured in a tetragonal band shape including the opening portion 541.

The second connection member 540 according to another example embodiment of the present disclosure may have a structure where the second connection member 540 is divided into four or more portions to correspond to or overlap the front periphery portion of the plate 530.

In the vibration apparatus 500 or the first and second vibration apparatuses 500-1 and 500-2 according to an example embodiment of the present disclosure, the vibration generator 510 may be coupled to or attached on the curved portion 315 of the supporting portion 300 through the first connection member 520, the plate 530, and the second connection member 540, and thus, may be in a state (or may include a state) in which the vibration generator 510 receives a pre-stress (or a pre-tension stress) or is bent in a curved shape, based on a curved shape of the curved portion 315. Accordingly, the vibration generator 510 may vibrate in a state where the vibration generator 510 receives a pre-stress (or a pre-tension stress) or is bent in a curved shape, and thus, a second moment of inertia may increase or a vibration direction may be implemented as a single direction.

The vibration apparatus 500 or the first and second vibration apparatuses 500-1 and 500-2 according to the first example embodiment of the present disclosure may further include a pad 550.

The pad 550 may be coupled to or attached on the second surface of the vibration generator 510. For example, the pad 550 may be coupled to or attached on a center portion of the second surface of the vibration generator 510. The pad 550 may have a size which is smaller than or equal to the vibration generator 510. For example, the pad 550 may have a polygonal pillar shape or a circular pillar shape, but embodiments of the present disclosure are not limited thereto.

The pad 550 according to an example embodiment of the present disclosure may include a material having stiffness which is smaller than a bending stiffness of the vibration generator 510. The pad 550 according to another example embodiment of the present disclosure may include an elastic material which may act as a mass (or a weight) on the vibration generator 510.

The pad 550 according to an example embodiment of the present disclosure may increase a mass of the vibration generator 510, and thus, may reduce a lowest resonance frequency (or a lowest natural frequency) of the vibration generator 510. Therefore, the vibration generator 510 may vibrate at a relatively low frequency due to a lowest resonance frequency (or a lowest natural frequency) based on an increase in mass caused by the pad 550. Accordingly, a sound characteristic and/or a sound pressure level characteristic of a low-pitched sound band generated based on a vibration of the vibration apparatus 500 may be enhanced. For example, the pad 550 may be a resonance pad, a mass member, a weight clapper, or a weight member. For example, the low-pitched sound band may be about 300 Hz or about 500 Hz or less, but embodiments of the present disclosure are not limited thereto.

Figure 6:
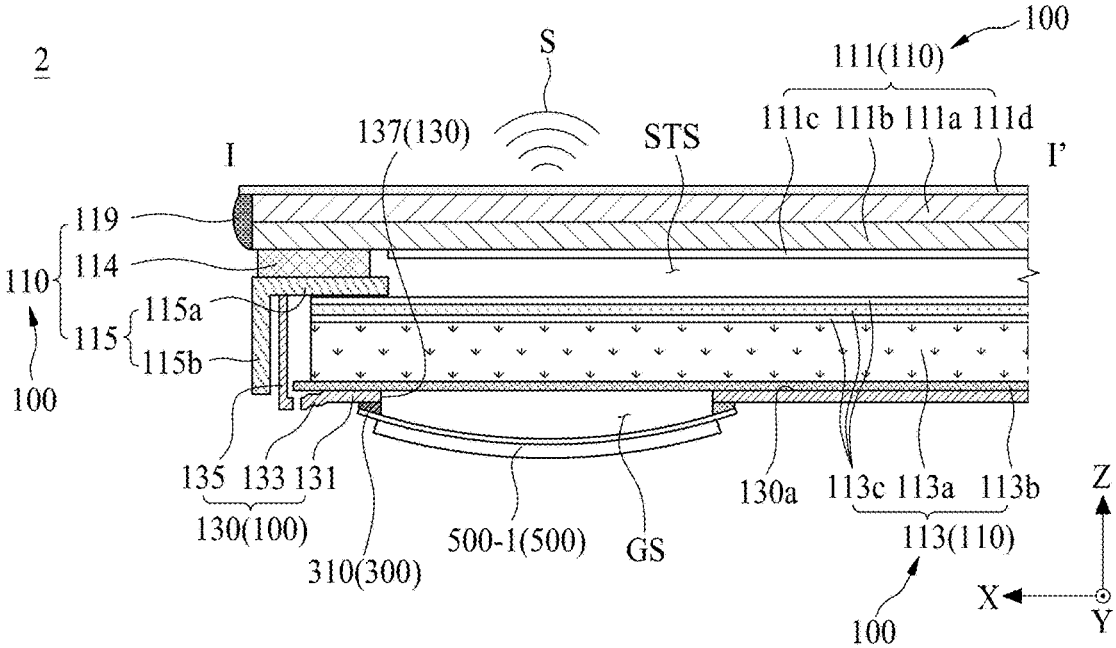
FIG. 6 is an example of a cross-sectional view taken along line I-I' illustrated in FIG. 2.
Figure 7:
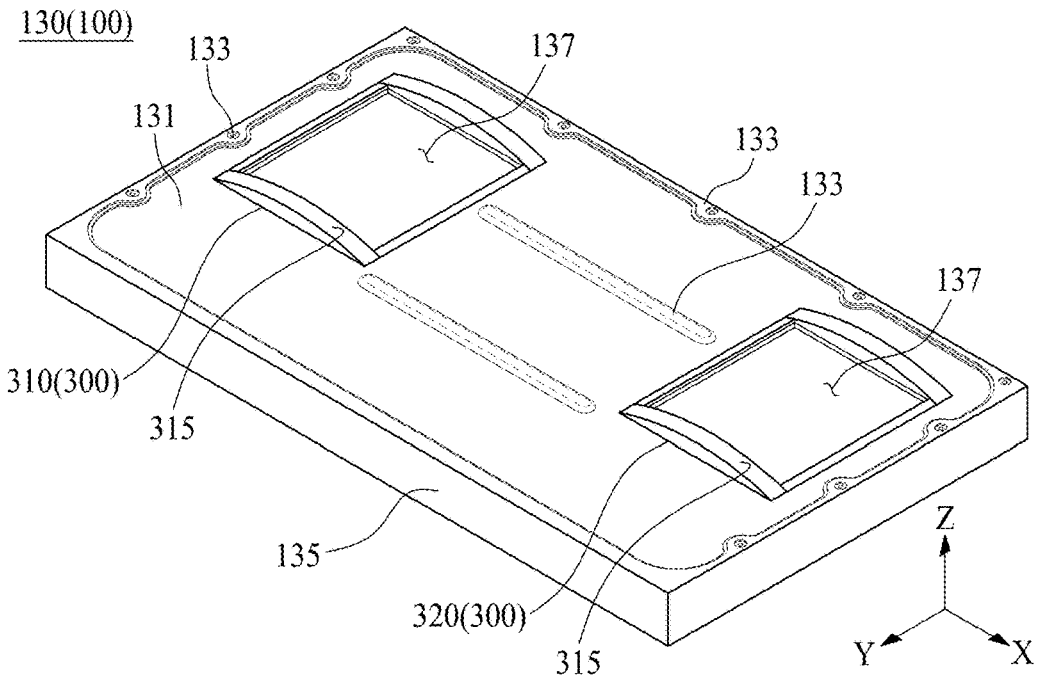
FIG. 7 is an example of a rear perspective view illustrating a cover member illustrated in FIG. 6.

FIG. 6 is another example cross-sectional view taken along line I-I' illustrated in FIG. 2. FIG. 7 is an example of a rear perspective view illustrating a cover member illustrated in FIG. 6. FIGS. 6 and 7 illustrate an apparatus according to a second example embodiment of the present disclosure. FIGS. 6 and 7 illustrate an example embodiment where a hole is additionally provided in the apparatus described above with reference to FIGS. 1 to 5.

With reference to FIGS. 6 and 7, an apparatus 2 according to a second example embodiment of the present disclosure may include a vibration member 100, a supporting portion 300, and a vibration apparatus 500.

The vibration member 100 may include one or more holes 137 which overlap the supporting portion 300 or the vibration apparatus 500. For example, the cover member 130 of the vibration member 100 may include one or more holes 137 which overlap the supporting portion 300 or the vibration apparatus 500. Except that the one or more holes 137 are configured at the cover member 130, the vibration member 100 may be the same or substantially the same as that described above with reference to FIGS. 1 to 5, and thus, in the following description, the same or similar elements other than one or more holes and relevant elements may be referred to by like reference numerals, and their descriptions may be omitted for brevity.

The cover member 130 may include one or more holes 137 which overlap the vibration apparatus 500. The one or more holes 137 may be covered by the vibration apparatus 500. For example, the one or more holes 137 may be disposed between the pair of first supporting members (or supporting bars) 311 and 312 illustrated in FIG. 4. For example, the one or more holes 137 may be surrounded by the pair of first supporting members (or supporting bars) 311 and 312 and the pair of second supporting members (or supporting bars) 321 and 322 illustrated in FIG. 4.

The one or more holes 137 may be formed at a rear portion 131 of the cover member 130 to overlap the vibration apparatus 500. For example, the one or more holes 137 may be formed to pass through the curved portion 315 of the cover member 130 along a third direction Z. Therefore, the one or more holes 137 may be an opening portion, a communication portion, an opening hole, a communication hole, a through portion, a through port, a through hole, a supporting hole, a slit, a slot, or a sound through portion, but embodiments of the present disclosure are not limited thereto. For example, the third direction Z may be a thickness direction or a height direction of the cover member 130, or may be a Z-axis direction in an XYZ-axis direction.

The one or more holes 137 according to an example embodiment of the present disclosure may have the same shape as the vibration apparatus 500. For example, when the vibration apparatus 500 has a square shape, the one or more holes 137 may have a square shape, and when the vibration apparatus 500 has a rectangular shape, the one or more holes 137 may have a rectangular shape, but embodiments of the present disclosure are not limited thereto.

The one or more holes 137 may be provided between the vibration member 100 and the vibration apparatuses 500-1 and 500-2. Accordingly, the one or more holes 137 may provide a gap space GS between the vibration member 100 and the vibration apparatuses 500-1 and 500-2. Therefore, comparing with the apparatus 1 illustrated in FIG. 3, the gap space GS between the vibration member 100 and the vibration apparatuses 500 may enlarge by a volume (or a space) corresponding to a thickness of the rear portion 131 of the cover member 130 and a size of the one or more holes 137. For example, the gap space GS may be an air gap, a sound pressure level generating space, a sound space, a sound pressure level space, a sounding portion, a sounding box, a sound wave propagation path, a sound energy incident portion, or a sound path, but embodiments of the present disclosure are not limited thereto.

The one or more holes 137 may be disposed between the backlight 113 of the vibration member 100 and the vibration apparatuses 500-1 and 500-2. Accordingly, the one or more holes 137 may provide the gap space GS between the backlight 113 and the vibration apparatuses 500-1 and 500-2. For example, the one or more holes 137 may provide the gap space GS between the reflective sheet 113b of the backlight 113 and the vibration apparatuses 500-1 and 500-2.

Each of the first and second vibration apparatuses 500-1 and 500-2 of the vibration apparatus 500 may be connected to or attached on the first and second curved portions 315 to cover the one or more holes 137 and may vibrate in a state where the first and second vibration apparatuses 500-1 and 500-2 receive a pre-stress (or a pre-tension stress) or are bent in a curved shape, and thus, a second moment of inertia may increase or a vibration direction may be implemented as a single direction.

Each of the first and second vibration apparatuses 500-1 and 500-2 of the vibration apparatus 500 may face a rear surface of the vibration member 100 or directly face a rear surface of the vibration member 100 through the one or more holes 137. For example, each of the first and second vibration apparatuses 500-1 and 500-2 may face the backlight 113 or directly face the backlight 113 of the vibration member 100 through the one or more holes 137. For example, each of the first and second vibration apparatuses 500-1 and 500-2 may face the reflective sheet 113b of the backlight 113 or directly face the reflective sheet 113b of the backlight 113 through the one or more holes 137. Therefore, a sound (or a sound wave) generated based on driving of each of the first and second vibration apparatuses 500-1 and 500-2 may be directly transferred to the display member 110 of the vibration member 100 through the one or more holes 137 or the gap space GS. For example, the sound (or the sound wave) generated based on driving of each of the first and second vibration apparatuses 500-1 and 500-2 may be directly transferred to the backlight 113 of the display member 110 through the one or more holes 137 or the gap space GS. Accordingly, a vibration of each of the first and second vibration apparatuses 500-1 and 500-2 may be efficiently transferred to the display member 110 or the vibration member 100, and thus, a sound characteristic and/or a sound pressure level characteristic generated based on a vibration of the display member 110 or the vibration member 100 may be enhanced. For example, each of the first and second vibration apparatuses 500-1 and 500-2 may vibrate based on a driving signal to output a sound (or a sound wave) to the gap space GS, a sound generated based on a vibration of the backlight 113 based on a sound of the gap space GS may be output to a sound transfer space STS, and a sound and/or a haptic feedback may be generated based on a vibration of the display panel 111 based on the sound of the gap space GS.

The apparatus 2 according to the second example embodiment of the present disclosure may vibrate in a state where the vibration apparatus 500 receives a pre-stress (or a pre-tension stress) or is bent in a curved shape, and thus, a second moment of inertia in the vibration apparatus 500 may increase or a vibration direction of the vibration apparatus 500 may be implemented as a single direction. Accordingly, a sound characteristic and/or a sound pressure level characteristic generated by a vibration of the vibration member 100 based on a vibration of the vibration apparatus 500 may be enhanced. In addition, the apparatus 2 according to the second example embodiment of the present disclosure may include the one or more holes 137 which are formed at the vibration member 100 or the cover member 130, and thus, a sound (or a sound wave) generated based on a vibration of the vibration apparatus 500 may be directly transferred to the display member 110. Accordingly, the transfer efficiency of a vibration may increase, and a sound characteristic and/or a sound pressure level characteristic generated based on a vibration of the vibration member 100 or the cover member 130 may be further enhanced.

Figure 8:
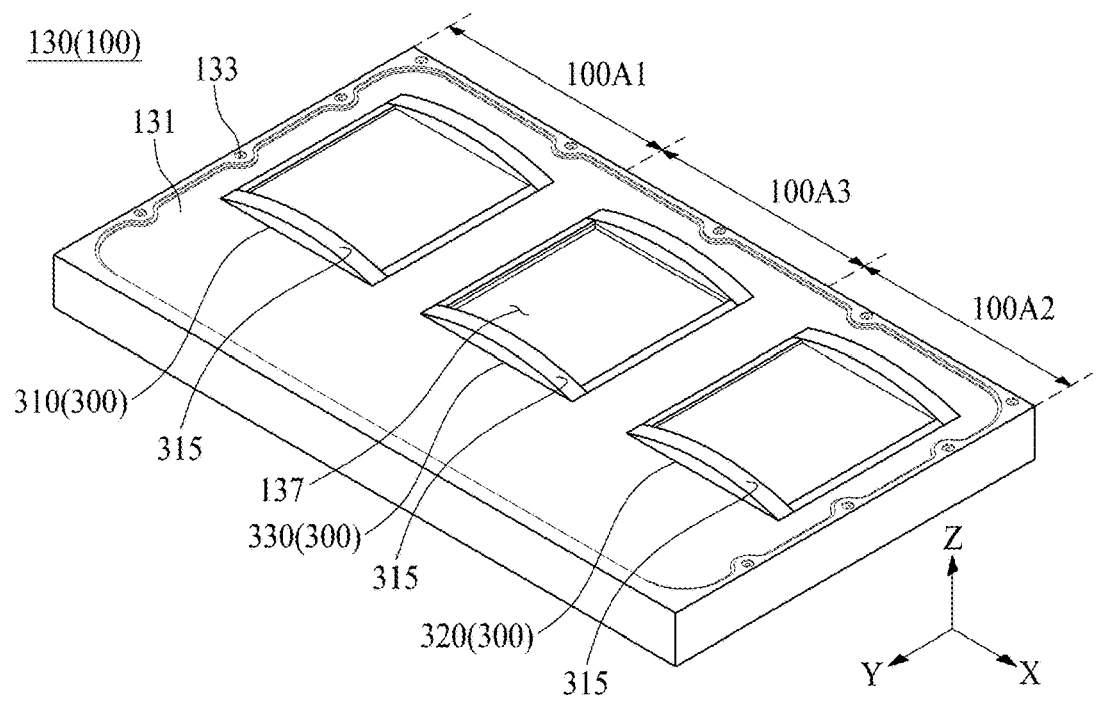
FIG. 8 is a rear perspective view illustrating a supporting portion and a cover member according to another example embodiment of the present disclosure.

FIG. 8 is a rear perspective view illustrating a supporting portion and a cover member according to another example embodiment of the present disclosure. FIG. 8 illustrates an example embodiment implemented by modifying the supporting portion and the cover member illustrated in FIG. 7.

With reference to FIGS. 6 and 8, a rear surface of a vibration member 100 or a rear portion 131 of a cover member 130 according to another example embodiment of the present disclosure may include a first region 100A1, a second region 100A2, and a third region 100A3. For example, the rear surface of a vibration member 100 or the rear portion 131 of the cover member 130 may include first to third regions 100A1, 100A2, and 100A3, with respect to a first length (or a widthwise length) parallel to the first direction X.

The first region 100A1 may be a first rear region, a left region, or a rear left region. The second region 100A2 may be a second rear region, a right region, or a rear right region. The third region 100A3 may be a region between the first region 100A1 and the second region 100A2. For example, the third region 100A3 may be a center region including a center line having a first length of a cover member 130.

A supporting portion 300 may include a curved portion 315 which is disposed in each of the first to third regions 100A1, 100A2, and 100A3 of the rear portion 131 of the cover member 130 or the vibration member 100. For example, the supporting portion 300 may include first to third supporting portions 310, 320, and 330 which are respectively disposed in the first to third regions 100A1, 100A2, and 100A3 and each include the curved portion 315.

Each of the first to third supporting portions 310, 320, and 330 may be coupled or connected to the rear surface of the vibration member 100 or the rear portion 131 of the cover member 130 to have the same size and the same shape. Each of the first to third supporting portions 310, 320, and 330 may have a square shape or a rectangular shape. The curved portion 315 of each of the first to third supporting portions 310, 320, and 330 may have the same curvature. The curved portion 315 of each of the first to third supporting portions 310, 320, and 330 may be the same or substantially the same as that described above with reference to FIGS. 3 and 4, and thus, a repetitive description thereof may be omitted for brevity.

The vibration apparatus 500 may include first to third vibration apparatuses disposed at the curved portion 315 of each of the first to third supporting portions 310, 320, and 330. Each of the first to third vibration apparatuses may vibrate in a state where each of the first to third vibration apparatuses receives a pre-stress (or a pre-tension stress) or is bent in a curved shape based on the curvature of the curved portion 315, and thus a second moment of inertia may increase or a vibration direction may be implemented as a single direction.

The rear surface of the vibration member 100 or the cover member 130 may further include one or more holes 137 which overlap the vibration apparatus 500 disposed at one or more of the first to third supporting portions 310, 320, and 330. For example, the one or more holes 137 may be configured at the rear portion 131 of the cover member 130 to overlap a vibration apparatus 500 disposed at the third supporting portion 330. Except that the one or more holes 137 are formed at the rear portion 131 of the cover member 130 to overlap the vibration apparatus 500 disposed at the third supporting portion 330, the one or more holes 137 may be the same or substantially the same as those described above with reference to FIGS. 6 and 7, and thus, their repetitive descriptions may be omitted for brevity. Accordingly, a sound (or a sound wave) generated based on a vibration of the vibration apparatus 500 disposed at the third supporting portion 330 may be directly transferred to the third region 100A3 of a display member 110 through the one or more holes 137, and thus, the transfer efficiency of a vibration may increase and a sound characteristic and/or a sound pressure level characteristic of a low-pitched sound band generated based on a vibration of the third region 100A3 of the display member 110 or the vibration member 100 may be further enhanced.

According to an example embodiment of the present disclosure, each of the first to third vibration apparatuses disposed at the curved portion 315 of each of the first to third supporting portions 310, 320, and 330 may be configured to generate or output a sound of the same pitched sound band. Therefore, the apparatus 2 according to the second example embodiment of the present disclosure may output a stereo sound due to a sound which is output from each of a left portion, a right portion, and a center portion (or a middle portion) of the vibration member 100 by a vibration of the vibration member 100 based on a vibration of each of the first to third vibration apparatuses and may have a 3-channel sound output characteristic.

According to another example embodiment of the present disclosure, one or more of the first to third vibration apparatuses disposed at the curved portion 315 of each of the first to third supporting portions 310, 320, and 330 may be configured to generate or output sounds of different pitched sound bands. For example, the third vibration apparatus 500-3 may be configured to generate or output a sound of the low-pitched sound band and each of the first and second vibration apparatuses 500-1 and 500-2 may be configured to generate or output a sound of a pitched sound band which is broader than the third vibration apparatus 500-3, but embodiments of the present disclosure are not limited thereto. Therefore, the apparatus 2 according to the second example embodiment of the present disclosure may implement a sound, for example, a stereo sound through a left sound and a right sound which are output based on a vibration of the vibration member 100 based on driving of each of the first and second vibration apparatuses, and a sound characteristic and/or a sound pressure level characteristic of the low-pitched sound band may be enhanced due to a sound of the low-pitched sound band output based on a vibration of the vibration member 100 based on driving of the third vibration apparatus.

Figure 9:
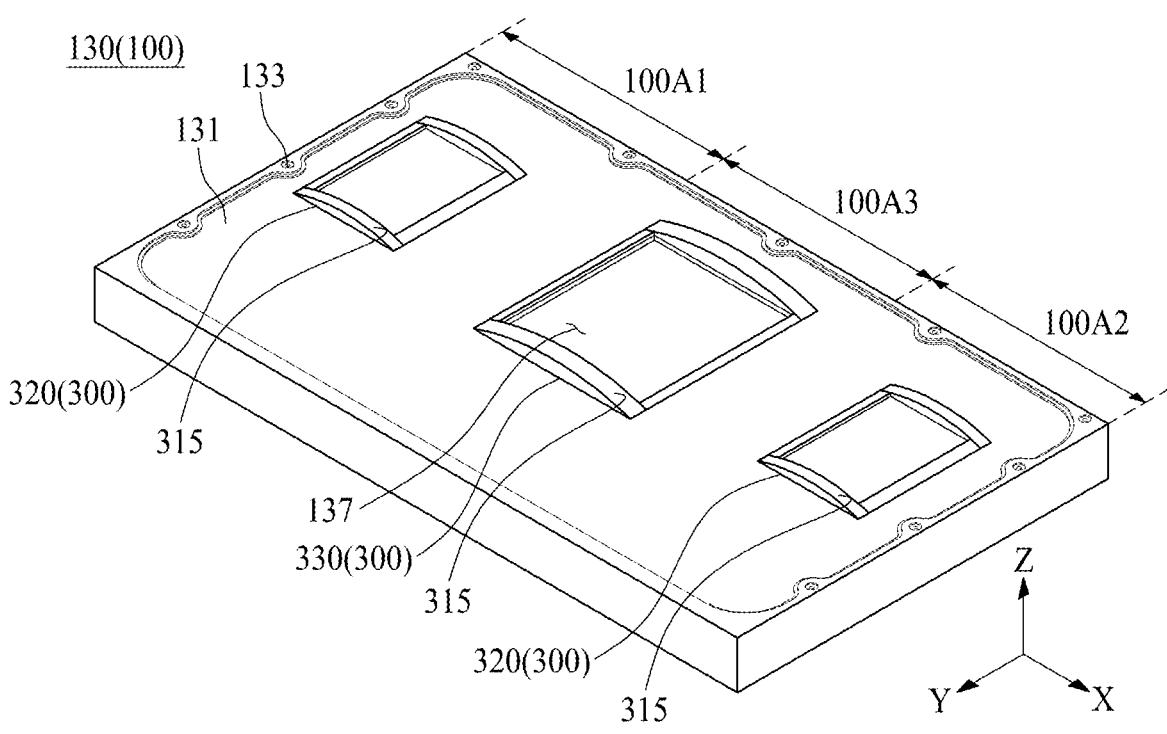
FIG. 9 is a rear perspective view illustrating a supporting portion and a cover member according to another example embodiment of the present disclosure.

FIG. 9 is a rear perspective view illustrating a supporting portion and a cover member according to another example embodiment of the present disclosure. FIG. 9 illustrates an example embodiment implemented by modifying the first and second supporting portions illustrated in FIG. 8.

With reference to FIGS. 6 and 9, a supporting portion 300 according to another example embodiment of the present disclosure may include first to third supporting portions 310, 320, and 330 which are respectively disposed in first to third regions 100A1, 100A2, and 100A3 of a rear portion 131 of a cover member 130 or a vibration member 100 and each include a curved portion 315.

One or more of the first to third supporting portions 310, 320, and 330 may have different sizes. For example, each of the first and second supporting portions 310 and 320 may be configured to have a size which is less than the third supporting portion 330.

Each of the first and second vibration apparatuses respectively disposed at the first and second supporting portions 310 and 320 may have a size which is relatively less than a third vibration apparatus disposed at the third supporting portion 330. Accordingly, each of first and second vibration apparatuses may be configured to generate a sound of a high-pitched sound band.

Figure 10:
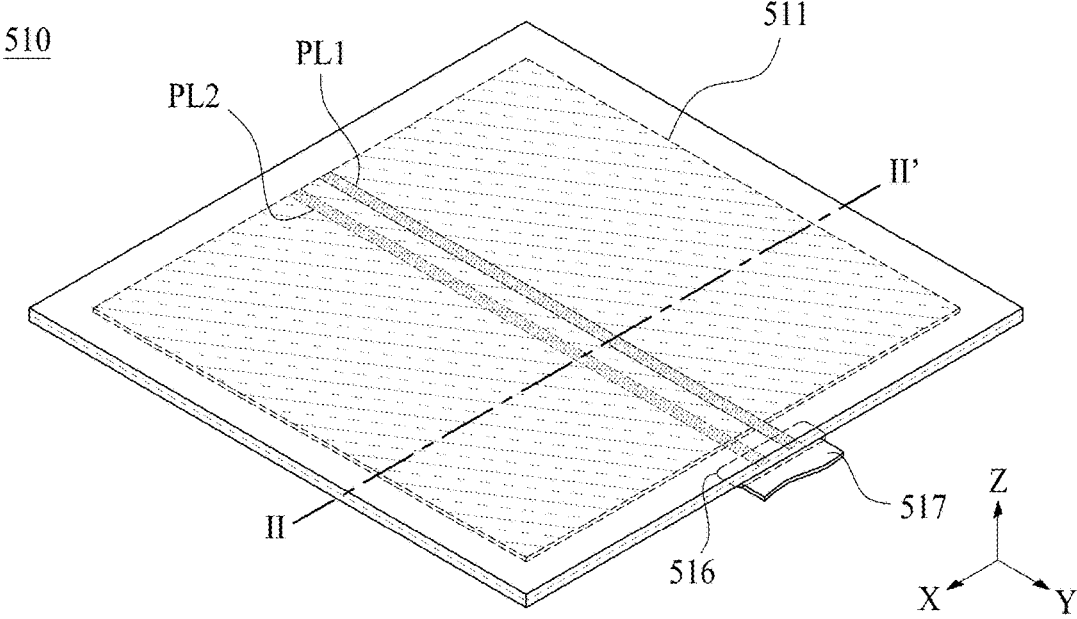
FIG. 10 illustrates a vibration generator according to another example embodiment of the present disclosure.
Figure 11:
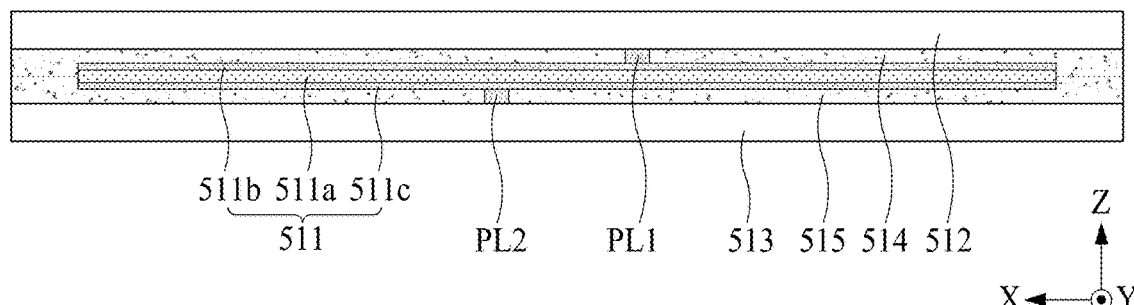
FIG. 11 is an example of a cross-sectional view taken along line II-II' illustrated in FIG. 10.
Figure 12:
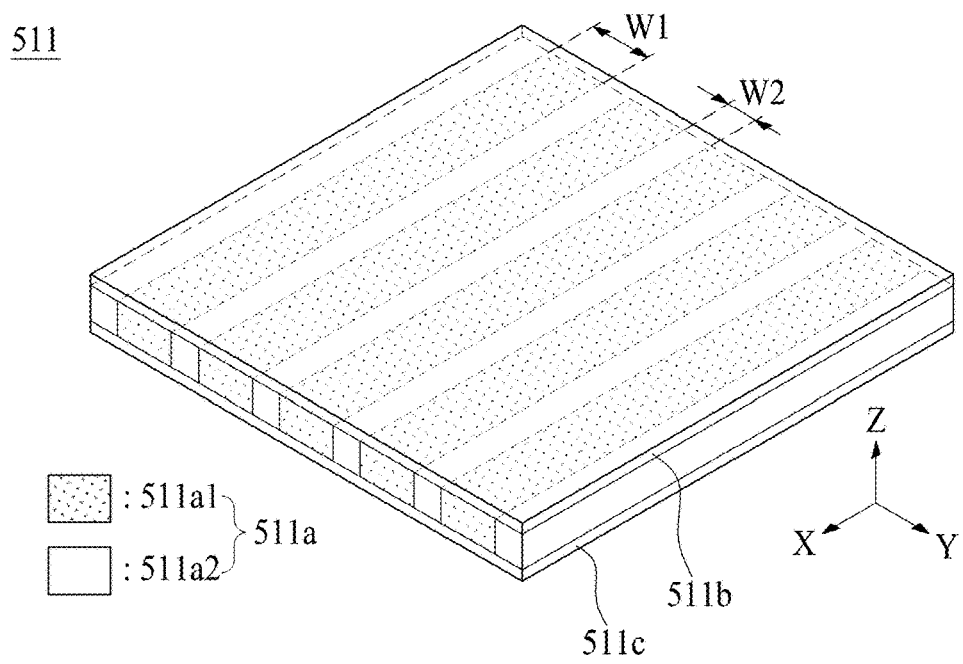
FIG. 12 is an example of a perspective view illustrating a vibration portion illustrated in FIG. 11.

FIG. 10 illustrates a vibration generator according to another example embodiment of the present disclosure. FIG. 11 is an example of a cross-sectional view taken along line II-II' illustrated in FIG. 10. FIG. 12 is an example of a rear perspective view illustrating a vibration portion illustrated in FIG. 11. FIGS. 10 to 12 illustrate another example embodiment of a vibration generator described above with reference to FIGS. 1 to 10.

With reference to FIGS. 10 to 12, a vibration generator 510 according to a first example embodiment of the present disclosure may be referred to as a flexible vibration structure, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film-type piezoelectric composite actuator, a film speaker, a film-type piezoelectric speaker, or a film-type piezoelectric composite speaker, or the like, but embodiments of the present disclosure are not limited thereto.

The vibration generator 510 according to the first example embodiment of the present disclosure may include a vibration portion 511. The vibration portion 511 may include a vibration layer 511a, a first electrode layer 511b, and a second electrode layer 511c.

The vibration layer 511a may include a piezoelectric material (or an electroactive material) which includes a piezoelectric effect. For example, the piezoelectric material may have a characteristic in which, when pressure or twisting (or bending) is applied to a crystalline structure by an external force, a potential difference occurs due to dielectric polarization caused by a relative position change of a positive (+) ion and a negative (−) ion, and a vibration is generated by an electric field based on a reverse voltage applied thereto. The vibration layer 511a may be referred to as a piezoelectric layer, a piezoelectric material layer, an electroactive layer, a piezoelectric material portion, an electroactive portion, a piezoelectric structure, a piezoelectric composite layer, a piezoelectric composite, or a piezoelectric ceramic composite, or the like, but embodiments of the present disclosure are not limited thereto. The vibration layer 511*a* may be formed of a transparent, semi-transparent, or opaque piezoelectric material. The vibration layer 511*a* may be transparent, semi-transparent, or opaque.

The vibration layer 511*a* according to an example embodiment of the present disclosure may include a plurality of first portions 511*a*1 and a plurality of second portions 511*a*2. For example, the plurality of first portions 511*a*1 and the plurality of second portions 511*a*2 may be alternately and repeatedly arranged along a first direction X (or a second direction Y). For example, the first direction X may be a widthwise direction of the vibration layer 511*a*, the second direction Y may be a lengthwise direction of the vibration layer 511*a*, but embodiments of the present disclosure are not limited thereto, the first direction X may be the lengthwise direction of the vibration layer 511*a*, and the second direction Y may be the widthwise direction of the vibration layer 511*a*.

Each of the plurality of first portions 511*a*1 may be configured as an inorganic material portion. The inorganic material portion may include a piezoelectric material, a composite piezoelectric material, or an electroactive material which includes a piezoelectric effect.

Each of the plurality of first portions 511*a*1 may be configured as a ceramic-based material for generating a relatively high vibration, or may be configured as a piezoelectric ceramic having a perovskite-based crystalline structure. The perovskite crystalline structure may have a piezoelectric effect and an inverse piezoelectric effect, and may be a structure having orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A", and "B" may be cations, and "O" may be anions. For example, each of the plurality of first portions 511*a*1 may include at least one or more of lead (II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

The vibration layer 511*a* or first portions 511*a*1 according to another example embodiment of the present disclosure may include one or more of lead (Pb), zirconium (Zr), titanium (Ti), zinc (Zn), nickel (Ni), and niobium (Nb), but embodiments of the present disclosure are not limited thereto.

The vibration layer 511*a* or first portions 511*a*1 according to another example embodiment of the present disclosure may include a lead zirconate titanate (PZT)-based material, including lead (Pb), zirconium (Zr), and titanium (Ti), or may include a lead zirconate nickel niobate (PZNN)-based material, including lead (Pb), zirconium (Zr), nickel (Ni), and niobium (Nb), but embodiments of the present disclosure are not limited thereto. In another example, the vibration layer 511*a* or first portions 511*a*1 may include at least one or more of calcium titanate ($CaTiO_3$), $BaTiO_3$, and $SrTiO_3$, each without lead (Pb), but embodiments of the present disclosure are not limited thereto.

Each of the plurality of first portions 511*a*1 according to an example embodiment of the present disclosure may be disposed between the plurality of second portions 511*a*2 and may have a first width W1 parallel to the first direction X (or the second direction Y) and a length parallel to the second direction Y (or the first direction X). Each of the plurality of second portions 511*a*2 may have a second width W2 parallel to the first direction X (or the second direction Y) and may have a length parallel to the second direction Y (or the first direction X). The first width W1 may be the same as or different from the second width W2. For example, the first width W1 may be greater than the second width W2. For example, the first portion 511*a*1 and the second portion 511*a*2 may include a line shape or a stripe shape which has the same size or different sizes. Therefore, the vibration layer 511*a* may include a 2-2 composite structure having a piezoelectric characteristic of a 2-2 vibration mode, and thus, may have a resonance frequency of 20 kHz or less, but embodiments of the present disclosure are not limited thereto. For example, a resonance frequency of the vibration layer 511*a* may vary based on at least one or more of a shape, a length, and a thickness, or the like.

In the vibration layer 511*a*, each of the plurality of first portions 511*a*1 and the plurality of second portions 511*a*2 may be disposed (or arranged) at the same plane (or the same layer) in parallel. Each of the plurality of second portions 511*a*2 may be configured to fill a gap between two adjacent first portions of the plurality of first portions 511*a*1 and may be connected to or attached on a second portion 511*a*2 adjacent thereto. Therefore, the vibration layer 511*a* may extend by a desired size or length based on the side coupling (or connection) of the first portion 511*a*1 and the second portion 511*a*2.

In the vibration layer 511*a*, a width (or a size) W2 of each of the plurality of second portions 511*a*2 may progressively decrease in a direction from a center portion to both peripheries (or both ends or both portions) of the vibration layer 511*a* or the vibration generator 510.

According to an example embodiment of the present disclosure, a second portion 511*a*2, having a largest width W2 among the plurality of second portions 511*a*2, may be located at a portion at which a highest stress may concentrate when the vibration layer 511*a* or the vibration generator 510 is vibrating in a vertical direction Z (or a thickness direction). A second portion 511*a*2, having a smallest width W2 among the plurality of second portions 511*a*2, may be located at a portion where a relatively low stress may occur when the vibration layer 511*a* or the vibration generator 510 is vibrating in the vertical direction Z. For example, the second portion 511*a*2, having the largest width W2 among the plurality of second portions 511*a*2, may be disposed at the center portion of the vibration layer 511*a*, and the second portion 511*a*2, having the smallest width W2 among the plurality of second portions 511*a*2 may be disposed at each of the both peripheries of the vibration layer 511*a*. Therefore, when the vibration layer 511*a* or the vibration generator 510 is vibrating in the vertical direction Z, interference of a sound wave or overlapping of a resonance frequency, each occurring in the portion on which the highest stress concentrates, may be reduced or minimized. Thus, a dip phenomenon of a sound pressure level occurring in the low-pitched sound band may be reduced, thereby improving flatness of a sound characteristic in the low-pitched sound band. For example, flatness of a sound characteristic may be a level of a deviation between a highest sound pressure level and a lowest sound pressure level.

In the vibration layer 511*a*, each of the plurality of first portions 511*a*1 may have different sizes (or widths). For example, a size (or a width) of each of the plurality of first portions 511*a*1 may progressively decrease or increase in a direction from the center portion to the both peripheries (or both ends or both portions) of the vibration layer 511*a* or the vibration generator 510. For example, in the vibration layer 511*a*, a sound pressure level characteristic of a sound may be enhanced and a sound reproduction band may increase, based on various natural vibration frequencies according to a vibration of each of the plurality of first portions 511a1 having different sizes.

The plurality of second portions 511a2 may be disposed between the plurality of first portions 511a1. Therefore, in the vibration layer 511a or the vibration generator 510, vibration energy by a link in a unit lattice of each first portion 511a1 may increase by a corresponding second portion 511a2, and thus, a vibration characteristic may increase, and a piezoelectric characteristic and flexibility may be secured. For example, the second portion 511a2 may include one or more of an epoxy-based polymer, an acrylic-based polymer, and a silicone-based polymer, but embodiments of the present disclosure are not limited thereto.

The plurality of second portions 511a2 according to an example embodiment of the present disclosure may be configured as an organic material portion. For example, the organic material portion may be disposed between the inorganic material portions, and thus, may absorb an impact applied to the inorganic material portion (or the first portion), may release a stress concentrating on the inorganic material portion to enhance the total durability of the vibration layer 511a or the vibration generator 510, and may provide flexibility to the vibration layer 511a or the vibration generator 510. Thus, the vibration generator 510 may have flexibility, and thus, may be bent in a shape which matches a shape of a curved portion of a supporting portion. For example, the vibration generator 510 may have flexibility, and thus, may be disposed along a shape corresponding to a shape of the curved portion of the supporting portion.

The organic material portion configured at the second portion 511a2 may include one or more of an organic material, an organic polymer, an organic piezoelectric material, or an organic non-piezoelectric material that has a flexible characteristic in comparison with the inorganic material portion of the first portions 511a1. For example, the second portion 511a2 may be referred to as an adhesive portion, an elastic portion, a bending portion, a damping portion, or a flexible portion, or the like each having flexibility, but embodiments of the present disclosure are not limited thereto.

The plurality of first portions 511a1 and the second portion 511a2 may be disposed on (or connected to) the same plane, and thus, the vibration layer 511a according to an example embodiment of the present disclosure may be of a single thin film or a single thin film type. For example, the vibration layer 511a may have a structure in which a plurality of first portions 511al are connected to one side. For example, the plurality of first portions 511a1 may have a connection structure throughout the vibration layer 511a. For example, the vibration layer 511a may be vibrated in a vertical direction by the first portion 511a1 having a vibration characteristic and may be bent in a curved shape by the second portion 511a2 having flexibility. In addition, in the vibration layer 511a according to an example embodiment of the present disclosure, a size of the first portion 511a1 and a size of the second portion 511a2 may be adjusted based on a piezoelectric characteristic and flexibility needed for the vibration layer 511a or the vibration generator 510. As an example embodiment of the present disclosure, when the vibration layer 511a needs a piezoelectric characteristic rather than flexibility, a size of the first portion 511a1 may be adjusted to be greater than that of the second portion 511a2. As another example embodiment of the present disclosure, when the vibration layer 511a needs flexibility rather than a piezoelectric characteristic, a size of the second portion 511a2 may be adjusted to be greater than that of the first portion 511al. Accordingly, a size of the vibration layer 511a may be adjusted based on a characteristic needed therefor, and thus, the vibration layer 511a may be easy to design.

The first electrode layer 511b may be disposed at a first surface (or an upper surface) of the vibration layer 511a. The first electrode layer 511b may be disposed at or coupled to a first surface of each of the plurality of first portions 511a1 and a first surface of each of the plurality of second portions 511a2 in common and may be electrically connected to the first surface of each of the plurality of first portions 511al. For example, the first electrode layer 511b may be a single-body electrode (or one electrode) shape which is disposed at the entire first surface of the vibration layer 511a. For example, the first electrode layer 511b may have substantially the same shape as that of the vibration layer 511a, but embodiments of the present disclosure are not limited thereto.

The second electrode layer 511c may be disposed at a second surface (or a rear surface) different from (or opposite to) the first surface of the vibration layer 511a. The second electrode layer 511c may be disposed at or coupled to a second surface of each of the plurality of first portions 511a1 and a second surface of each of the plurality of second portions 511a2 in common and may be electrically connected to the second surface of each of the plurality of first portions 511al. For example, the second electrode layer 511c may be a single-body electrode (or one electrode) shape which is disposed at the entire second surface of the vibration layer 511a. The second electrode layer 511c may have the same shape as the vibration layer 511a, but embodiments of the present disclosure are not limited thereto.

One or more of the first electrode layer 511b and the second electrode layer 511c according to an example embodiment of the present disclosure may be formed of a transparent conductive material, a semi-transparent conductive material, or an opaque conductive material. For example, the transparent conductive material or the semi-transparent conductive material may include indium tin oxide (ITO) or indium zinc oxide (IZO), but embodiments of the present disclosure are not limited thereto. The opaque conductive material may include aluminum (Al), copper (Cu), gold (Au), silver (Ag), molybdenum (Mo), a magnesium (Mg), or the like, or an alloy thereof, but embodiments of the present disclosure are not limited thereto.

The vibration layer 511a may be polarized (or poling) by a certain voltage applied to the first electrode layer 511b and the second electrode layer 511c in a certain temperature atmosphere, or a temperature atmosphere that may be changed from a high temperature to a room temperature, but embodiments of the present disclosure are not limited thereto. For example, the vibration layer 511a may alternately and repeatedly contract and/or expand based on an inverse piezoelectric effect according to a sound signal (or a voice signal or a driving signal) applied to the first electrode layer 511b and the second electrode layer 511c from the outside to vibrate. For example, the vibration layer 511a may vibrate based on a vertical-direction vibration and a planar direction vibration by the sound signal applied to the first electrode layer 511b and the second electrode layer 511c. The vibration layer 511a may increase the displacement of a vibration member by contraction and/or expansion of the planar direction, thereby further improving the vibration of the vibration member.

The vibration generator 510 according to the first example embodiment of the present disclosure may further include a first cover member 512 and a second cover member 513.

The first cover member 512 may be disposed at a first surface of the vibration portion 511. For example, the first cover member 512 may be configured to cover the first electrode layer 511*b*. Accordingly, the first cover member 512 may protect the first electrode layer 511*b*.

The second cover member 513 may be disposed at a second surface of the vibration portion 511. For example, the second cover member 513 may be configured to cover the second electrode layer 511*c*. Accordingly, the second cover member 513 may protect the second electrode layer 511*c*.

The first cover member 512 and the second cover member 513 according to an example embodiment of the present disclosure may each include one or more material of plastic, fiber, cloth, paper, leather, rubber, and wood, but embodiments of the present disclosure are not limited thereto. For example, each of the first cover member 512 and the second cover member 513 may include the same material or different material. For example, each of the first cover member 512 and the second cover member 513 may be a polyimide (PI) film or a polyethylene terephthalate (PET) film, but embodiments of the present disclosure are not limited thereto.

The first cover member 512 according to an example embodiment of the present disclosure may be connected or coupled to the first electrode layer 511*b* by a first adhesive layer 514. For example, the first cover member 512 may be connected or coupled to the first electrode layer 511*b* by a film laminating process using the first adhesive layer 514.

The second cover member 513 according to an example embodiment of the present disclosure may be connected or coupled to the second electrode layer 511*c* by a second adhesive layer 515. For example, the second cover member 513 may be connected or coupled to the second electrode layer 511*c* by a film laminating process using the second adhesive layer 515. For example, the vibration generator 510 may be implemented as one film by the first cover member 512 and the second cover member 513.

The first adhesive layer 514 may be disposed between the first electrode layer 511*b* and the first cover member 512. The second adhesive layer 515 may be disposed between the second electrode layer 511*c* and the second cover member 513. For example, the first adhesive layer 514 and second adhesive layer 515 may be configured between the first cover member 512 and the second cover member 513 to completely surround the vibration layer 511*a*, the first electrode layer 511*b*, and the second electrode layer 511*c*. For example, the vibration layer 511*a*, the first electrode layer 511*b*, and the second electrode layer 511*c* may be embedded or built-in between the first adhesive layer 514 and the second adhesive layer 515.

Each of the first adhesive layer 514 and second adhesive layer 515 according to an example embodiment of the present disclosure may include an electrically insulating material which has adhesiveness and is capable of compression and decompression. For example, each of the first adhesive layer 514 and the second adhesive layer 515 may include an epoxy resin, an acrylic resin, a silicone resin, or a urethane resin, but embodiments of the present disclosure are not limited thereto.

According to an example embodiment of the present disclosure, any one of the first cover member 512 and the second cover member 513 may be connected to the plate 530 by the first connection member 520 and may be coupled to or attached on the curved portion 315 of the supporting portion 300 by the second connection member 540, as illustrated in FIGS. 3 to 7.

The vibration generator 510 according to an example embodiment of the present disclosure may further include a first power supply line PL1 disposed at the first cover member 512, a second power supply line PL2 disposed at the second cover member 513, and a pad part 516 electrically connected to the first power supply line PL1 and the second power supply line PL2.

The first power supply line PL1 may be disposed between the first electrode layer 511*b* and the first cover member 512 and may be electrically connected to the first electrode layer 511*b*. The first power supply line PL1 may be extended long along the second direction Y and may be electrically connected to a central portion of the first electrode layer 511*b*. As an example embodiment of the present disclosure, the first power supply line PL1 may be electrically connected to the first electrode layer 511*b* by an anisotropic conductive film. As another example embodiment of the present disclosure, the first power supply line PL1 may be electrically connected to the first electrode layer 511*b* through a conductive material (or particle) included in the first adhesive layer 514.

The second power supply line PL2 may be disposed between the second electrode layer 511*c* and the second cover member 513 and may be electrically connected to the second electrode layer 511*c*. The second power supply line PL2 may be extended long along the second direction Y and may be electrically connected to a central portion of the second electrode layer 511*c*. As an example embodiment of the present disclosure, the second power supply line PL2 may be electrically connected to the second electrode layer 511*c* by an anisotropic conductive film. As another example embodiment of the present disclosure, the second power supply line PL2 may be electrically connected to the second electrode layer 511*c* through a conductive material (or particle) included in the second adhesive layer 515.

According to an example embodiment of the present disclosure, the first power supply line PL1 may be disposed not to overlap the second power supply line PL2. When the first power supply line PL1 is disposed not to overlap the second power supply line PL2, a short circuit between the first power supply line PL1 and the second power supply line PL2 may be prevented.

The pad part 516 may be configured at one periphery portion of any one of the first cover member 512 and the second cover member 513 to be electrically connected to one portion (or one end or one portion) of each of the first power supply line PL1 and the second power supply line PL2.

The pad part 516 according to an example embodiment of the present disclosure may include a first pad electrode electrically connected to one end (or one portion) of the first power supply line PL1, and a second pad electrode electrically connected to one end (or one portion) of the second power supply line PL2.

The first pad electrode may be disposed at one periphery portion of any one of the first cover member 512 and the second cover member 513 to be electrically connected to one portion of the first power supply line PL1. For example, the first pad electrode may pass through any one of the first cover member 512 and the second cover member 513 to be electrically connected to one portion of the first power supply line PL1.

The second pad electrode may be disposed in parallel with the first pad electrode to be electrically connected to one portion of the second power supply line PL2. For example, the second pad electrode may pass through any one of the first cover member 512 and the second cover member 513 to be electrically connected to one portion of the second power supply line PL2.

According to an example embodiment of the present disclosure, each of the first power supply line PL1, the second power supply line PL2, and the pad part 516 may be configured to be transparent, translucent, or opaque.

The pad part 516 according to another example embodiment of the present disclosure may be electrically connected to a signal cable 517.

The signal cable 517 may be electrically connected to the pad part 516 disposed at the vibration generator 510 and may supply the vibration generator 510 with a vibration driving signal (or a sound signal or a voice signal) provided from a sound processing circuit. The signal cable 517 according to an example embodiment of the present disclosure may include a first terminal electrically connected to the first pad electrode of the pad part 516 and a second terminal electrically connected to the second pad electrode of the pad part 516. For example, the signal cable 517 may be a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The sound processing circuit may generate an alternating current (AC) vibration driving signal including a first vibration driving signal and a second vibration driving signal based on a sound data provided from an external sound data generating circuit part. The first vibration driving signal may be one of a positive (+) vibration driving signal and a negative (−) vibration driving signal, and the second vibration driving signal may be one of a positive (+) vibration driving signal and a negative (−) vibration driving signal. For example, the first vibration driving signal may be supplied to the first electrode layer 511b through the first terminal of the signal cable 517, the first pad electrode of the pad part 516, and the first power supply line PL1. The second vibration driving signal may be supplied to the second electrode layer 511c through the second terminal of the signal cable 517, the second pad electrode of the pad part 516, and the second power supply line PL2.

According to an example embodiment of the present disclosure, the signal cable 517 may be configured to be transparent, semi-transparent, or opaque.

The vibration generator 510 according to another example embodiment of the present disclosure may be implemented as a thin film-type (or a thin film) where the first portion 511al having a piezoelectric characteristic and a second portion 511a2 having flexibility are alternately repeated and connected, and thus, the vibration generator 510 may be bent in a shape corresponding to a shape of the curved portion of the supporting portion or a shape of the vibration member. For example, when the vibration generator 510 is connected or coupled to the vibration member including various curved portions by the connection member, the vibration generator 510 may be bent in a curved shape along a shape of a curved portion of the vibration member and reliability against damage or breakdown may not be reduced despite being bent in a curved shape. In addition, in the vibration generator 510 according to another example embodiment of the present disclosure, a vibration width (or a displacement width) may be increased due to the flexible second portion 511a2 having flexibility. Thus, a sound characteristic and/or a sound pressure level characteristic generated based on a vibration of the vibration member may be enhanced.

Figure 13:
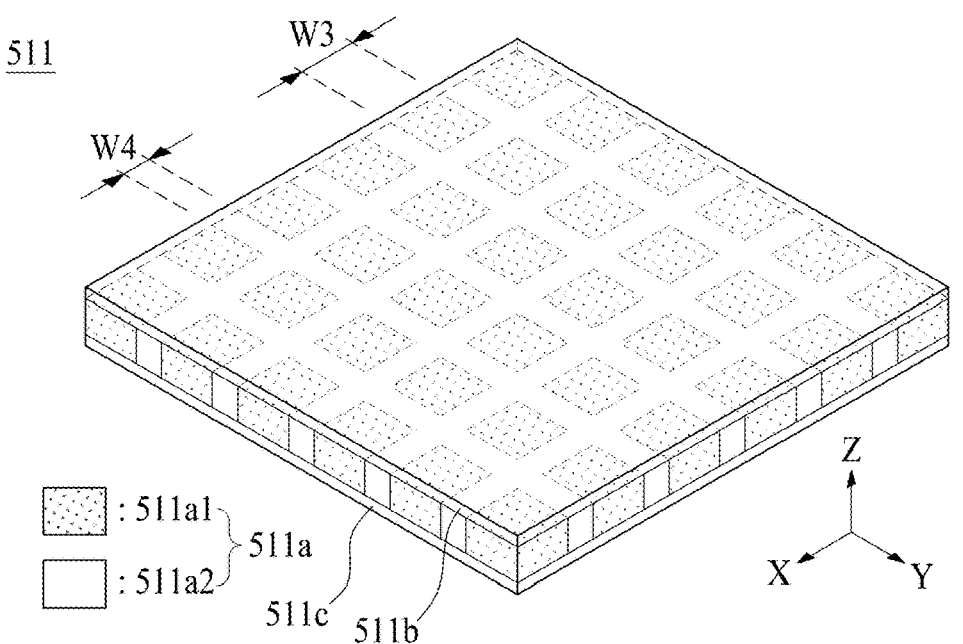
FIG. 13 is a perspective view illustrating another example embodiment of a vibration portion illustrated in FIG. 12.

FIG. 13 is a perspective view illustrating another example embodiment of a vibration portion illustrated in FIG. 12.

With reference to FIG. 13, the vibration layer 511a according to another example embodiment of the present disclosure may include a plurality of first portions 511a1, which are spaced apart from each other along a first direction X and a second direction Y, and a second portion 511a2 disposed between the plurality of first portions 511a1.

Each of the plurality of first portions 511a1 may be disposed to be spaced apart from each other along the first direction X and the second direction Y. For example, each of the plurality of first portions 511a1 may have a hexahedral shape (or a six-sided object shape) having the same size and may be disposed in a lattice shape. Each of the plurality of first portions 511a1 may include a piezoelectric material which may be the same or substantially the same as the first portion 511a1 described above with reference to FIGS. 10 to 12, and thus, like reference numerals may refer to like elements, and the repetitive description thereof may be omitted for brevity.

The second portion 511a2 may be disposed between the plurality of first portions 511al along each of the first direction X and the second direction Y. The second portion 511a2 may be configured to fill a gap or a space between two adjacent first portions 511a1 or to surround each of the plurality of first portions 511a1, and thus, may be connected to or attached on an adjacent first portion 511a1. According to an example embodiment of the present disclosure, a width W4 of a second portion 511a2 disposed between two first portions 511a1 adjacent to each other along the first direction X may be the same as or different from that of a width W3 of the first portion 511al, and the width W4 of a second portion 511a2 disposed between two first portions 511al adjacent to each other along the second direction Y may be the same as or different from that of the width W3 of the first portion 511a1. The second portion 511a2 may include an organic material which may be the same or substantially the same as the second portion 511a2 described above with reference to FIGS. 10 to 12, and thus, like reference numerals may refer to like elements, and the repetitive description thereof may be omitted for brevity.

The vibration layer 511a according to another example embodiment of the present disclosure may include a 1-3 composite structure having a piezoelectric characteristic of a 1-3 vibration mode, and thus, may have a resonance frequency of 30 MHz or less, but embodiments of the present disclosure are not limited thereto. For example, a resonance frequency of the vibration layer 511a may vary based on at least one or more of a shape, a length, and a thickness, or the like.

Figure 14:
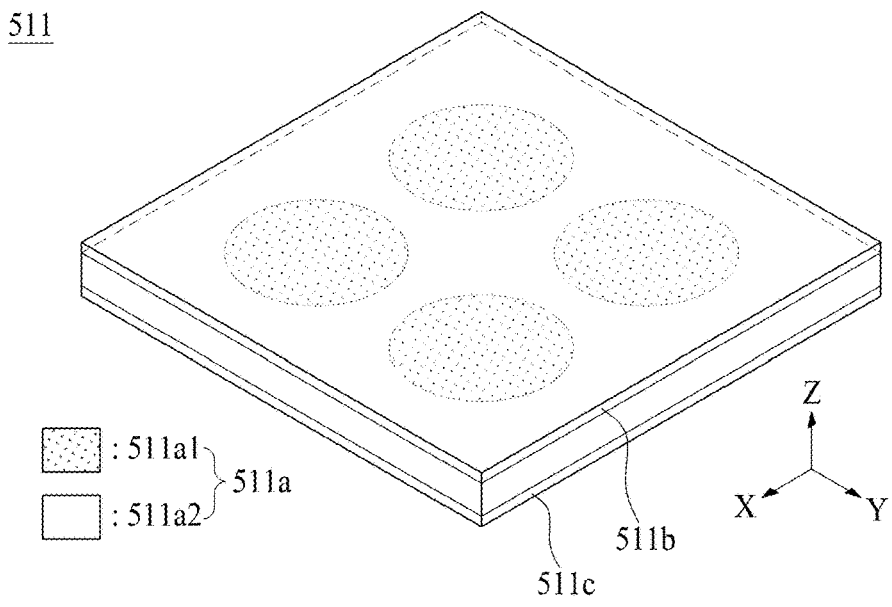
FIG. 14 is a perspective view illustrating another example embodiment of a vibration portion illustrated in FIG. 12.

FIG. 14 is a perspective view illustrating another example embodiment of a vibration portion illustrated in FIG. 12.

With reference to FIG. 14, the vibration layer 511a according to another example embodiment of the present disclosure may include a plurality of first portions 511a1, which are spaced apart from each other along a first direction X and a second direction Y, and a second portion 511a2 disposed between the plurality of first portions 511a1.

Each of the plurality of first portions 511a1 may have a flat structure of a circular shape. For example, each of the plurality of first portions 511a1 may have a circular plate shape, but embodiments of the present disclosure are not limited thereto. For example, each of the plurality of first portions 511a1 may have a dot shape including an oval shape, a polygonal shape, or a donut shape. Each of the plurality of first portions 511a1 may include a piezoelectric material which may be the same or substantially the same as the first portion 511*a*1 described above with reference to FIGS. 10 to 12, and thus, like reference numerals may refer to like elements, and the repetitive description thereof may be omitted for brevity.

The second portion 511*a*2 may be disposed between the plurality of first portions 511*al* along each of the first direction X and the second direction Y. The second portion 511*a*2 may be configured to surround each of the plurality of first portions 511*al*, and thus, may be connected to or attached on a side surface of each of the plurality of first portions 511*al*. Each of the plurality of first portions 511*a*1 and the second portion 511*a*2 may be disposed (or arranged) in parallel on the same plane (or the same layer). The second portion 511*a*2 may include an organic material which may be the same or substantially the same as the second portion 511*a*2 described above with reference to FIGS. 10 to 12, and thus, like reference numerals may refer to like elements, and the repetitive description thereof may be omitted for brevity.

Figure 15:
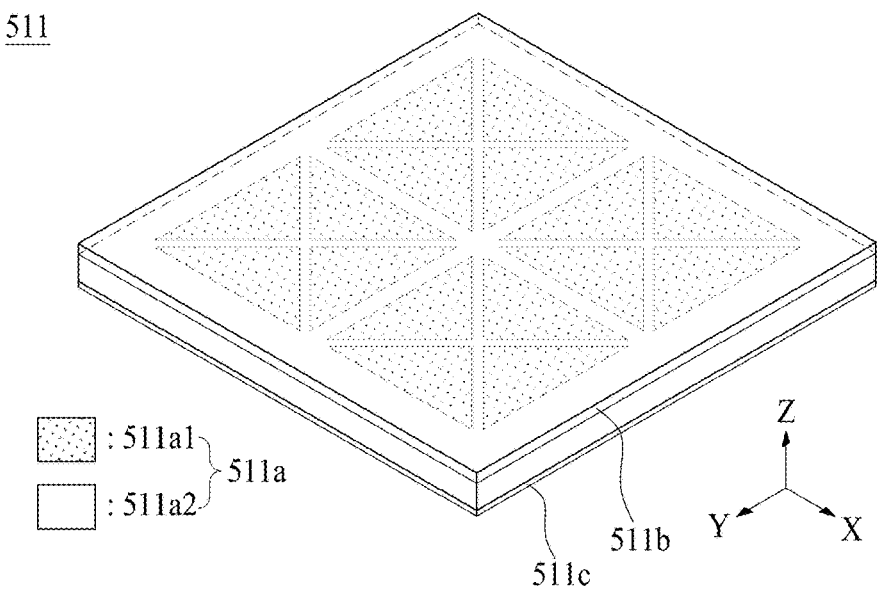
FIG. 15 is a perspective view illustrating another example embodiment of a vibration portion illustrated in FIG. 12.

FIG. 15 is a perspective view illustrating another example embodiment of a vibration portion illustrated in FIG. 12.

With reference to FIG. 15, the vibration layer 511*a* according to another example embodiment of the present disclosure may include a plurality of first portions 511*a*1, which are spaced apart from each other along a first direction X and a second direction Y, and a second portion 511*a*2 disposed between the plurality of first portions 511*al*.

Each of the plurality of first portions 511*a*1 may have a flat structure of a triangular shape. For example, each of the plurality of first portions 511*a*1 may have a triangular plate shape, but embodiments of the present disclosure are not limited thereto. Each of the plurality of first portions 511*a*1 may include a piezoelectric material which may be the same or substantially the same as the first portion 511*a*1 described above with reference to FIGS. 10 to 12, and thus, like reference numerals may refer to like elements, and the repetitive description thereof may be omitted for brevity.

According to an example embodiment of the present disclosure, four adjacent first portions 511*a*1 among the plurality of first portions 511*a*1 may be adjacent to each other to form a tetragonal (or a square shape or a quadri-lateral shape). Vertices of the four adjacent first portions 511*a*1 forming a tetragonal shape may be adjacent to each other in a center portion (or a central portion) of the tetragonal shape.

The second portion 511*a*2 may be disposed between the plurality of first portions 511*al* along each of the first direction X and the second direction Y. The second portion 511*a*2 may be configured to surround each of the plurality of first portions 511*al*, and thus, may be connected to or attached on a side surface of each of the plurality of first portions 511*al*. Each of the plurality of first portions 511*a*1 and the second portion 511*a*2 may be disposed (or arranged) in parallel on the same plane (or the same layer). The second portion 511*a*2 may include an organic material which may be the same or substantially the same as the second portion 511*a*2 described above with reference to FIGS. 10 to 12, and thus, like reference numerals may refer to like elements, and the repetitive description thereof may be omitted for brevity.

According to another example embodiment of the present disclosure, 2N (where N is a natural number greater than or equal to 2) adjacent first portions 511*a*1 of the plurality of first portions 511*a*1 having the triangular shape may be disposed adjacent to each other to form a 2N-angular shape. For example, six adjacent first portions 511*a*1 of the plurality of first portions 511*a*1 may be adjacent to each other to form a hexagonal shape (or a regularly hexagonal shape). Vertices of the six adjacent first portions 511*a*1 forming a hexagonal shape may be adjacent to each other in a center portion (or a central portion) of the hexagonal shape. The second portion 511*a*2 may be configured to surround each of the plurality of first portions 511*al*, and thus, may be connected to or attached on a side surface of each of the plurality of first portions 511*al*. Each of the plurality of first portions 511*a*1 and the second portion 511*a*2 may be disposed (or arranged) in parallel on the same plane (or the same layer).

Figure 16:
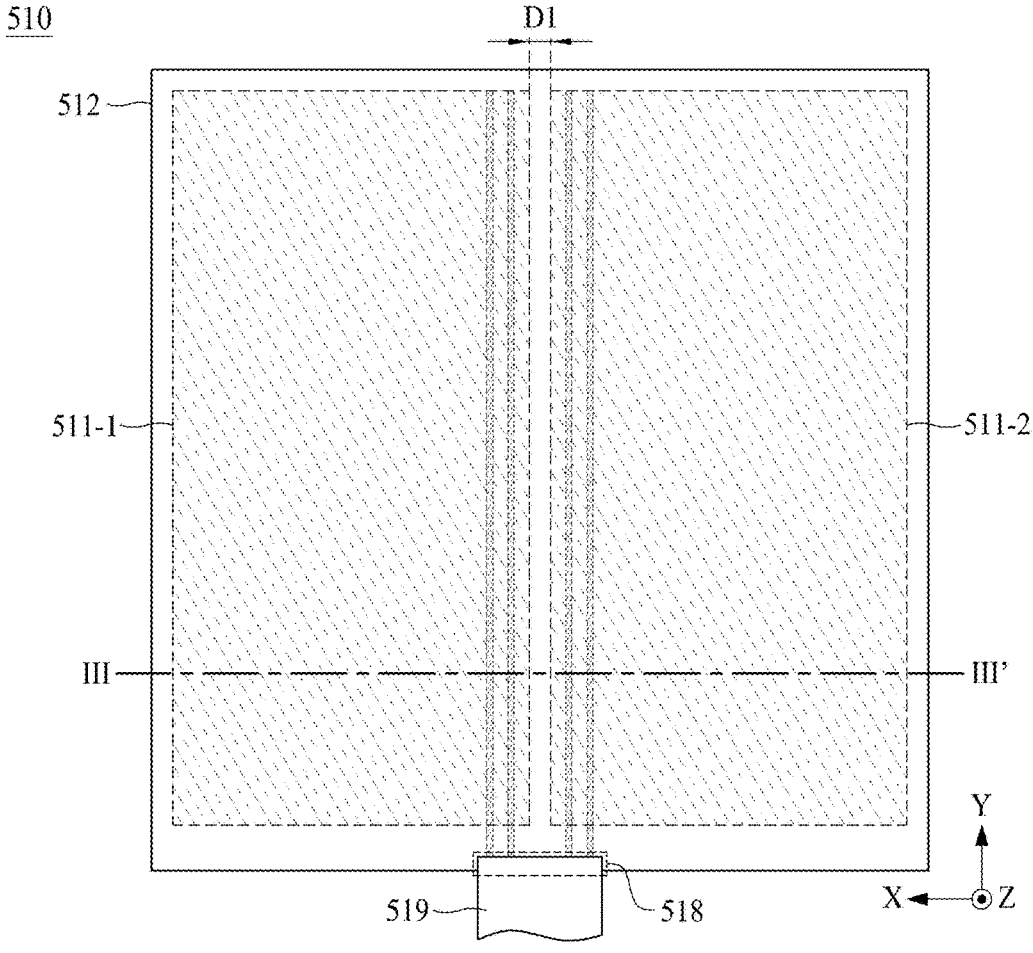
FIG. 16 illustrates a vibration generator according to another example embodiment of the present disclosure.
Figure 17:
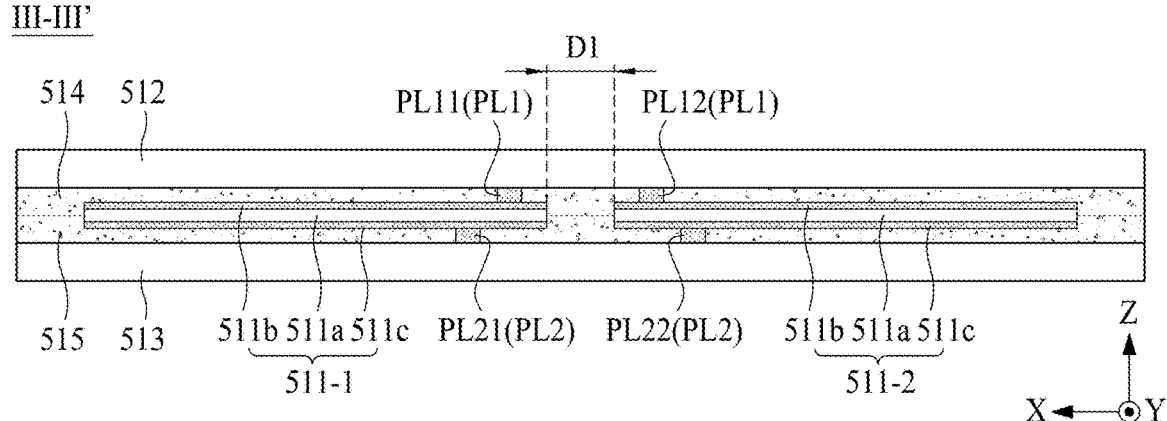
FIG. 17 is an example of a cross-sectional view taken along line III-III' illustrated in FIG. 16.

FIG. 16 illustrates a vibration generator according to another example embodiment of the present disclosure, and FIG. 17 is an example of a cross-sectional view taken along line III-III' illustrated in FIG. 16. FIGS. 16 and 17 illustrate another example embodiment of the vibration generator described with reference to FIGS. 1 to 9.

With reference to FIGS. 16 and 17, the vibration generator 510 according to another example embodiment of the present disclosure may include first and second vibration portions 511-1 and 511-2.

Each of the first and second vibration portions 511-1 and 511-2 may be electrically separated and disposed while being spaced apart from each other along a first direction X. Each of the first and second vibration portions 511-1 and 511-2 may alternately and repeatedly contract and/or expand based on a piezoelectric effect to vibrate. The first and second vibration portions 511-1 and 511-2 may be disposed or tiled at a certain interval (or distance) D1. Thus, the vibration generator 510 in which the first and second vibration portions 511-1 and 511-2 are arranged or tiled may be referred to as a vibration array, a vibration array portion, a vibration module array portion, a vibration array structure, a tiling vibration array, a tiling vibration array module, or a tiling vibration film, but embodiments of the present disclosure are not limited thereto.

Each of the first and second vibration portions 511-1 and 511-2 according to an example embodiment of the present disclosure may have a tetragonal shape. For example, each of the first and second vibration portions 511-1 and 511-2 may have a tetragonal shape having a width of about 5 cm or more. For example, each of the first and second vibration portions 511-1 and 511-2 may have a square shape having a size of 5 cm×5 cm or more, but embodiments of the present disclosure are not limited thereto.

Each of the first and second vibration portions 511-1 and 511-2 may be arranged or tiled on the same plane, and thus, the vibration generator 510 may have an enlarged area based on tiling of the first and second vibration portions 511-1 and 511-2 having a relatively small size.

Each of the first and second vibration portions 511-1 and 511-2 may be arranged or tiled at a certain interval (or distance) D1, and thus, may be implemented as one vibration apparatus (or a single vibration apparatus) which is driven as one complete single-body without being independently driven. According to an example embodiment of the present disclosure, with respect to the first direction X, a first separation distance (or first distance or first interval) D1 between the first and second vibration portions 511-1 and 511-2 may be 0.1 mm or more and less than 3 cm, but embodiments of the present disclosure are not limited thereto.

According to an example embodiment of the present disclosure, each of the first and second vibration portions 511-1 and 511-2 may be disposed or tiled to have the first separation distance (or an interval) D1 of 0.1 mm or more and less than 3 cm, and thus, may be driven as one vibration apparatus, thereby increasing a reproduction band of a sound and a sound pressure level characteristic of a sound which is generated based on a single-body vibration of the first and second vibration portions 511-1 and 511-2. For example, the first and second vibration portions 511-1 and 511-2 may be disposed in the first separation distance (or the interval) D1 of 0.1 mm or more and less than 5 mm, in order to increase a reproduction band of a sound generated based on a single-body vibration of the first and second vibration portions 511-1 and 511-2 and to increase a sound of a low-pitched sound band (for example, a sound pressure level characteristic in 500 Hz or less).

According to an example embodiment of the present disclosure, when the first and second vibration portions 511-1 and 511-2 are disposed in the first separation distance (or the interval) D1 of less than 0.1 mm or without the first separation distance D1, the reliability of the first and second vibration portions 511-1 and 511-2 or the vibration generator 510 may be reduced due to damage or a crack caused by a physical contact therebetween which occurs when each of the first and second vibration portions 511-1 and 511-2 vibrates.

According to an example embodiment of the present disclosure, when the first and second vibration portions 511-1 and 511-2 are disposed in the first separation distance D1 of 3 cm or more, the first and second vibration portions 511-1 and 511-2 may not be driven as one vibration apparatus due to an independent vibration of each of the first and second vibration portions 511-1 and 511-2. Therefore, a reproduction band of a sound and a sound pressure level characteristic of a sound which is generated based on vibrations of the first and second vibration portions 511-1 and 511-2 may be reduced. For example, when the first and second vibration portions 511-1 and 511-2 are disposed in the first separation distance D1 of 3 cm or more, a sound characteristic and a sound pressure level characteristic of the low-pitched sound band (for example, in 500 Hz or less) may each be reduced.

According to an example embodiment of the present disclosure, when the first and second vibration portions 511-1 and 511-2 are disposed in the first separation distance D1 of 5 mm, each of the first and second vibration portions 511-1 and 511-2 may not be perfectly driven as one vibration apparatus, and thus, a sound characteristic and a sound pressure level characteristic of the low-pitched sound band (for example, in 200 Hz or less) may each be reduced.

According to another example embodiment of the present disclosure, when the first and second vibration portions 511-1 and 511-2 are disposed in the first separation distance D1 of 1 mm, each of the first and second vibration portions 511-1 and 511-2 may be driven as one vibration apparatus, and thus, a reproduction band of a sound may increase and a sound of the low-pitched sound band (for example, a sound pressure level characteristic in 500 Hz or less) may increase. For example, when the first and second vibration portions 511-1 and 511-2 are disposed in the first separation distance D1 of 1 mm, the vibration generator 510 may be implemented as a large-area vibrator which is enlarged based on optimization of a separation distance between the first and second vibration portions 511-1 and 511-2. Therefore, the vibration generator 510 may be driven as a large-area vibrator based on a single-body vibration of the first and second vibration portions 511-1 and 511-2, and thus, a sound characteristic and a sound pressure level characteristic may each increase a reproduction band of a sound in the low-pitched sound band generated based on a large-area vibration of the vibration generator 510.

Therefore, to implement a single-body vibration (or one vibration apparatus) of the first and second vibration portions 511-1 and 511-2, the first separation distance D1 between the first and second vibration portions 511-1 and 511-2 may be adjusted to 0.1 mm or more and less than 3 cm. In addition, to implement a single-body vibration (or one vibration apparatus) of the first and second vibration portions 511-1 and 511-2 and to increase a sound pressure level characteristic of a sound of the low-pitched sound band, the first separation distance D1 between the first and second vibration portions 511-1 and 511-2 may be adjusted to 0.1 mm or more and less than 5 mm.

Each of the first and second vibration portions 511-1 and 511-2 according to an example embodiment of the present disclosure may include a vibration layer 511a, a first electrode layer 511b, and a second electrode layer 511c.

The vibration layer 511a of each of the first and second vibration portions 511-1 and 511-2 may include a piezoelectric material (or an electroactive material) which includes a piezoelectric effect. For example, the vibration layer 511a of each of the first and second vibration portions 511-1 and 511-2 may be configured substantially the same as any one of the vibration layer 511a described above with reference to FIGS. 12 to 15, and thus, like reference numerals may refer to like elements, and the repetitive description thereof may be omitted for brevity.

According to an example embodiment of the present disclosure, each of the first and second vibration portions 511-1 and 511-2 may include any one vibration portion 511 of the vibration portion 511 described above with reference to FIGS. 12 to 15, or may include a different vibration portion 511.

The first electrode layer 511b may be disposed at a first surface of the vibration layer 511a and electrically connected to the first surface of the vibration layer 511a. The first electrode layer 511b may be substantially the same as the first electrode layer 511b described above with reference to FIGS. 11 and 12, and thus, like reference numerals may refer to like elements, and the repetitive description thereof may be omitted for brevity.

The second electrode layer 511c may be disposed at a second surface of the vibration layer 511a and electrically connected to the second surface of the vibration layer 511a. The second electrode layer 511c may be substantially the same as the second electrode layer 511c described above with reference to FIGS. 11 and 12, and thus, like reference numerals may refer to like elements, and the repetitive description thereof may be omitted for brevity.

The vibration generator 510 according to another example embodiment of the present disclosure may further include a first cover member 512 and a second cover member 513.

The first cover member 512 may be disposed at the first surface of the vibration generator 510. For example, the first cover member 512 may cover the first electrode layer 511b which is disposed at a first surface of each of the first and second vibration portions 511-1 and 511-2, and thus, the first cover member 512 may be connected to the first surface of each of the first and second vibration portions 511-1 and 511-2 in common or may support the first surface of each of the first and second vibration portions 511-1 and 511-2 in common. Accordingly, the first cover member 512 may protect the first surface or the first electrode layer 511b of each of the first and second vibration portions 511-1 and 511-2.

The second cover member 513 may be disposed at the second surface of the vibration generator 510. For example, the second cover member 513 may cover the second electrode layer 511c which is disposed at a second surface of each of the first and second vibration portions 511-1 and 511-2, and thus, the second cover member 513 may be connected to the second surface of each of the first and second vibration portions 511-1 and 511-2 in common or may support the second surface of each of the first and second vibration portions 511-1 and 511-2 in common. Accordingly, the second cover member 513 may protect the second surface or the second electrode layer 511c of each of the first and second vibration portions 511-1 and 511-2.

The first cover member 512 and the second cover member 513 according to an example embodiment of the present disclosure may each include one or more material of plastic, fiber, leather, wood, cloth, rubber, and paper, but embodiments of the present disclosure are not limited thereto. For example, each of the first cover member 512 and the second cover member 513 may include the same material or different material. For example, each of the first cover member 512 and the second cover member 513 may be a polyimide (PI) film or a polyethylene terephthalate (PET) film, but embodiments of the present disclosure are not limited thereto.

The first cover member 512 according to an example embodiment of the present disclosure may be disposed at the first surface of each of the first and second vibration portions 511-1 and 511-2 by a first adhesive layer 514. For example, the first cover member 512 may be directly disposed at the first surface of each of the first and second vibration portions 511-1 and 511-2 by a film laminating process using the first adhesive layer 514. Accordingly, each of the first and second vibration portions 511-1 and 511-2 may be integrated (or disposed) or tiled with the first cover member 512 to have the first separation distance D1.

The second cover member 513 according to an example embodiment of the present disclosure may be disposed at the second surface of each of the first and second vibration portions 511-1 and 511-2 by a second adhesive layer 515. For example, the second cover member 513 may be directly disposed at the second surface of each of the first and second vibration portions 511-1 and 511-2 by a film laminating process using the second adhesive layer 515. Accordingly, each of the first and second vibration portions 511-1 and 511-2 may be integrated (or disposed) or tiled with the second cover member 513 to have the first separation distance D1. For example, the vibration generator 510 may be implemented as one film by the first cover member 512 and the second cover member 513.

The first adhesive layer 514 may be disposed between the first and second vibration portions 511-1 and 511-2 and disposed at the first surface of each of the first and second vibration portions 511-1 and 511-2. For example, the first adhesive layer 514 may be formed at a rear surface (or an inner surface) of the first cover member 512 facing the first surface of each of the first and second vibration portions 511-1 and 511-2, filled between the first and second vibration portions 511-1 and 511-2, and filled between the first cover member 512 and the first surface of each of the first and second vibration portions 511-1 and 511-2.

The second adhesive layer 515 may be disposed between the first and second vibration portions 511-1 and 511-2 and disposed at the second surface of each of the first and second vibration portions 511-1 and 511-2. For example, the second adhesive layer 515 may be formed at a front surface (or an inner surface) of the second cover member 513 facing the second surface of each of the first and second vibration portions 511-1 and 511-2, filled between the first and second vibration portions 511-1 and 511-2, and filled between the first cover member 512 and the second surface of each of the first and second vibration portions 511-1 and 511-2.

The first and second adhesive layers 514 and 515 may be connected or coupled to each other between the first and second vibration portions 511-1 and 511-2. Therefore, each of the first and second vibration portions 511-1 and 511-2 may be surrounded by the first and second adhesive layers 514 and 515. For example, the first and second adhesive layers 514 and 515 may be configured between the first cover member 512 and the second cover member 513 to completely surround the first and second vibration portions 511-1 and 511-2. For example, each of the first and second vibration portions 511-1 and 511-2 may be embedded or built-in between the first adhesive layer 514 and the second adhesive layer 515.

Each of the first and second adhesive layers 514 and 515 according to an example embodiment of the present disclosure may include an electrically insulating material which has adhesiveness and is capable of compression and decompression. For example, each of the first and second adhesive layers 514 and 515 may include an epoxy resin, an acrylic resin, a silicone resin, or a urethane resin, but embodiments of the present disclosure are not limited thereto. Each of the first and second adhesive layers 514 and 515 may be configured to be transparent, translucent, or opaque.

The vibration generator 510 according to another example embodiment of the present disclosure may further include a first power supply line PL1 disposed at the first cover member 512, a second power supply line PL2 disposed at the second cover member 513, and a pad part 518 electrically connected to the first power supply line PL1 and the second power supply line PL2.

The first power supply line PL1 may be disposed at a rear surface of the first cover member 512 facing the first surface of each of the first and second vibration portions 511-1 and 511-2. The first power supply line PL1 may be connected or electrically and directly connected to the first electrode layer 511b of each of the first and second vibration portions 511-1 and 511-2. For example, the first power supply line PL1 may be electrically connected to the first electrode layer 511b of each of the first and second vibration portions 511-1 and 511-2 through an anisotropic conductive film or a conductive material (or particle) included in the first adhesive layer 514.

The first power supply line PL1 according to an example embodiment of the present disclosure may include first and second upper power lines PL11 and PL12 disposed along a second direction Y. For example, the first upper power line PL11 may be connected or electrically and directly connected to the first electrode layer 511b of the first vibration portion 511-1. The second upper power line PL12 may be connected or electrically and directly connected to the first electrode layer 511b of the second vibration portion 511-2.

The second power supply line PL2 may be disposed at a front surface of the second cover member 513 facing the second surface of each of the first and second vibration portions 511-1 and 511-2. The second power supply line PL2 may be connected or electrically and directly connected to the second electrode layer 511c of each of the first and second vibration portions 511-1 and 511-2. For example, the second power supply line PL2 may be electrically connected to the second electrode layer 511c of each of the first and second vibration portions 511-1 and 511-2 through an anisotropic conductive film or a conductive material (or particle) included in the second adhesive layer 515.

The second power supply line PL2 according to an example embodiment of the present disclosure may include first and second lower power lines PL21 and PL22 disposed along a second direction Y. The first lower power line PL21 may be electrically connected to the second electrode layer 511c of the first vibration portion 511-1. For example, the first lower power line PL21 may be disposed not to overlap the first upper power line PL11. When the first lower power line PL21 is disposed not to overlap the first upper power line PL11, a short circuit between the first power supply line PL1 and the second power supply line PL2 may be prevented. The second lower power line PL22 may be electrically connected to the second electrode layer 511c of the second vibration portion 511-2. For example, the second lower power line PL22 may be disposed not to overlap the second upper power line PL12. When the second lower power line PL22 is disposed not to overlap the second upper power line PL12, a short circuit between the first power supply line PL1 and the second power supply line PL2 may be prevented.

The pad part 518 may be configured at one periphery portion of any one of the first cover member 512 and the second cover member 513 to be electrically connected to one portion (or one end) of each of the first power supply line PL1 and the second power supply line PL2.

The pad part 518 according to an example embodiment of the present disclosure may include a first pad electrode electrically connected to one end (or one portion) of the first power supply line PL1, and a second pad electrode electrically connected to one end (or one portion) of the second power supply line PL2.

The first pad electrode may be connected to one portion of each of the first and second upper power lines PL11 and PL12 of the first power supply line PL1 in common. For example, the one portion of each of the first and second upper power lines PL11 and PL12 may branch from the first pad electrode. The second pad electrode may be connected to one portion of each of the first and second lower power lines PL21 and PL22 of the second power supply line PL2 in common. For example, the one portion of each of the first and second lower power lines PL21 and PL22 may branch from the second pad electrode.

The vibration generator 510 according to another example embodiment of the present disclosure may further include a signal cable 519.

The signal cable 519 may be electrically connected to the pad part 518 disposed at the vibration generator 510 and may supply the vibration generator 510 with a vibration driving signal (or a sound signal or a voice signal) provided from a sound processing circuit. The signal cable 519 according to an example embodiment of the present disclosure may include a first terminal electrically connected to the first pad electrode of the pad part 518 and a second terminal electrically connected to the second pad electrode of the pad part 518. For example, the signal cable 519 may be a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The sound processing circuit may generate an alternating current (AC) vibration driving signal including a first vibration driving signal and a second vibration driving signal based on a sound data. The first vibration driving signal may be one of a positive (+) vibration driving signal and a negative (−) vibration driving signal, and the second vibration driving signal may be one of a positive (+) vibration driving signal and a negative (−) vibration driving signal. For example, the first vibration driving signal may be supplied to the first electrode layer 511b of each of the first and second vibration portions 511-1 and 511-2 through the first terminal of the signal cable 519, the first pad electrode of the pad part 518, and the first power supply line PL1. The second vibration driving signal may be supplied to the second electrode layer 511c of each of the first and second vibration portions 511-1 and 511-2 through the second terminal of the signal cable 519, the second pad electrode of the pad part 518, and the second power supply line PL2.

The vibration generator 510 according to another example embodiment of the present disclosure may be configured in a thin film-type (or may be a thin film), in a manner that is the same as the vibration generator 510 described above with reference to FIGS. 10 to 15, and thus, may be bent in a shape corresponding to a shape of the vibration member or the vibration object and may easily vibrate the vibration member including various curved portions, thereby enhancing a sound characteristic and/or a sound pressure level characteristic in the low-pitched sound band generated based on a vibration of the vibration member. In addition, the vibration generator 510 according to another example embodiment of the present disclosure may include the first and second vibration portions 511-1 and 511-2 which are arranged (or tiled) at the first separation distance D1, so as to be configured in one single vibration body without being independently driven, and thus, may be driven as a large-area vibration body based on a single-body vibration of the first and second vibration portions 511-1 and 511-2.

Figure 18:
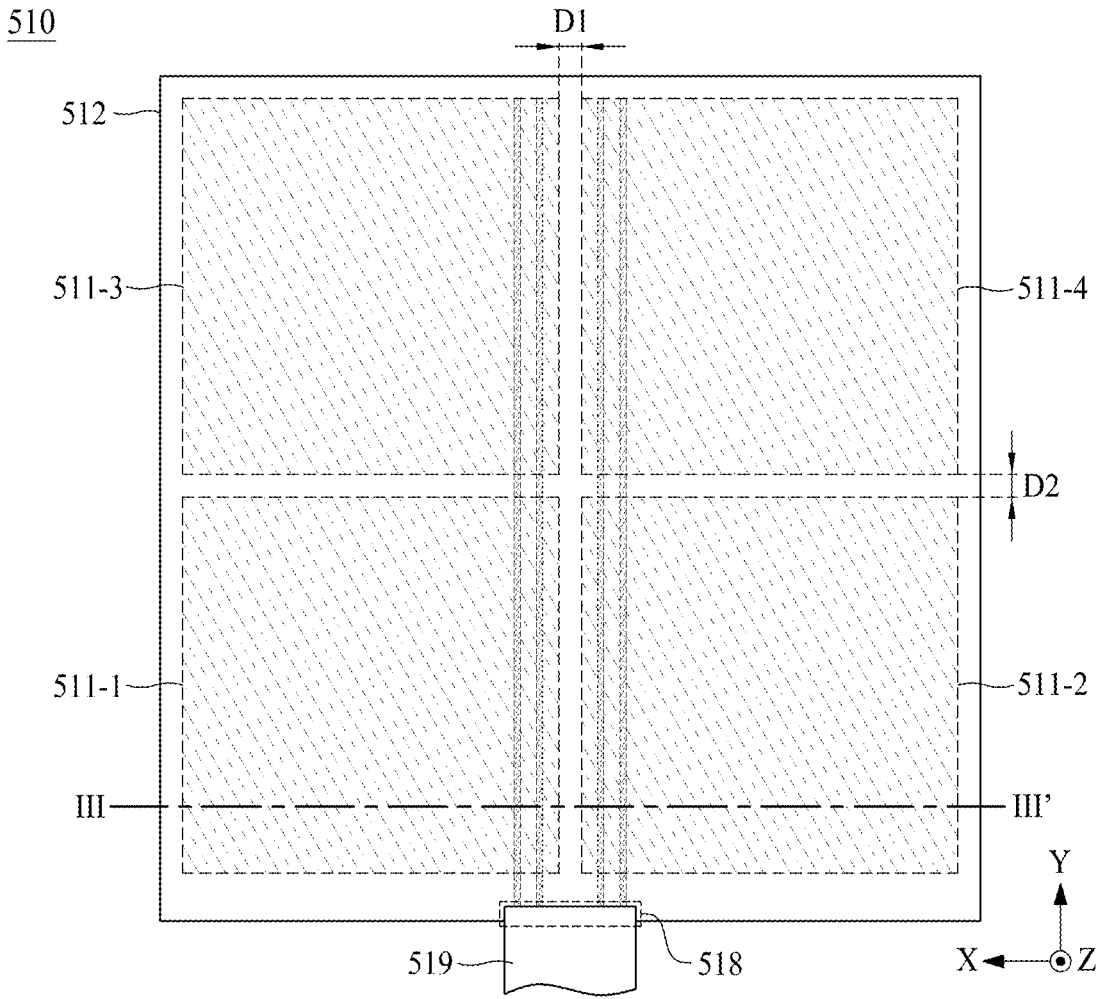
FIG. 18 illustrates a vibration generator according to another example embodiment of the present disclosure.

FIG. 18 illustrates a vibration generator according to another example embodiment of the present disclosure. FIG. 18 illustrates an example embodiment where four vibration portions are provided in the vibration generator illustrated in FIGS. 16 and 17. Hereinafter, therefore, the same or similar elements other than four vibration portions and relevant elements may be referred to by like reference numerals, and their repetitive descriptions may be omitted or will be briefly given. An example of a cross-sectional surface taken along line III-III' illustrated in FIG. 18 is illustrated in FIG. 17.

With reference to FIGS. 17 and 18, the vibration generator 510 according to another example embodiment of the present disclosure may include a plurality of vibration portions 511-1 to 511-4.

The plurality of vibration portions 511-1 to 511-4 may be electrically disconnected and disposed spaced apart from each other along a first direction X and a second direction Y. For example, the plurality of vibration portions 511-1 to 511-4 may be disposed or tiled in an i×j form on the same plane, and thus, the vibration generator 510 may be implemented to have a large area, based on tiling of the plurality of vibration portions 511-1 to 511-4 having a relatively small size. For example, i may be the number of vibration portions disposed along the first direction X and may be a natural number of 2 or more, and j may be the number of vibration portions disposed along the second direction Y and may be a natural number of 2 or more which is the same as or different from i. For example, the plurality of vibration portions 511-1 to 511-4 may be arranged or tiled in a 2×2 form, but embodiments of the present disclosure are not limited thereto. In the following description, an example where the vibration generator 510 includes the plurality of vibration portions 511-1 to 511-4 will be described.

According to an example embodiment of the present disclosure, the first and second vibration portions 511-1 and 511-2 may be spaced apart from each other along the first direction X. The third and fourth vibration portions 511-3 and 511-4 may be spaced apart from each other along the first direction X and may be spaced apart from each of the first and second vibration portions 511-1 and 511-2 along the second direction Y. The first and third vibration portions

511-1 and 511-3 may be spaced apart from each other along the second direction Y to face each other. The second and fourth vibration portions 511-2 and 511-4 may be spaced apart from each other along the second direction Y to face each other.

The first to fourth vibration portions 511-1 to 511-4 may be disposed between the first cover member 512 and the second cover member 513. For example, each of the first cover member 512 and the second cover member 513 may be connected to the first to fourth vibration portions 511-1 to 511-4 in common or may support the first to fourth vibration portions 511-1 to 511-4 in common, and thus, may drive the first to fourth vibration portions 511-1 to 511-4 as one vibration apparatus (or a single vibration apparatus). For example, the first to fourth vibration portions 511-1 to 511-4 may be tiled in a certain interval D1 and D2 by the cover members 512 and 513, and thus, may be driven as one vibration apparatus (or a single vibration apparatus).

According to an example embodiment of the present disclosure, as described above with reference to FIGS. 16 and 17, in order to provide a complete single body vibration or a large-area vibration, the first to fourth vibration portions 511-1 to 511-4 may be disposed (or tiled) in the intervals D1 and D2 of 0.1 mm or more and less than 3 cm or may be disposed (or tiled) in the intervals D1 and D2 of 0.1 mm or more and less than 5 mm along each of the first direction X and the second direction Y.

Each of the first to fourth vibration portions 511-1 to 511-4 according to an example embodiment of the present disclosure may include a vibration layer 511$a$, a first electrode layer 511$b$, and a second electrode layer 511$c$.

The vibration layer 511$a$ of each of the first to fourth vibration portions 511-1 to 511-4 may include a piezoelectric material (or an electroactive material) which includes a piezoelectric effect. For example, the vibration layer 511$a$ of each of the first to fourth vibration portions 511-1 to 511-4 may be configured substantially the same as any one of the vibration layer 511$a$ described above with reference to FIGS. 12 to 15, and thus, like reference numerals may refer to like elements, and the repetitive description thereof may be omitted for brevity.

According to an example embodiment of the present disclosure, each of the first to fourth vibration portions 511-1 to 511-4 may include any one vibration layer 511$a$ of the vibration layer 511$a$ described above with reference to FIGS. 12 to 15, or may include different vibration layer 511$a$. According to another example embodiment of the present disclosure, one or more of the first to fourth vibration portions 511-1 to 511-4 may include a different vibration layer 511$a$ described above with reference to FIGS. 12 to 15.

The first electrode layer 511$b$ may be disposed at a first surface of the corresponding vibration layer 511$a$ and electrically connected to the first surface of the vibration layer 511$a$. The first electrode layer 511$b$ may be substantially the same as the first electrode layer 511$b$ described above with reference to FIGS. 11 and 12, and thus, like reference numerals may refer to like elements, and the repetitive description thereof may be omitted for brevity.

The second electrode layer 511$c$ may be disposed at a second surface of the corresponding vibration layer 511$a$ and electrically connected to the second surface of the vibration layer 511$a$. The second electrode layer 511$c$ may be substantially the same as the second electrode layer 511$c$ described above with reference to FIGS. 11 and 12, and thus, like reference numerals may refer to like elements, and the repetitive description thereof may be omitted for brevity.

According to an example embodiment of the present disclosure, the first and second adhesive layers 514 and 515 may be connected or coupled to each other between the first to fourth vibration portions 511-1 to 511-4. Therefore, each of the first to fourth vibration portions 511-1 to 511-4 may be surrounded by the first and second adhesive layers 514 and 515. For example, the first and second adhesive layers 514 and 515 may be configured between the first cover member 512 and the second cover member 513 to completely surround the first to fourth vibration portions 511-1 to 511-4. For example, each of the first to fourth vibration portions 511-1 to 511-4 may be embedded or built-in between the first adhesive layer 514 and the second adhesive layer 515.

The vibration generator 510 according to another example embodiment of the present disclosure may further include a first power supply line PL1, a second power supply line PL2, and a pad part 518.

Except for an electrical connection structure between the first and second power supply lines PL1 and PL2 and the first to fourth vibration portions 511-1 to 511-4, the first power supply line PL1 and the second power supply line PL2 may be substantially the same as each of the first power supply line PL1 and the second power supply line PL2 described above with reference to FIGS. 16 and 17, and thus, in the following description, only the electrical connection structure between the first and second power supply lines PL1 and PL2 and the first to fourth vibration portions 511-1 to 511-4 will be briefly described below.

The first power supply line PL1 according to an example embodiment of the present disclosure may include first and second upper power lines PL11 and PL12 disposed along a second direction Y. For example, the first upper power line PL11 may be electrically connected to the first electrode layer 511$b$ of each of the first and third vibration portions 511-1 and 511-3 disposed at a first row parallel to a second direction Y among the first to fourth vibration portions 511-1 to 511-4. The second upper power line PL12 may be electrically connected to the first electrode layer 511$b$ of each of the second and fourth vibration portions 511-2 and 511-4 disposed at a second row parallel to the second direction Y among the first to fourth vibration portions 511-1 to 511-4.

The second power supply line PL2 according to an example embodiment of the present disclosure may include first and second lower power lines PL21 and PL22 disposed along a second direction Y. For example, the first lower power line PL21 may be electrically connected to the second electrode layer 511$c$ of each of the first and third vibration portions 511-1 and 511-3 disposed at a first row parallel to a second direction Y among the first to fourth vibration portions 511-1 to 511-4. The second lower power line PL22 may be electrically connected to the second electrode layer 511$c$ of each of the second and fourth vibration portions 511-2 and 511-4 disposed at a second row parallel to the second direction Y among the first to fourth vibration portions 511-1 to 511-4.

The pad part 518 may be configured at one edge portion (or one periphery portion) of one of the first cover member 512 and the second cover member 513 so as to be electrically connected to one side (or one end or one portion) of each of the first and second power supply lines PL1 and PL2. The pad part 518 may be substantially the same as the pad part 518 illustrated in FIGS. 16 and 17, and thus, like reference numerals may refer to like elements, and the repetitive description thereof may be omitted for brevity.

The vibration generator 510 according to another example embodiment of the present disclosure may have the same effect as the vibration generator 510 described above with reference to FIGS. 16 and 17, and thus, the repetitive description thereof may be omitted for brevity.

Figure 19:
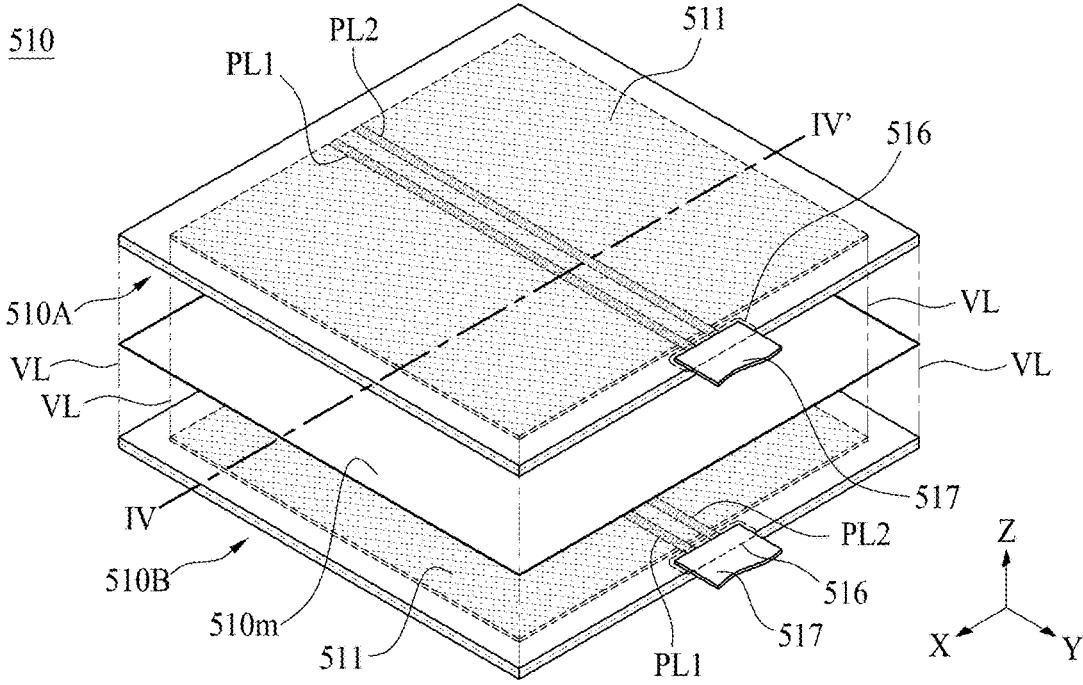
FIG. 19 illustrates a vibration generator according to another example embodiment of the present disclosure.
Figure 20:
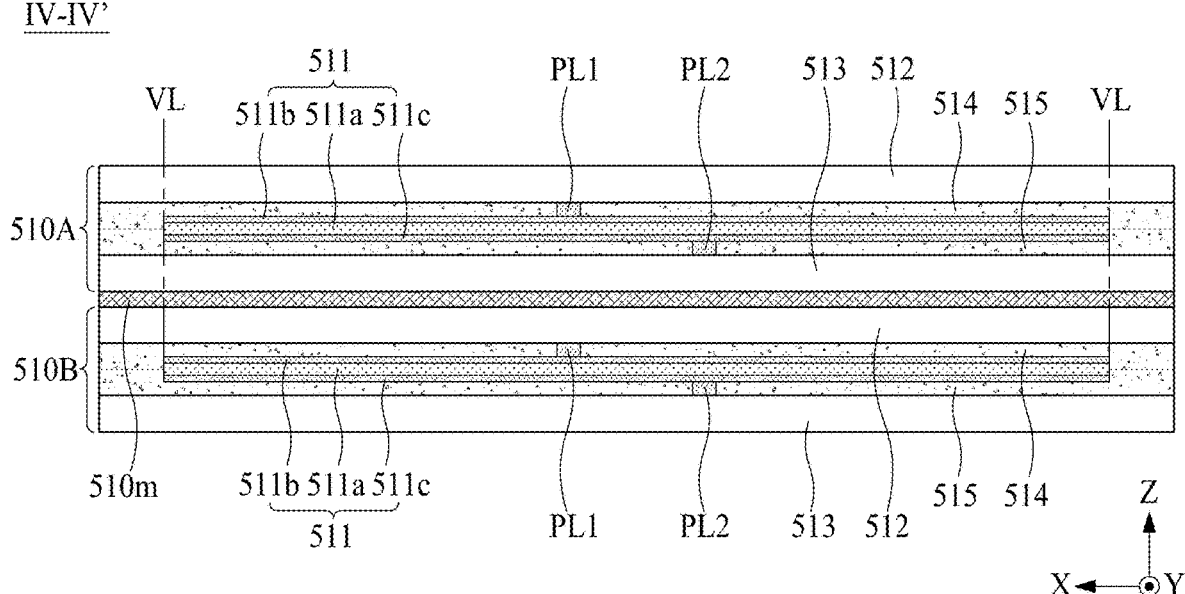
FIG. 20 is an example of a cross-sectional view taken along line IV-IV' illustrated in FIG. 19.

FIG. 19 illustrates a vibration generator according to another example embodiment of the present disclosure. FIG. 20 is an example of a cross-sectional view taken along line IV-IV' illustrated in FIG. 19. FIGS. 19 and 20 illustrate another example embodiment of the vibration generator described with reference to FIGS. 1 to 10.

With reference to FIGS. 19 and 20, the vibration generator 510 according to another example embodiment of the present disclosure may include a plurality of vibration generating portions 510A and 510B and an intermediate member (or a middle member) 510m. For example, the vibration generator 510 according to another example embodiment of the present disclosure may include a first vibration generating portion 510A, a second vibration generating portion 510B, and an intermediate member 510m between the first vibration generating portion 510A and the second generating portion 510B.

The plurality of vibration generating portions (or the first and second vibration generating portions) 510A and 510B may overlap or be stacked to be displaced (or driven or vibrated) in the same direction in order to maximize an amplitude displacement of the vibration member and/or an amplitude displacement of the vibration generator 510. One sides (or end portions, or end, or outer surfaces, or each corner portion) of each of the plurality of vibration generating portions (or the first and second vibration generating portions) 510A and 510B may be aligned on a virtual extension line VL extending along a third direction Z, or may be located at the virtual extension line VL. For example, the first vibration generating portion 510A may be disposed at a front surface or a rear surface of the second vibration generating portion 510B.

The plurality of vibration generating portions (or the first and second vibration generating portions) 510A and 510B may be any one of the vibration generator 510 described above with reference to FIGS. 10 to 18, and thus, their repetitive descriptions may be omitted for brevity.

The plurality of vibration generating portions 510A and 510B may overlap or be stacked to be displaced (or driven or vibrated) in the same direction based on a polarization direction of the vibration layer 511a. For example, when the vibration layer 511a of each of the first and second vibration generating portions 510A and 510B has the same polarization direction, the second vibration generating portion 510B may be disposed at a front surface or a rear surface of the first vibration generating portion 510A. For example, when the vibration layer 511a of each of the first and second vibration generating portions 510A and 510B has the opposite polarization direction to each other, the second vibration generating portion 510B may be disposed at the front surface or the rear surface of the first vibration generating portion 510A as a vertically reversed type.

The intermediate member 510m may be disposed or interposed between the plurality of vibration generating portions 510A and 510B. For example, the intermediate member 510m may be disposed between the second cover member 513 of the first vibration generating portion 510A and the first cover member 512 of the second vibration generating portion 510B. For example, the intermediate member 510m may be configured as an adhesive material including an adhesive layer which is relatively strong in adhesive force or attaching force with respect to each of the plurality of vibration generators 210 and 230 overlapping vertically.

The intermediate member 510m according to an example embodiment of the present disclosure may include a foam pad, a single-sided tape, a double-sided tape, a single-sided foam pad, a double-sided foam pad, a single-sided foam tape, a double-sided foam tape, or an adhesive, or the like, but embodiments of the present disclosure are not limited thereto. For example, an adhesive layer of the intermediate member 510m may include epoxy-based, acrylic-based, silicone-based, or urethane-based, but embodiments of the present disclosure are not limited thereto. The adhesive layer of the intermediate member 510m may include a urethane-based material which has a relatively ductile characteristic compared to acrylic among acrylic and urethane. Accordingly, in the vibration generator 510 according to another example embodiment of the present disclosure, the vibration loss of the vibration generator 510 caused by displacement interference between the plurality of vibration generating portions 510A and 510B may be minimized, or each of the plurality of vibration generating portions 510A and 510B may be freely displaced.

The intermediate member 510m according to another example embodiment of the present disclosure may include one or more of a thermo-curable adhesive, a photo-curable adhesive, and a thermal bonding adhesive. For example, the intermediate member 510m may include the thermal bonding adhesive. The thermal bonding adhesive may be a heat-active type or a thermo-curable type. For example, the intermediate member 510m including the thermal bonding adhesive may attach or couple two adjacent vibration generating portions 510A and 510B by heat and pressure. For example, the intermediate member 510m including the thermal bonding adhesive may minimize or reduce the loss of vibration of the vibration generator 510.

The plurality of vibration generating portions 510A and 510B may be integrated as one structure (or an element or a component) by a laminating process using the intermediate member 510m. For example, the plurality of vibration generating portions 510A and 510B may be integrated as one structure by a laminating process using a roller.

FIGS. 21A to 21D are examples of perspective views illustrating a stack structure between the vibration layers of the plurality of vibration generating portions illustrated in FIGS. 19 and 20.

Figure 21A:
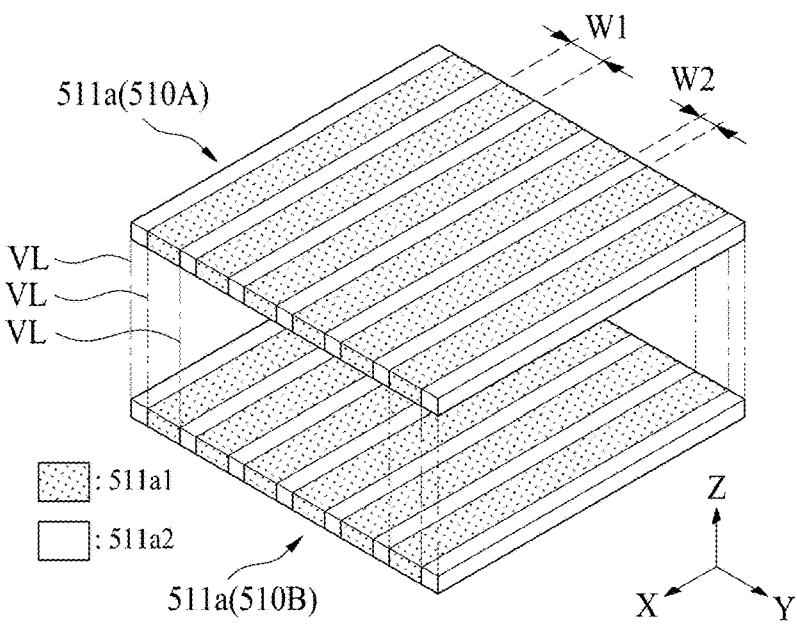
FIGS. 21A to 21D are examples of perspective views illustrating a stack structure between the vibration layers of each of the plurality of vibration generating portions illustrated in FIGS. 19 and 20.
Figure 21B:
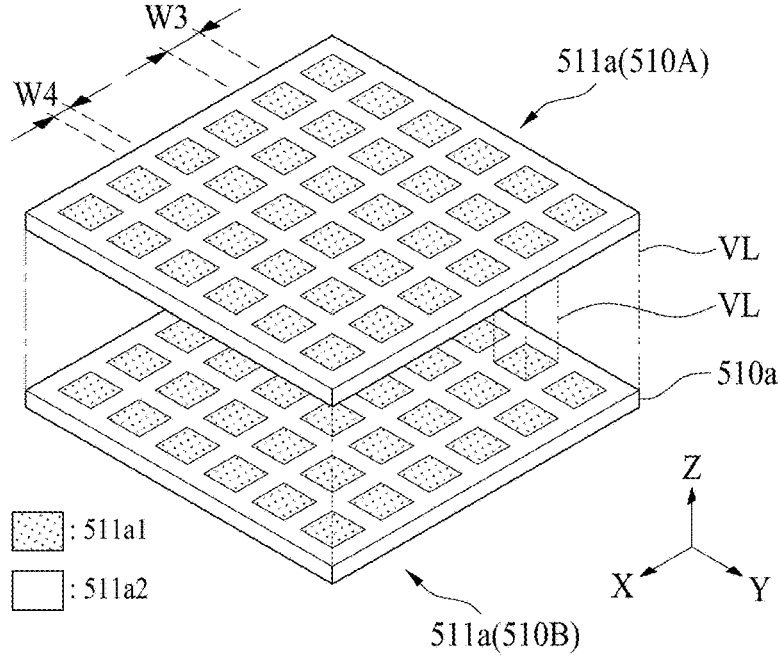
Figure 21C:
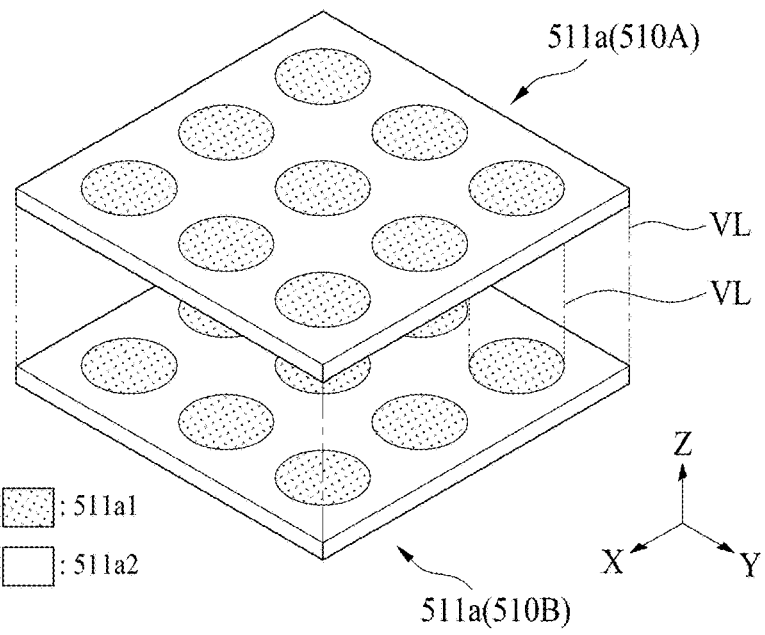
Figure 21D:
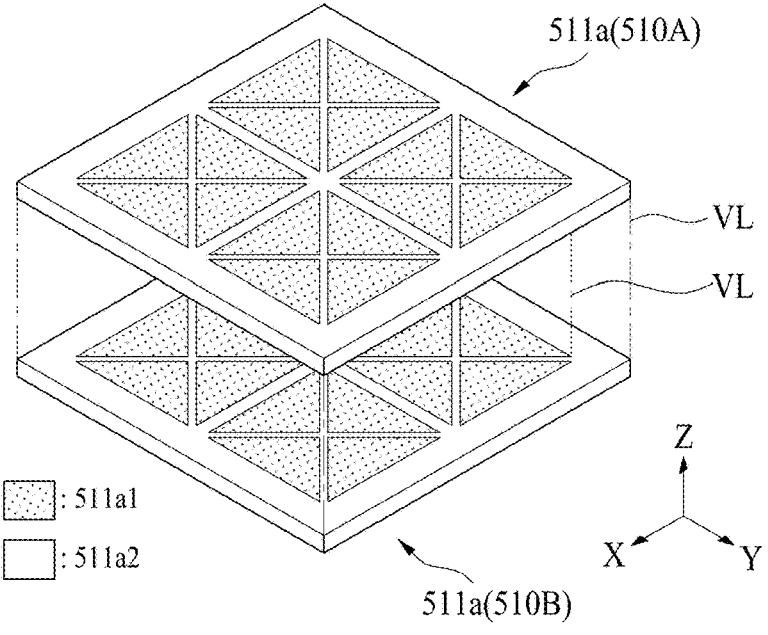

With reference to FIGS. 19 and 21A, a vibration layer 511a of each of a plurality of vibration generating portions 510A and 510B may include a plurality of first portions 511a1 and a plurality of second portions 511a2 disposed between the plurality of first portions 511al. The vibration layer 511a may be substantially the same as the vibration layer 511a described above with reference to FIGS. 11 and 12, and thus, the repetitive description thereof may be omitted for brevity.

A first portion 511a1 of a vibration generating portion 510B disposed at a lower layer and a first portion 511a1 of a vibration generating portion 510A disposed at an upper layer among the plurality of vibration generating portions 510A and 510B may substantially overlap or stack to each other without being staggered, or may be aligned on a virtual extension line VL extending along a third direction Z, or may be disposed at the virtual extension line VL. A second portion 511a2 of the vibration generating portion 510B disposed at the lower layer and a second portion 511a2 of the vibration generating portion 510A disposed at the upper layer among the plurality of vibration generating portions 510A and 510B may substantially overlap or stack to each other without being staggered, or may be aligned on a virtual extension line VL extending along a third direction Z, or may be disposed at the virtual extension line VL. Therefore, the first portions 511al of the plurality of vibration generating portions 510A and 510B may substantially overlap or stack to each other without being staggered and may displace (or drive or vibrate) in the same direction, and thus, an amplitude displacement of a vibration generator 510 and/or an amplitude displacement of a vibration member may be increased or maximized by a combination vibration of the plurality of vibration generating portions 510A and 510B, thereby enhancing a sound characteristic and/or a sound pressure level characteristic of the low-pitched sound band generated based on a vibration of the vibration member.

With reference to FIGS. 19 and 21B to 21D, a vibration layer 511a of each of a plurality of vibration generating portions 510A and 510B may include a plurality of first portions 511a1 and a second portion 511a2 disposed to surround each of the plurality of first portions 511al. The vibration layer 511a may be substantially the same as the vibration layer 511a described above with reference to FIGS. 13 to 15, and thus, the repetitive description thereof may be omitted for brevity.

A first portion 511a1 of a vibration generating portion 510B disposed at a lower layer and a first portion 511a1 of a vibration generating portion 510A disposed at an upper layer among the plurality of vibration generating portions 510A and 510B may substantially overlap or stack to each other without being staggered, or may be aligned on a virtual extension line VL extending along a third direction Z, or may be located at the virtual extension line VL. A second portion 511a2 of the vibration generating portion 510B disposed at the lower layer and a second portion 511a2 of the vibration generating portion 510A disposed at the upper layer among the plurality of vibration generating portions 510A and 510B may substantially overlap or stack to each other without being staggered, or may be aligned on a virtual extension line VL extending along a third direction Z, or may be located at the virtual extension line VL. Therefore, the first portions 511al of the plurality of vibration generating portions 510A and 510B may substantially overlap or stack to each other without being staggered and may displace (or drive or vibrate) in the same direction, and thus, an amplitude displacement of a vibration generator 510 and/or an amplitude displacement of a vibration member may be increased or maximized by a combination vibration of the plurality of vibration generating portions 510A and 510B, thereby enhancing a sound characteristic and/or a sound pressure level characteristic of the low-pitched sound band generated based on a vibration of the vibration member.

Figure 22:
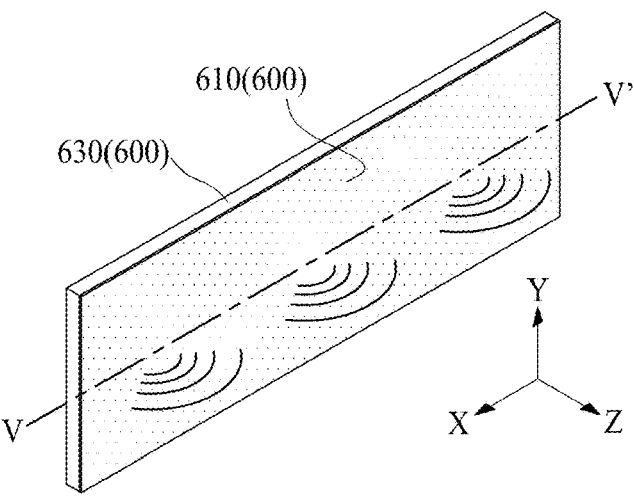
FIG. 22 is a perspective view illustrating an apparatus according to another example embodiment of the present disclosure.
Figure 23:
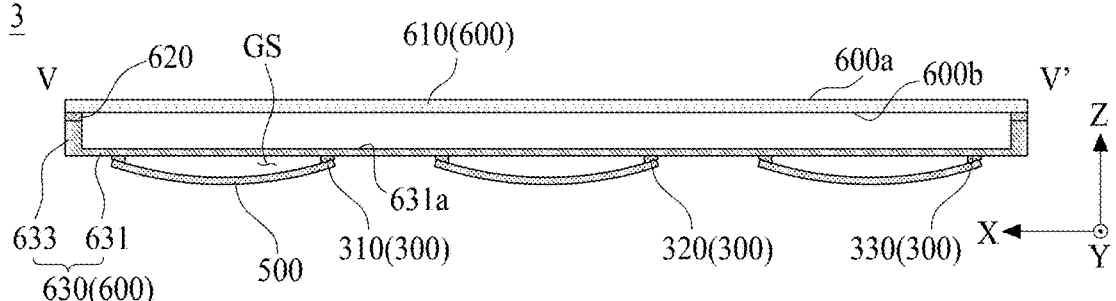
FIG. 23 is an example of a cross-sectional view taken along line V-V' illustrated in FIG. 22.
Figure 24:
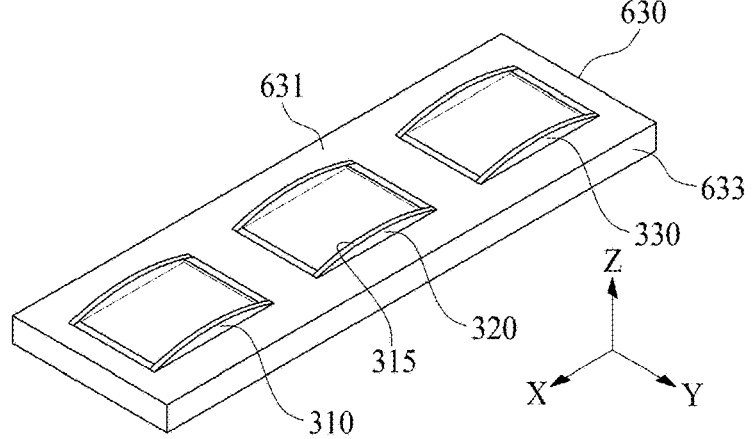
FIG. 24 is an example of a perspective view illustrating a rear surface of a cover member illustrated in FIGS. 22 and 23.

FIG. 22 is a perspective view illustrating an apparatus according to another example embodiment of the present disclosure. FIG. 23 is an example of a cross-sectional view taken along line V-V' illustrated in FIG. 22. FIG. 24 is an example of a perspective view illustrating a rear surface of a cover member illustrated in FIGS. 22 and 23.

With reference to FIGS. 22 to 24, an apparatus 3 according to a third example embodiment of the present disclosure may be applied to implement a sound apparatus, a sound output apparatus, a sound bar, a sound system, a sound apparatus for vehicular apparatuses, a sound output apparatus for vehicular apparatuses, or a sound bar for vehicular apparatuses, or the like. For example, the vehicular apparatus may include one or more seats and one or more glass windows. For example, the vehicular apparatus may include a vehicle, a train, a ship, or an aircraft, but embodiments of the present disclosure are not limited thereto. In addition, the apparatus 3 according to the third example embodiment of the present disclosure may implement an analog signage or a digital signage, or the like such as an advertising signboard, a poster, or a noticeboard, or the like.

An apparatus 3 according to a third example embodiment of the present disclosure may include a vibration member 600, a supporting portion 300, and first to $n^{th}$ (where n is a natural number of 2 or more) vibration apparatuses 500.

The vibration member 600 may be configured to output a sound based on vibrations of the first to $n^{th}$ vibration apparatuses 500. The vibration member 600 may include a vibration panel 610 and a cover member 630.

The vibration panel 610 may output a sound based on vibrations of the first to $n^{th}$ vibration apparatuses 500. Accordingly, the vibration panel 610 may be a passive vibration member, a front member, a forward member, a vibration object, a vibration plate, a passive vibration panel, a sound plate, a sound output member, a sound panel, or a sound output panel, but embodiments of the present disclosure are not limited thereto.

The vibration panel 610 may be configured to be transparent, translucent, or opaque. The vibration panel 610 according to an example embodiment of the present disclosure may include a metal material or a nonmetal material (or a composite nonmetal material) having a material characteristic suitable for outputting a sound based on a vibration. The metal material of the vibration panel 610 according to an example embodiment of the present disclosure may include any one or more materials of stainless steel, aluminum (Al), an Al alloy, a magnesium (Mg), a Mg alloy, and a magnesium-lithium (Mg—Li) alloy, but embodiments of the present disclosure are not limited thereto. The nonmetal material (or the composite nonmetal material) of the vibration panel 610 may include one or more of glass, plastic, fiber, leather, rubber, wood, cloth, paper, and a mirror but embodiments of the present disclosure are not limited thereto.

The vibration panel 610 according to an example embodiment of the present disclosure may implement a signage panel such as an analog signage of an advertising signboard, a poster, a noticeboard, or the like. For example, when vibration panel 610 implements the signage panel, the analog signage may include signage content such as a sentence, a picture, and a sign, or the like. The signage content may be disposed at the vibration panel 610 to be visible. For example, the signage content may be directly attached on one or more among a first surface (or a front surface) 600a of the vibration panel 610 and a second surface (or a rear surface) 600b which differs from (or opposite to) the first surface 600a. For example, the signage content may be printed on a medium such as paper or the like, and the medium with the signage content printed thereon may be directly attached on one or more of the first surface 600a and the second surface 600b of the vibration panel 610. For example, when the signage content is attached on the second surface 600b of the vibration panel 610, the vibration panel 610 may be configured as a transparent material.

The vibration panel 610 according to an example embodiment of the present disclosure may include a tetragonal shape. For example, the vibration panel 610 may include a plate structure. For example, the vibration panel 610 according to an example embodiment of the present disclosure may include a plate structure having a tetragonal shape. The vibration panel 610 may include a widthwise length parallel to a first direction X and a lengthwise length parallel to a second direction Y. For example, the vibration panel 610 may include a rectangular shape where a widthwise length is relatively longer than a lengthwise length, but embodiments of the present disclosure are not limited thereto. For example, the vibration panel 610 may include a square shape where a widthwise length is the same as a lengthwise length.

The cover member 630 may be disposed at a rear surface of the vibration panel 610. The cover member 630 may be configured to cover the rear surface of the vibration panel 610. The cover member 630 may include a rear portion 631 and a lateral portion 633. The cover member 630 may include a rear portion 631 covering the rear surface of the vibration panel 610 and a lateral portion 633 which is connected to the rear portion 631 and supports the vibration panel 610. The rear portion 631 and the lateral portion 633 may be respectively the same or substantially the same as the rear portion 131 and the lateral portion 135 described above with reference to FIGS. 1 to 3, and thus, a description (or details) of the cover member 130 illustrated in FIGS. 1 to 3 may be included in the description of the cover member 630 illustrated in FIGS. 22 to 24. Therefore, their repetitive descriptions may be omitted or will be briefly given below.

The lateral portion 633 of the cover member 630 may be coupled or connected to a rear periphery portion of the vibration panel 610 by a coupling member 620.

The coupling member 620 may be configured to minimize or prevent the transfer of a vibration of the vibration panel 610 to the cover member 630. The coupling member 620 may include a material characteristic suitable for blocking a vibration. For example, the coupling member 620 may include a material having elasticity for vibration absorption (or impact absorption). The coupling member 620 according to an example embodiment of the present disclosure may be configured as polyurethane materials or polyolefin materials, but embodiments of the present disclosure are not limited thereto. For example, the coupling member 620 may include one or more of an adhesive, a double-sided tape, a double-sided foam tape, and a double-sided cushion tape, but embodiments of the present disclosure are not limited thereto.

The coupling member 620 may prevent a physical contact (or friction) between the vibration panel 610 and the lateral portion 633 of the cover member 630, and thus, may prevent the occurrence of noise (or a noisy sound) caused by the physical contact (or friction) between the vibration panel 610 and the cover member 630. For example, the coupling member 620 may be a buffer member, an elastic member, a damping member, a vibration absorption member, or a vibration blocking member, but embodiments of the present disclosure are not limited thereto.

A supporting portion 300 may include first to $n^{th}$ (where n is a natural number of 2 or more) supporting portions 310, 320, and 330 which are arranged on a rear surface of the vibration member 600 at a predetermined interval along one or more of a first direction X and a second direction Y, and each may include a curved portion 315.

Each of the first to nah supporting portions 310, 320, and 330 may include a curved portion 315 configured to individually apply only a tension stress to each of the first to $n^{th}$ vibration apparatuses 500. For example, each of the first to $n^{th}$ supporting portions 310, 320, and 330 may include the curved portion 315 having a predetermined curvature. Each of the first to $n^{th}$ supporting portions 310, 320, and 330 may include a pair of first supporting members 311 and 312 and/or a pair of second supporting members 321 and 322, as illustrated in FIG. 4. Each of the first to $n^{th}$ supporting portions 310, 320, and 330 may be substantially the same as any one of the supporting portions 310 and 320 illustrated in FIG. 4, and thus, the descriptions (or details) of the supporting portions 310 and 320 illustrated in FIG. 4 may be included in the descriptions of the supporting portions 310, 320, and 330 illustrated in FIGS. 22 to 24, and their repetitive descriptions may be omitted or will be briefly given below.

According to an example embodiment of the present disclosure, each of the first to $n^{th}$ supporting portions 310, 320, and 330 may be provided at a rear surface of the vibration member 600 or the rear portion 631 of the cover member 630 to have a predetermined curvature. For example, the curved portion 315 of each of the first to $n^{th}$ supporting portions 310, 320, and 330 may have a curved shape having one curvature (or a single curvature). For example, the curved portion 315 of each of the first to $n^{th}$ supporting portions 310, 320, and 330 may have a curved structure having one curvature (or a single curvature) having no inflection point.

According to another example embodiment of the present disclosure, one or more among the curved portion 315 of each of the first to $n^{th}$ supporting portions 310, 320, and 330 may have different sizes. For example, the curved portion of any one of the first supporting portion 310 and the second supporting portion 320 may have a size which is smaller than that of the curved portion of the third supporting portion 330, as described above with reference to FIG. 9. For example, each of the first to $n^{th}$ supporting portions 310, 320, and 330 configured at the rear surface of the vibration member 600 or the rear portion 631 of the cover member 630 may have a size which decreases progressively toward both edges (or both peripheries) of the vibration member 600 from a center portion of the vibration member 600, with respect to the first direction X.

The apparatus 3 according to the third example embodiment of the present disclosure may further include a gap space GS provided between the rear surface of the vibration member 600 or the rear portion 631 of the cover member 630 and the first to $n^{th}$ vibration apparatuses 500 based on the supporting portion 300.

The gap space GS may be provided between the rear portion 631 of the cover member 630 and the first to $n^{th}$ vibration apparatuses 500 based on the supporting portion 300. The gap space GS may include a space where a sound or a sound pressure level is generated based on a vibration of each of the first to $n^{th}$ vibration apparatuses 500, a space where a vibration of each of the first to $n^{th}$ vibration apparatuses 500 is smoothly performed, or a space where a sound wave generated based on a vibration of each of the first to $n^{th}$ vibration apparatuses 500 is propagated to the vibration member 600. For example, the gap space GS may be an air gap, a sound pressure level generating space, a sound space, a sound pressure level space, a sounding portion, a sounding box, a sound wave propagation path, a sound energy incident portion, or a sound path, but embodiments of the present disclosure are not limited thereto.

Each of the first to $n^{th}$ vibration apparatuses 500 may be coupled to or attached on the curved portion 315 of a corresponding supporting portion of the first to $n^{th}$ supporting portions 310, 320, and 330.

According to another example embodiment of the present disclosure, each of the first to $n^{th}$ vibration apparatuses 500 may be coupled to or attached on the curved portion 315 of the supporting portion 300, and thus, may have a pre-stress or receive the pre-stress based on the curved portion 315. For example, each of the first to $n^{th}$ vibration apparatuses 500 may receive a tension stress or include the tension stress based on a curvature of the curved portion 315 of the supporting portion 300. For example, the curved portion 315 of the supporting portion 300 may be configured to apply only the tension stress to each of the first to $n^{th}$ vibration apparatuses 500, in order to enhance a vibration characteristic of each of the first to $n^{th}$ vibration apparatuses 500. Therefore, each of the first to $n^{th}$ vibration apparatuses 500 may vibrate in a state where the vibration apparatus 500 receive a pre-stress (or a pre-tension stress) or is bent in a curved shape, and thus, a second moment of inertia may increase or a vibration direction may be implemented as a single direction.

Each of the first to $n^{th}$ vibration apparatuses 500 may include the vibration apparatus described above with reference to FIG. 5 and the vibration generator described above with reference to FIGS. 10 to 21D. Therefore, the description of the vibration apparatus described above with reference to FIG. 5 and the description of the vibration generator described above with reference to FIGS. 10 to 21D may be included in the description of each of the plurality of vibration apparatuses 500 illustrated in FIG. 23, and thus, the repetitive description thereof may be omitted for brevity.

Each of the first to $n^{th}$ vibration apparatuses 500 may be configured to generate a sound of the same pitched sound band, or may be configured to generate a sound of a different pitched sound band. For example, an apparatus 3 according to the third example embodiment of the present disclosure may include the first to $n^{th}$ vibration apparatuses 500 respectively disposed at the curved portion 315 of each of the first to $n^{th}$ supporting portions 310, 320, and 330, and each of the first to $n^{th}$ vibration apparatuses 500 may be configured to generate a sound of the same pitched sound band, or may be configured to generate a sound of a different pitched sound band.

One or more of the first to $n^{th}$ vibration apparatuses 500 may be configured to generate sounds of different pitches sound bands or a sound of the low-pitched sound band. Therefore, the apparatus 3 according to the third example embodiment of the present disclosure may output a sound, for example, a stereo sound or a stereophonic sound and may have a sound output characteristic of a multichannel, due to a sound generated or output based on a region-based vibration of the vibration member 600 based on a vibration of each of the first to $n^{th}$ vibration apparatuses 500.

As described above, the apparatus 3 according to the third example embodiment of the present disclosure may include the first to $n^{th}$ vibration apparatuses 500 which vibrate in a state in which the first to $n^{th}$ vibration apparatuses 500 receive a pre-stress (or a pre-tension stress) or are bent in a curved shape, and thus, a second moment of inertia in the first to $n^{th}$ vibration apparatuses 500 may increase or a vibration direction of the first to $n^{th}$ vibration apparatuses 500 may be implemented as a single direction, thereby enhancing a sound characteristic and/or a sound pressure level characteristic of a sound generated by the vibration member 600 which vibrates based on a vibration of the first to $n^{th}$ vibration apparatuses 500. The apparatus 3 according to the third example embodiment of the present disclosure may vibrate the vibration member 600 based on a vibration of each of the first to $n^{th}$ vibration apparatuses 500 to output a sound, and thus, may output a sound, for example, a stereo sound or a stereophonic sound where a sound characteristic and/or a sound pressure level characteristic are/is enhanced and may have a sound output characteristic of a multichannel.

Figure 25:
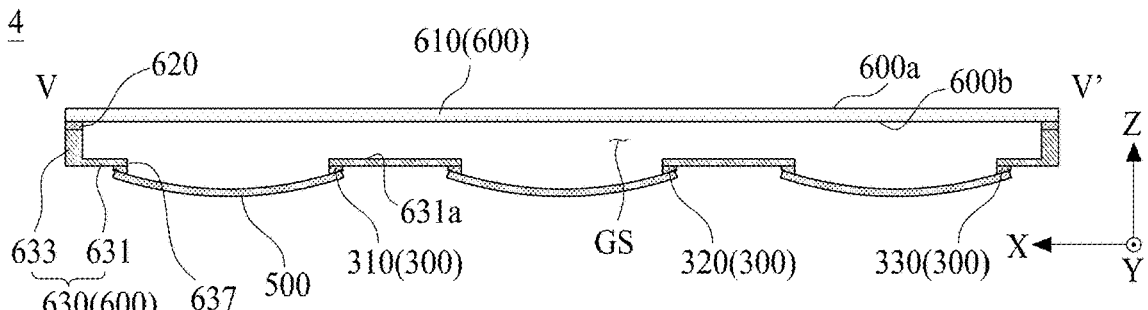
FIG. 25 is another example cross-sectional view taken along line V-V' illustrated in FIG. 22.
Figure 26:
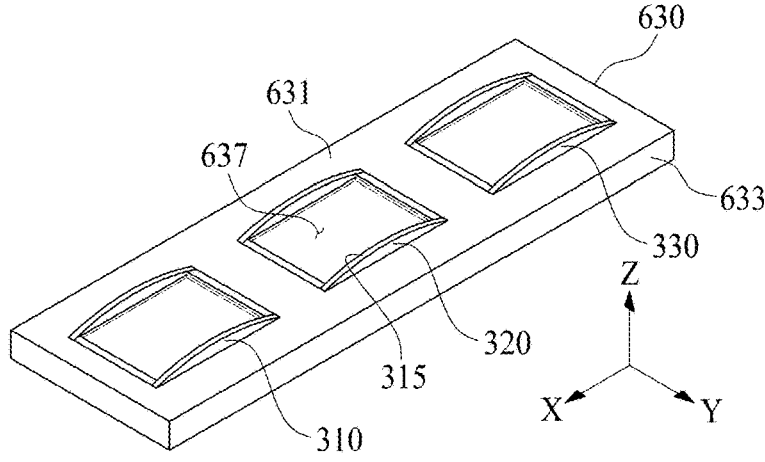
FIG. 26 is an example of a perspective view illustrating a cover member and a supporting portion illustrated in FIG. 25.

FIG. 25 is another example cross-sectional view taken along line V-V' illustrated in FIG. 22, and FIG. 26 is an example of a perspective view illustrating a cover member and a supporting portion illustrated in FIG. 25. FIGS. 25 and 26 illustrate an example embodiment where a hole is additionally configured to a vibration member, in the apparatus 3 described above with reference to FIGS. 22 to 24. FIGS. 25 and 26 illustrate an apparatus according to a fourth example embodiment of the present disclosure. In describing FIGS. 25 and 26, therefore, the same or similar elements other than a hole and relevant elements may be referred to by like reference numerals, and their repetitive descriptions may be omitted for brevity.

With reference to FIGS. 25 and 26, in an apparatus 4 according to a fourth example embodiment of the present disclosure, a vibration member 600 may further include first to $n^{th}$ holes 637 which respectively overlap the first to $n^{th}$ vibration apparatuses 500. In one or more aspects, each of the first to $n^{th}$ holes 637 overlaps a corresponding one of the first to $n^{th}$ vibration apparatuses 500. In an example, n may be a natural number of 2 or more. In another example, n may be a natural number of 1 such that there may be one hole 637 that overlaps one vibration apparatus 500.

Each of the first to $n^{th}$ holes 637 may be formed at the cover member 630 overlapping a respective one of the first to $n^{th}$ vibration apparatuses 500. For example, each of the first to $n^{th}$ holes 637 may be formed to pass through the rear portion 631 of the cover member 630, overlapping a respective one of the first to $n^{th}$ vibration apparatuses 500, along a third direction Z. Therefore, each of the first to $n^{th}$ holes 637 may be an opening portion, a communication portion, an opening hole, a communication hole, a through portion, a through port, a through hole, a supporting hole, a slit, a slot, or a sound through portion, but embodiments of the present disclosure are not limited thereto. One or more of the first to $n^{th}$ holes 637 may be substantially the same as the one or more holes 137 described above with reference to FIGS. 7 to 9, and thus, their repetitive descriptions may be omitted for brevity, and the description of the one or more holes 137 illustrated in FIGS. 7 to 9 may be included in the description of one or more of the first to $n^{th}$ holes 637 illustrated in FIGS. 25 and 26.

According to an example embodiment of the present disclosure, any one or each of the first to $n^{th}$ holes 637 may have a size which is less than that of the vibration apparatus 500. For example, any one or each of the first to $n^{th}$ holes 637 may have a circular shape, an oval shape, a tetragonal shape, a slit shape, a slot shape, or a dotted-line shape, or the like, but embodiments of the present disclosure are not limited thereto.

Like the apparatus 3 according to the third example embodiment of the present disclosure, the apparatus 4 according to the fourth example embodiment of the present disclosure may vibrate in a state where the vibration apparatus 500 receives a pre-stress (or a pre-tension stress) or is bent in a curved shape, and thus, a second moment of inertia in the vibration apparatus 500 may increase or a vibration direction of the vibration apparatus 500 may be implemented as a single direction, thereby enhancing a sound characteristic and/or a sound pressure level characteristic generated by the vibration member 100 vibrating based on a vibration of the vibration apparatus 500. In addition, the apparatus 4 according to the fourth example embodiment of the present disclosure may include one or more of the first to $n^{th}$ holes 637 which are formed at the cover member 630, and thus, a sound (or a sound wave) generated based on a vibration of the vibration apparatus 500 may be directly transferred to the vibration panel 610. Accordingly, the transfer efficiency of a vibration may increase, and a sound characteristic and/or a sound pressure level characteristic generated based on a vibration of the vibration member 600 or the vibration panel 610 may be further enhanced.

Figure 27:
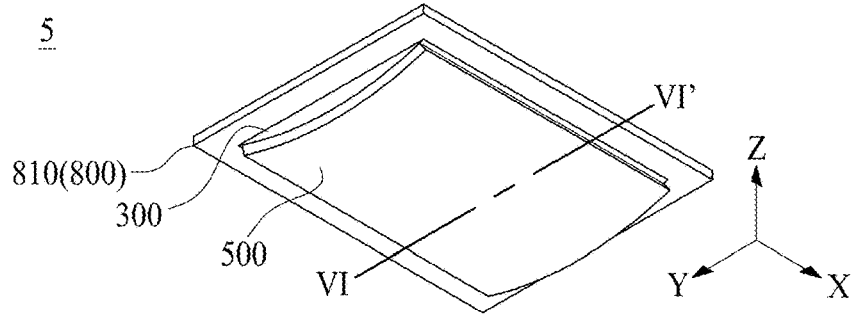
FIG. 27 is a rear perspective view illustrating an apparatus according to a fifth example embodiment of the present disclosure.
Figure 28:
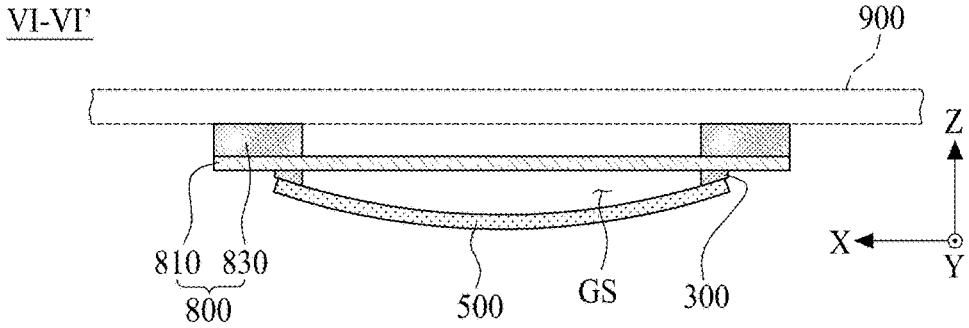
FIG. 28 is an example of a cross-sectional view taken along line VI-VI' illustrated in FIG. 27.
Figure 29:
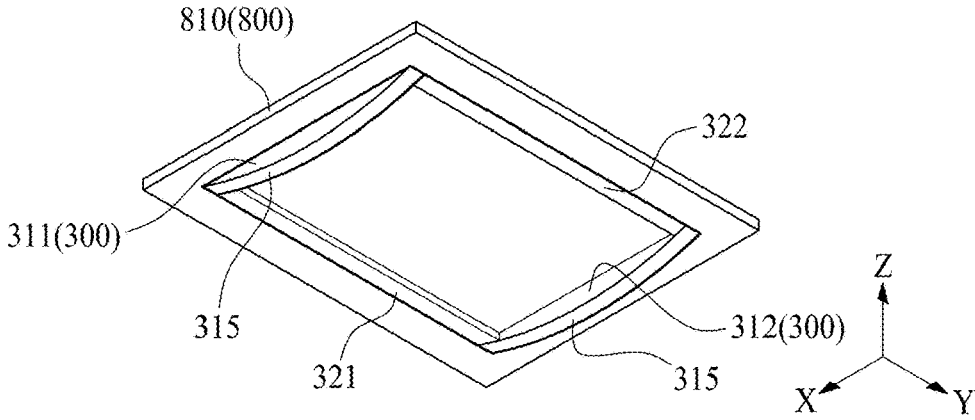
FIG. 29 is an example of a perspective view illustrating a base plate and a supporting portion illustrated in FIGS. 27 and 28.

FIG. 27 is a rear perspective view illustrating an apparatus according to a fifth example embodiment of the present disclosure. FIG. 28 is an example of a cross-sectional view taken along line VI-VI' illustrated in FIG. 27. FIG. 29 is an example of a perspective view illustrating a base plate and a supporting portion illustrated in FIGS. 27 and 28.

With reference to FIGS. 27 to 29, an apparatus 5 according to a fifth example embodiment of the present disclosure may be one (or single) vibration element (or component) which is coupled to or attached on a vibration member 900 and configured to vibrate the vibration member 900 to output a vibration or a sound. Therefore, the apparatus 5 according to the fifth example embodiment of the present disclosure may be a vibration generating apparatus, a vibration generating device, a vibration source, a vibration generating unit, a vibration unit, a vibration module, a vibration generating element, an active vibration member, a sound generating device, a sound generating unit, a transparent vibration generating apparatus, a transparent sound generating unit, a semi-transparent sound generating unit, an opaque sound generating unit, a transparent sound generating device, a transparent vibration source, a semi-transparent vibration source, an opaque vibration source, or a vibration structure, but embodiments of the present disclosure are not limited thereto.

The apparatus 5 according to the fifth example embodiment of the present disclosure may be applied to implement a sound apparatus, a sound output apparatus, a sound bar, a sound system, a sound apparatus for vehicular apparatuses, a sound output apparatus for vehicular apparatuses, or a sound bar for vehicular apparatuses, or the like. For example, the vehicular apparatus may include one or more seats and one or more glass windows. For example, the vehicular apparatus may include a vehicle, a train, a ship, or an aircraft, but embodiments of the present disclosure are not limited thereto. In addition, the apparatus 5 according to the fifth example embodiment of the present disclosure may implement an analog signage or a digital signage, or the like such as an advertising signboard, a poster, or a noticeboard, or the like.

The apparatus 5 according to the fifth example embodiment of the present disclosure may include a base member 800, a supporting portion 300, and a vibration apparatus 500.

The base member 800 may include a three or more-angled polygonal shape or a three or more-angled non-tetragonal shape including one or more curved surfaces. For example, the base member 800 may include a square shape or a rectangular shape.

The base member 800 according to an example embodiment of the present disclosure may include a base plate 810 and a coupling member 830.

The base plate 810 may include a three or more-angled polygonal shape or a three or more-angled non-tetragonal shape including one or more curved surfaces. For example, the base plate 810 may include a square shape or a rectangular shape. For example, as illustrated in FIG. 29, the base plate 810 may include a circular shape or an oval shape. For example, the base plate 810 may be a supporting member, a base frame, or a supporting frame, but embodiments of the present disclosure are not limited thereto.

The base plate 810 may include a metal material or a nonmetal material (or a composite nonmetal material) having a material characteristic suitable for outputting a sound based on a vibration. For example, the base plate 810 may include a transparent plastic material, an opaque plastic material, wood, or a metal material, but embodiments of the present disclosure are not limited thereto.

The coupling member 830 may be disposed at a first surface of the base plate 810. The coupling member 830 may couple or connect the vibration apparatus 500 or the base plate 810 to the vibration member 900. The vibration apparatus 500 or the base plate 810 may be coupled or connected to the vibration member 900 by the coupling member 830.

The supporting portion 300 may be disposed at a rear surface of the base member 800 or a rear surface of the base plate 810 and may include a curved portion 315.

The supporting portion 300 may include the curved portion 315 configured to individually apply only a tension stress to the vibration apparatus 500. For example, the supporting portion 300 may include the curved portion 315 having a predetermined curvature. The supporting portion 300 may include a pair of first supporting members 311 and 312 and a pair of second supporting members 321 and 322, as illustrated in FIG. 4. The supporting portion 300 may be substantially the same as the supporting portions 310 and 320 illustrated in FIG. 4, and thus, the descriptions (or details) of the supporting portions 310 and 320 illustrated in FIG. 4 may be included in the descriptions of the supporting portion 300 illustrated in FIGS. 27 to 29, and their repetitive descriptions may be omitted or will be briefly given below.

The supporting portion 300 may be configured at a rear surface of the base member 800 or a rear surface of the base plate 810 to have a predetermined curvature. For example, a curved portion 315 of the supporting portion 300 may have a curved shape having one curvature (or a single curvature). For example, the curved portion 315 of the supporting portion 300 may have a curved structure having one curvature (or a single curvature) having no inflection point.

The apparatus 5 according to the fifth example embodiment of the present disclosure may further include a gap space GS provided between the rear surface of the base member 800 or the rear surface of the base plate 810 and the vibration apparatus 500 by the supporting portion 300.

The gap space GS may be provided between the base plate 810 and the vibration apparatus 500 by the supporting portion 300. The gap space GS may include a space where a sound or a sound pressure level is generated based on a vibration of the vibration apparatus 500, a space where a vibration of the vibration apparatus 500 is smoothly performed, or a space where a sound wave generated based on a vibration of the vibration apparatus 500 is propagated to the vibration member 900. For example, the gap space GS may be an air gap, a sound pressure level generating space, a sound space, a sound pressure level space, a sounding portion, a sounding box, a sound wave propagation path, a sound energy incident portion, or a sound path, but embodiments of the present disclosure are not limited thereto.

The vibration apparatus 500 may be coupled to or attached on the curved portion 315 of the supporting portion 300, and thus, may have a pre-stress or receive the pre-stress based on the curved portion 315. For example, the vibration apparatus 500 may receive a tension stress or include the tension stress based on a curvature of the curved portion 315. For example, the curved portion 315 of the supporting portion 300 may be configured to apply only the tension stress to the vibration apparatus 500, in order to enhance a vibration characteristic of the vibration apparatus 500. Therefore, the vibration apparatus 500 may vibrate in a state where the vibration apparatus 500 receive a pre-stress (or a pre-tension stress) or is bent in a curved shape, and thus, a second moment of inertia may increase or a vibration direction may be implemented as a single direction.

The vibration apparatus 500 may include the vibration apparatus described above with reference to FIG. 5 and the vibration generator described above with reference to FIGS. 10 to 21D. Therefore, the description of the vibration apparatus 500 described above with reference to FIG. 5 and the description of the vibration generator 510 described above with reference to FIGS. 10 to 21D may be included in the description of the vibration apparatus 500 illustrated in FIGS. 27 and 28, and thus, the repetitive description thereof may be omitted for brevity.

The apparatus 5 according to the fifth example embodiment of the present disclosure may be coupled to a vibration member 900 by the coupling member 830 and may vibrate the vibration member 900 based on a sound (or a sound wave) generated based on a vibration of the vibration apparatus 500, and thus, a sound characteristic and/or a sound pressure level characteristic of the low-pitched sound band generated based on a vibration of the vibration member 900 may be enhanced. For example, the vibration member 900 may be a passive vibration member, a vibration plate, a vibration object, a sound output plate, a sound vibration plate, or an image screen, or the like, but embodiments of the present disclosure are not limited thereto.

The vibration member 900 may be a vibration plate which includes a metal material or a nonmetal material (or a composite nonmetal material) having a material characteristic suitable for being vibrated by the apparatus 5 to output sound.

The vibration member 900 according to an example embodiment of the present disclosure may include a vibration plate which includes one or more materials of metal, plastic, paper, fiber, cloth, leather, rubber, wood, glass, and a mirror, but embodiments of the present disclosure are not limited thereto. For example, the paper may be conge for speakers. For example, the conge may be pulp or foamed plastic, or the like, but embodiments of the present disclosure are not limited thereto.

The vibration member 900 according to another example embodiment of the present disclosure may include a display panel including a pixel displaying an image, or may include a non-display panel. For example, the vibration member 900 may include one or more among a display panel including a pixel displaying an image, a screen panel on which an image is to be projected from a display apparatus, a lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror, but embodiments of the present disclosure are not limited thereto. For example, the non-display panel may be a light emitting diode lighting panel (or apparatus), an organic light emitting lighting panel (or apparatus), or an inorganic light emitting lighting panel (or apparatus), but embodiments of the present disclosure are not limited thereto.

The coupling member 830 may be configured to minimize or prevent the transfer of a vibration of the vibration member 900 to the supporting portion 300. The coupling member 830 may include a material characteristic suitable for blocking a vibration. For example, the coupling member 830 may include a material having elasticity for vibration absorption (or impact absorption). The coupling member 830 according to an example embodiment of the present disclosure may be configured as polyurethane materials or polyolefin materials, but embodiments of the present disclosure are not limited thereto. For example, the coupling member 830 may include one or more of an adhesive, a double-sided tape, a double-sided foam tape, and a double-sided cushion tape, but embodiments of the present disclosure are not limited thereto.

The apparatus 5 according to the fifth example embodiment of the present disclosure may vibrate in a state where the vibration apparatus 500 receives a pre-stress (or a pre-tension stress) or is bent in a curved shape, and thus, a second moment of inertia in the vibration apparatus 500 may increase or a vibration direction of the vibration apparatus 500 may be implemented as a single direction. Accordingly, a sound characteristic and/or a sound pressure level characteristic generated based on a vibration of the vibration apparatus 500 may be enhanced, and a sound generated based on a vibration of the vibration apparatus 500 may concentrate in a forward direction of a center portion of the curved portion 315. Thus, a sound characteristic and/or a sound pressure level characteristic generated based on a vibration of the vibration member 900 may be further enhanced.

Figure 30:
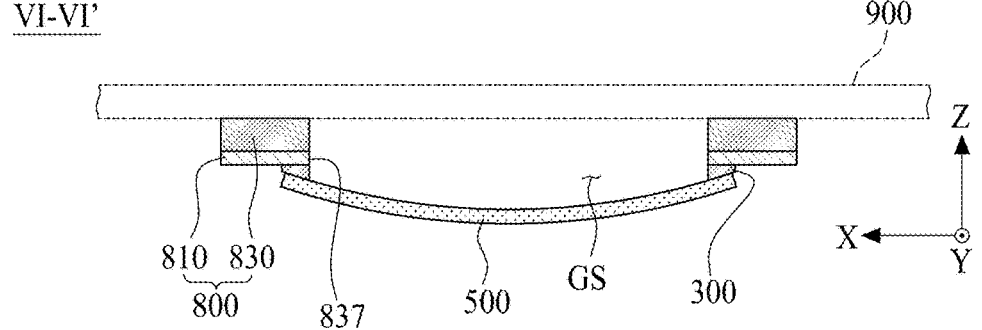
FIG. 30 is another example cross-sectional view taken along line VI-VI' illustrated in FIG. 27.
Figure 31:
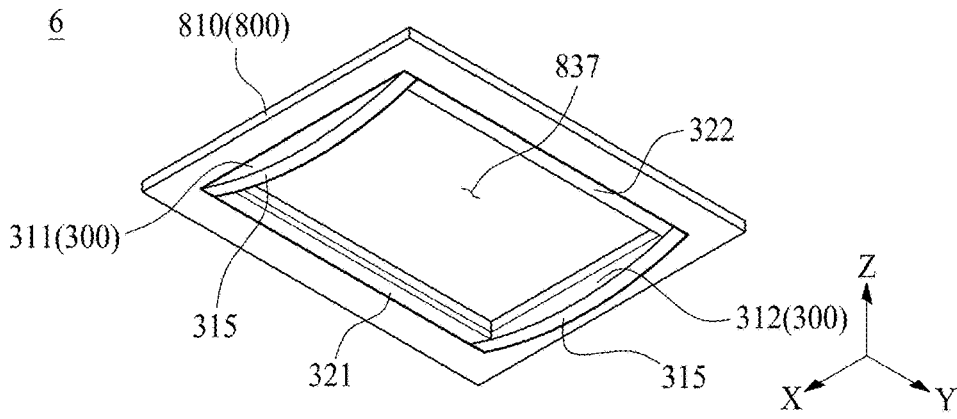
FIG. 31 is an example of a perspective view illustrating a base plate and a supporting portion illustrated in FIG. 30.

FIG. 30 is another example cross-sectional view taken along line VI-VI' illustrated in FIG. 27. FIG. 31 is an example of a perspective view illustrating a base plate and a supporting portion illustrated in FIG. 30. FIGS. 30 and 31 illustrate an apparatus according to a sixth example embodiment of the present disclosure.

With reference to FIGS. 30 and 31, in an apparatus 6 according to a sixth example embodiment of the present disclosure, a base member 800 or a base plate 810 may further include one or more holes 837 which overlap the vibration apparatuses 500.

The one or more holes 837 may be formed at the base plate 810 overlapping the vibration apparatus 500. For example, the one or more holes 837 may be formed to pass through the base plate 810 overlapping the vibration apparatus 500 along a third direction Z. Therefore, each of the one or more holes 837 may be an opening portion, a communication portion, an opening hole, a communication hole, a through portion, a through port, a through hole, a supporting hole, a slit, a slot, or a sound through portion, but embodiments of the present disclosure are not limited thereto. The one or more holes 837 may be substantially the same as the one or more holes 137 described above with reference to FIGS. 7 to 9 or the one or more holes 637 described above with reference to FIGS. 25 and 26, and thus, their repetitive descriptions may be omitted for brevity, and the description of the one or more holes 137 illustrated in FIGS. 7 to 9 or the description of the one or more holes 637 illustrated in FIGS. 25 and 26 may be included in the description of the one or more holes 837 illustrated in FIGS. 30 and 31.

According to an example embodiment of the present disclosure, the one or more holes 837 may have a size or an area which is smaller than that of the vibration apparatus 500. For example, the one or more holes 837 may have a circular shape, an oval shape, a tetragonal shape, a slit shape, a slot shape, or a dotted-line shape, or the like, but embodiments of the present disclosure are not limited thereto. The one or more holes 837 may be covered by the vibration apparatus 500. For example, the one or more holes 837 may be disposed between the pair of first supporting members (or supporting bars) 311 and 312 illustrated in FIG. 4. For example, the one or more holes 837 may be surrounded by the pair of first supporting members (or supporting bars) 311 and 312 and the pair of second supporting members (or supporting bars) 321 and 322 illustrated in FIG. 4.

Like the apparatus 5 according to the fifth example embodiment of the present disclosure, the apparatus 6 according to the sixth example embodiment of the present disclosure may vibrate in a state where the vibration apparatus 500 receives a pre-stress (or a pre-tension stress) or is bent in a curved shape, and thus, a second moment of inertia in the vibration apparatus 500 may increase or a vibration direction of the vibration apparatus 500 may be implemented as a single direction, thereby enhancing a sound characteristic and/or a sound pressure level characteristic generated by the vibration member 900 vibrating based on a vibration of the vibration apparatus 500. In addition, the apparatus 6 according to the sixth example embodiment of the present disclosure may include the one or more holes 837 which are formed at the base member 800 or the base plate 810, and thus, a sound (or a sound wave) generated based on a vibration of the vibration apparatus 500 may be directly transferred to the vibration member 900. Accordingly, the transfer efficiency of a vibration may increase, and a sound characteristic and/or a sound pressure level characteristic generated based on a vibration of the vibration member 900 may be further enhanced.

Figure 32:
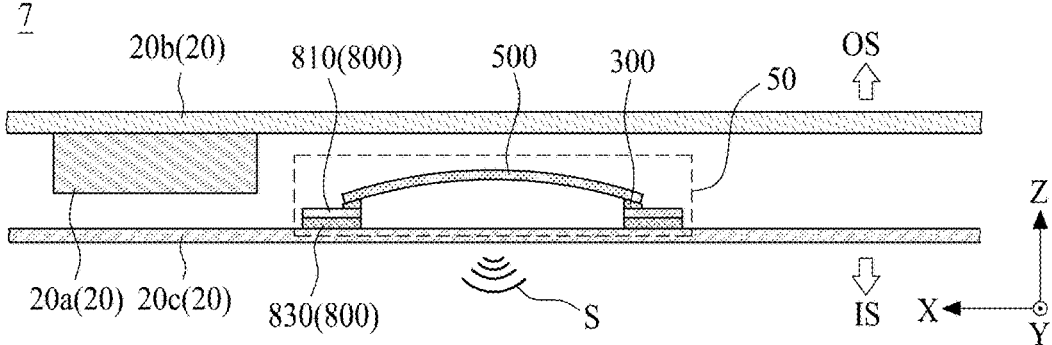
FIG. 32 illustrates an apparatus according to a seventh example embodiment of the present disclosure.

FIG. 32 illustrates an apparatus according to a seventh example embodiment of the present disclosure. FIG. 32 illustrates an apparatus applying or including the apparatus illustrated in one or more of FIGS. 27 to 31.

With reference to FIG. 32, the apparatus 7 according to the seventh example embodiment of the present disclosure may be configured as a vibration apparatus for vehicular apparatuses, a vibration generating apparatus for vehicular apparatuses, a sound apparatus for vehicular apparatuses, a sound generating apparatus for vehicular apparatuses, a speaker for vehicular apparatuses, a sound apparatus for vehicles, a sound generating apparatus for vehicles, or a speaker for vehicles, or the like, but embodiments of the present disclosure are not limited thereto.

The apparatus 7 according to the seventh example embodiment of the present disclosure may include one or more vibration generating apparatuses 50 which are configured to output a sound to one or more of an indoor space IS and an outdoor space OS of a vehicular apparatus 20.

The vehicular apparatus 20 may include one or more seats and one or more glass windows. For example, the vehicular apparatus 20 may include a vehicle, a train, a ship, or an aircraft, or the like, but embodiments of the present disclosure are not limited thereto.

The vehicular apparatus 20 according to an example embodiment of the present disclosure may include a main structure 20a, an exterior material 20b, and an interior material 20c.

The main structure (or a frame structure) 20a may include a main frame, a sub-frame, a side frame, a door frame, an under frame, and a seat frame, or the like, but embodiments of the present disclosure are not limited thereto.

The exterior material 20b may be configured to cover the main structure 20a. For example, the exterior material 20b may be configured to cover an outer portion of the main structure 20a. The exterior material 20b according to an example embodiment of the present disclosure may include a hood panel, a front fender panel, a dash panel, a filler panel, a trunk panel, a roof panel, a floor panel, a door inner panel, and a door outer panel, or the like, but embodiments of the present disclosure are not limited thereto. The exterior material 20b according to an example embodiment of the present disclosure may include at least one or more of a planar portion and a curved portion. For example, the exterior material 20b may have a surface structure corresponding to a surface structure of a corresponding main structure 20a, or may have a surface structure which differs from the surface structure of the corresponding main structure 20a.

The interior material 20c may include all elements configuring an inner portion of the vehicular apparatus 20, or may include all elements disposed at the indoor space IS of the vehicular apparatus 20. For example, the interior material 20c may be an interior member or an inner finish material of the vehicular apparatus 20, but embodiments of the present disclosure are not limited thereto.

The interior material 20c according to an example embodiment of the present disclosure may cover one or more among the main structure 20a and the exterior material 20b in the indoor space IS of the vehicular apparatus 20 and may be configured to be exposed at the indoor space IS of the vehicular apparatus 20. For example, the interior material 20c may include a dashboard, a pillar interior material (or a pillar trim), a floor interior material (or a floor carpet), a roof interior material (or a headliner), a door interior material (or a door trim), a handle interior material (or a steering cover), a seat interior material, a rear package interior material (or a back seat shelf), an overhead console (or an indoor illumination interior material), a rear view mirror, a glove box, and a sun visor, or the like, but embodiments of the present disclosure are not limited thereto.

The interior material 20c according to an example embodiment of the present disclosure may include one or more material of plastic, fiber, rubber, leather, cloth, wood, and metal, but embodiments of the present disclosure are not limited thereto.

The interior material 20c according to another example embodiment of the present disclosure may include a base member and a surface member. For example, the base member may be an injection material, a first interior material, an inner interior material, or a rear interior material, but embodiments of the present disclosure are not limited thereto. The surface member may be a second interior material, an outer interior material, a front interior material, an outer surface member, a reinforcement member, or a decoration member, but embodiments of the present disclosure are not limited thereto.

The interior material 20c or the base member may include a plastic material. For example, the interior material 20c or the base member may be an injection material which is implemented by an injection process (or injection molding process) using a thermoplastic resin or a thermosetting resin, but embodiments of the present disclosure are not limited thereto. The interior material 20c or the base member may be configured to cover one or more among the main structure 20a and the exterior material 20b in the indoor space IS of the vehicular apparatus 20. For example, the interior material 20c or the base member may be configured to cover one or more surfaces (or an inner surface) of at least one or more of a main frame, a side frame, a door frame, and a handle frame, which are exposed at the indoor space IS of the vehicular apparatus 20.

The surface member may be disposed to cover the base member. The surface member may cover the base member in the indoor space IS of the vehicular apparatus 20 and may be configured to be exposed at the indoor space IS. For example, the surface member may be disposed at or coupled to a front surface of the base member exposed at the indoor space IS of the vehicular apparatus 20. For example, the surface member may include one or more materials of plastic, fiber, leather, rubber, cloth, wood, and metal, but embodiments of the present disclosure are not limited thereto.

The interior material 20c or the surface member including a fiber material may include at least one or more of a synthetic fiber, a carbon fiber (or an aramid fiber), and a natural fiber. For example, the interior material 20c or the surface member including a fiber material may be a textile sheet, a knit sheet, or a nonwoven fabric, but embodiments of the present disclosure are not limited thereto. For example, the interior material 20c or the surface member including a fiber material may be a fabric member, but embodiments of the present disclosure are not limited thereto. The synthetic fiber may be a thermoplastic resin and may include a polyolefin-based fiber which is an eco-friendly material which does not relatively release a harmful substance, but embodiments of the present disclosure are not limited thereto. For example, the polyolefin-based fiber may include a polyethylene fiber, a polypropylene fiber, or a polyethylene terephthalate fiber, but embodiments of the present disclosure are not limited thereto. The polyolefin-based fiber may be a fiber of a single resin or a fiber of a core-shell structure. The natural fiber may be a composite fiber of any one or two or more of a jute fiber, a kenaf fiber, an abaca fiber, a coconut fiber, and a wood fiber, but embodiments of the present disclosure are not limited thereto.

The one or more vibration generating apparatuses 50 may be configured to output a sound between the exterior material 20b and the interior material 20c. For example, the one or more vibration generating apparatuses 50 may be disposed between the exterior material 20b and the interior material 20c, and may indirectly or directly vibrate one or more of the exterior material 20b and the interior material 20c to output sound. Accordingly, one or more of the exterior material 20b and the interior material 20c may be a vibration member or a passive vibration member which generates or outputs a sound.

The one or more vibration generating apparatuses 50 may be coupled to or attached on the exterior material 20b or the interior material 20c in a space between the exterior material 20b and the interior material 20c. One or more of the exterior material 20b and the interior material 20c of the vehicular apparatus 20 may be a vibration plate, a sound vibration plate, or a sound generating plate, or the like for outputting a sound. For example, each of the exterior material 20b and the interior material 20c for outputting the sound may have a size which is greater than that of the one or more vibration generating apparatuses 50, and thus, may perform a function of a large-area vibration plate, a large-area sound vibration plate, or a large-area sound generating plate, thereby enhancing a sound characteristic and/or a sound pressure level characteristic of a low-pitched sound band generated by the one or more vibration generating apparatuses 50. For example, a frequency of a sound of the low-pitched sound band may be 500 Hz or less, but embodiments of the present disclosure are not limited thereto.

The one or more vibration generating apparatuses 50 according to an example embodiment of the present disclosure may output a sound between the exterior material 20b and the interior material 20c of the vehicular apparatus 20. For example, the one or more vibration generating apparatuses 50 may be connected to or coupled to one or more of the exterior material 20b and the interior material 20c between the exterior material 20b and the interior material 20c, and may indirectly or directly vibrate one or more of the exterior material 20b and the interior material 20c to output sound.

The one or more vibration generating apparatuses 50 according to an example embodiment of the present disclosure may be configured to include the apparatus 5 and 6 according to the fifth embodiment or the sixth example embodiment of the present disclosure described above with reference to FIGS. 27 to 31. Accordingly, the repetitive description of the one or more vibration generating apparatuses 50 may be omitted for brevity.

The one or more vibration generating apparatuses 50 may be coupled to or attached on the exterior material 20b or the interior material 20c by a coupling member 830 in a space between the exterior material 20b and the interior material 20c. For example, when the one or more vibration generating apparatuses 50 include the apparatus 5 and 6 described above with reference to FIGS. 27 to 31, the base member 800 or the base plate 810 may be coupled to or attached on the interior material 20c by the coupling member 830 in the space between the exterior material 20b and the interior material 20c. Therefore, a gap space GS may be provided between the one or more vibration generating apparatuses 50 and the interior material 20c, a sound S generated based on vibrations of the one or more vibration generating apparatuses 50 may be output to the gap space GS, and the interior material 20c may vibrate based on a sound (or a sound wave) transferred through the gap space GS to output a sound S to one or more of an indoor space IS and an outdoor space OS of the vehicular apparatus 20. Accordingly, the apparatus 7 according to the seventh example embodiment of the present disclosure may vibrate the interior material 20c based on a vibration of the one or more vibration generating apparatuses 50 to output a sound to one or more of the indoor space IS and the outdoor space OS of the vehicular apparatus 20.

The apparatus 7 according to the seventh example embodiment of the present disclosure may indirectly or directly vibrate one or more of the exterior material 20b and the interior material 20c of the vehicular apparatus 20, thereby outputting a sound to one or more of the indoor space IS and the outdoor space OS of the vehicular apparatus 20.

Figure 33:
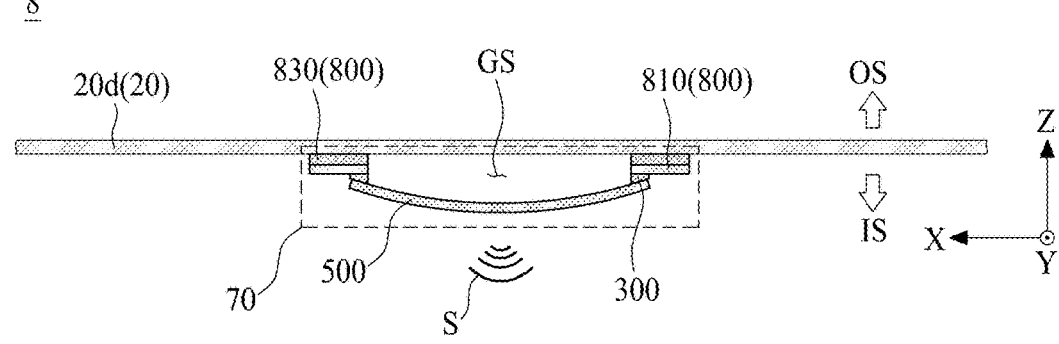
FIG. 33 illustrates an apparatus according to an eighth example embodiment of the present disclosure.

FIG. 33 illustrates an apparatus according to an eighth example embodiment of the present disclosure. FIG. 33 illustrates an apparatus applying or including the apparatus illustrated in one or more of FIGS. 27 to 31.

With reference to FIG. 33, the apparatus 8 according to the eighth example embodiment of the present disclosure may include one or more vibration generating apparatuses 70 which are disposed at a glass window 20d of a vehicular apparatus 20 to output a sound.

The glass window 20d of the vehicular apparatus 20 may include at least one or more of a front glass window and a side glass window. In addition, the glass window 20d of the vehicular apparatus 20 may further include at least one or more of a rear glass window and a roof glass window.

The glass window 20d according to an example embodiment of the present disclosure may be configured to be wholly transparent. The glass window 20d according to another example embodiment of the present disclosure may include a transparent portion and a semi-transparent portion surrounding the transparent portion. The glass window 20d according to another example embodiment of the present disclosure may include a transparent portion and an opaque portion surrounding the transparent portion.

The one or more vibration generating apparatuses 70 may be configured to be transparent or semi-transparent. For example, when the glass window 20*d* is wholly transparent, the one or more vibration generating apparatuses 70 may be configured to be transparent and may be disposed at a middle region or a peripheral region of the glass window 20*d*. When the glass window 20*d* includes the semi-transparent portion or the opaque portion, the one or more vibration generating apparatuses 70 may be configured to be semi-transparent or opaque and may be disposed at the semi-transparent portion or the opaque portion of the glass window 20*d*. For example, the one or more vibration generating apparatuses 70 may be referred to as a transparent vibration generating apparatus, a semi-transparent vibration generating apparatus, an opaque vibration generating apparatus, a transparent sound generating apparatus, a semi-transparent sound generating apparatus, or an opaque sound generating apparatus, or the like, but embodiments of the present disclosure are not limited thereto.

The one or more vibration generating apparatuses 70 may be connected to or coupled to one surface (or an indoor surface) of the glass window 20*d* exposed at the indoor space IS of the vehicular apparatus 20. For example, the one or more vibration generating apparatuses 70 may be disposed at at least one or more of the front glass window and the side glass window, and may be additionally disposed at at least one or more of the rear glass window and the roof glass window.

The one or more vibration generating apparatuses 70 may indirectly or directly vibrate the glass window 20*d* to output a sound. For example, the one or more vibration generating apparatuses 70 may be configured to output the sound toward the indoor space IS by vibrating itself, or may vibrate the glass window 20*d* to output the sound toward the indoor space IS.

The one or more vibration generating apparatuses 70 according to an example embodiment of the present disclosure may be configured to include the apparatus 5 and 6 according to the fifth embodiment or the sixth example embodiment of the present disclosure described above with reference to FIGS. 27 to 31 and may be configured to be transparent, semi-transparent, or opaque. For example, the base member 800 and the vibration apparatus 500 described above with reference to FIGS. 27 to 31 may be configured to be transparent, semi-transparent, or opaque, and thus, their repetitive descriptions may be omitted for brevity.

The one or more vibration generating apparatuses 70 according to an example embodiment of the present disclosure may be coupled to or attached on one surface (or an indoor surface) of the glass window 20*d* by a coupling member 830. For example, when one or more vibration generating apparatuses 70 include the apparatus 5 and 6 described above with reference to FIGS. 27 to 31, the base plate 810 of the base member 800 may be coupled to or attached on one surface (or an indoor surface) of a glass window 20*d* by the coupling member 830. For example, the apparatus 8 according to the eighth example embodiment of the present disclosure may output a sound S, generated based on a vibration of the one or more vibration generating apparatuses 70, to one or more of the indoor space IS and the outdoor space OS. In addition, the apparatus 8 according to the eighth example embodiment of the present disclosure may vibrate a glass window 20*d* based on a vibration of the one or more vibration generating apparatuses 70 to output the sound S to one or more of the indoor space IS and the outdoor space OS of the vehicular apparatus 20.

The one or more vibration generating apparatuses 70 according to another example embodiment of the present disclosure may be covered by an optical film attached on one surface (or an indoor surface) of the glass window 20*d*. The optical film may be attached on the one surface (or the indoor surface) of the glass window 20*d* to cover the one or more vibration generating apparatuses 70, and thus, may protect the one or more vibration generating apparatuses 70 or may fix the one or more vibration generating apparatuses 70 to the glass window 20*d*. The optical film may include one or more of an infrared ray blocking film for blocking an infrared ray, a light block film for blocking light, and a heat blocking film for blocking heat, but embodiments of the present disclosure are not limited thereto.

Therefore, the apparatus 8 according to the eighth example embodiment of the present disclosure may be connected to the glass window 20*d* and may output a sound toward one or more of the indoor space IS and the outdoor space OS of the vehicular apparatus 20 by vibrating itself or by the glass window 20*d* as a sound vibration plate.

Figure 34:
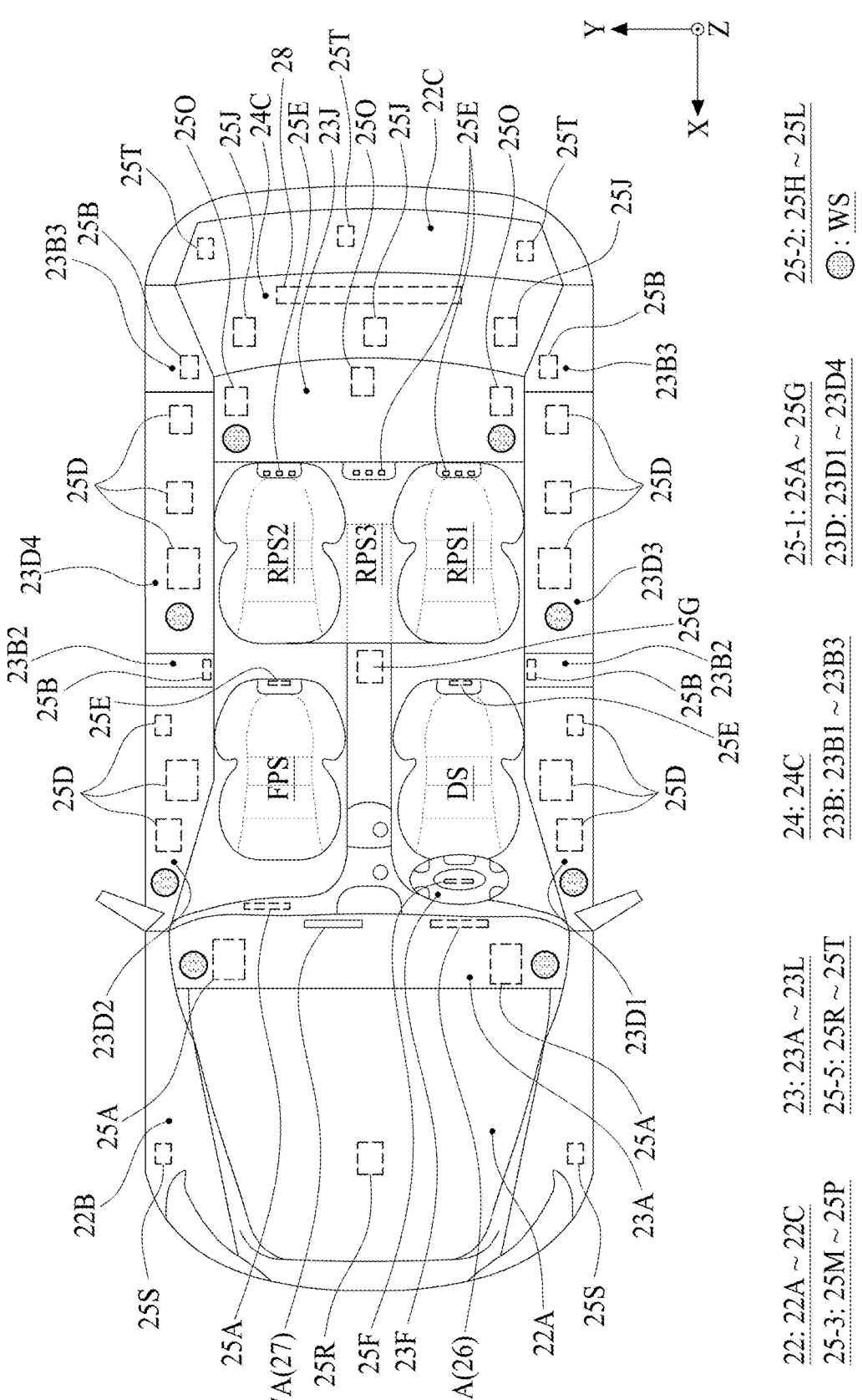
FIG. 34 is a plan view illustrating an apparatus according to a ninth example embodiment of the present disclosure.
Figure 35:
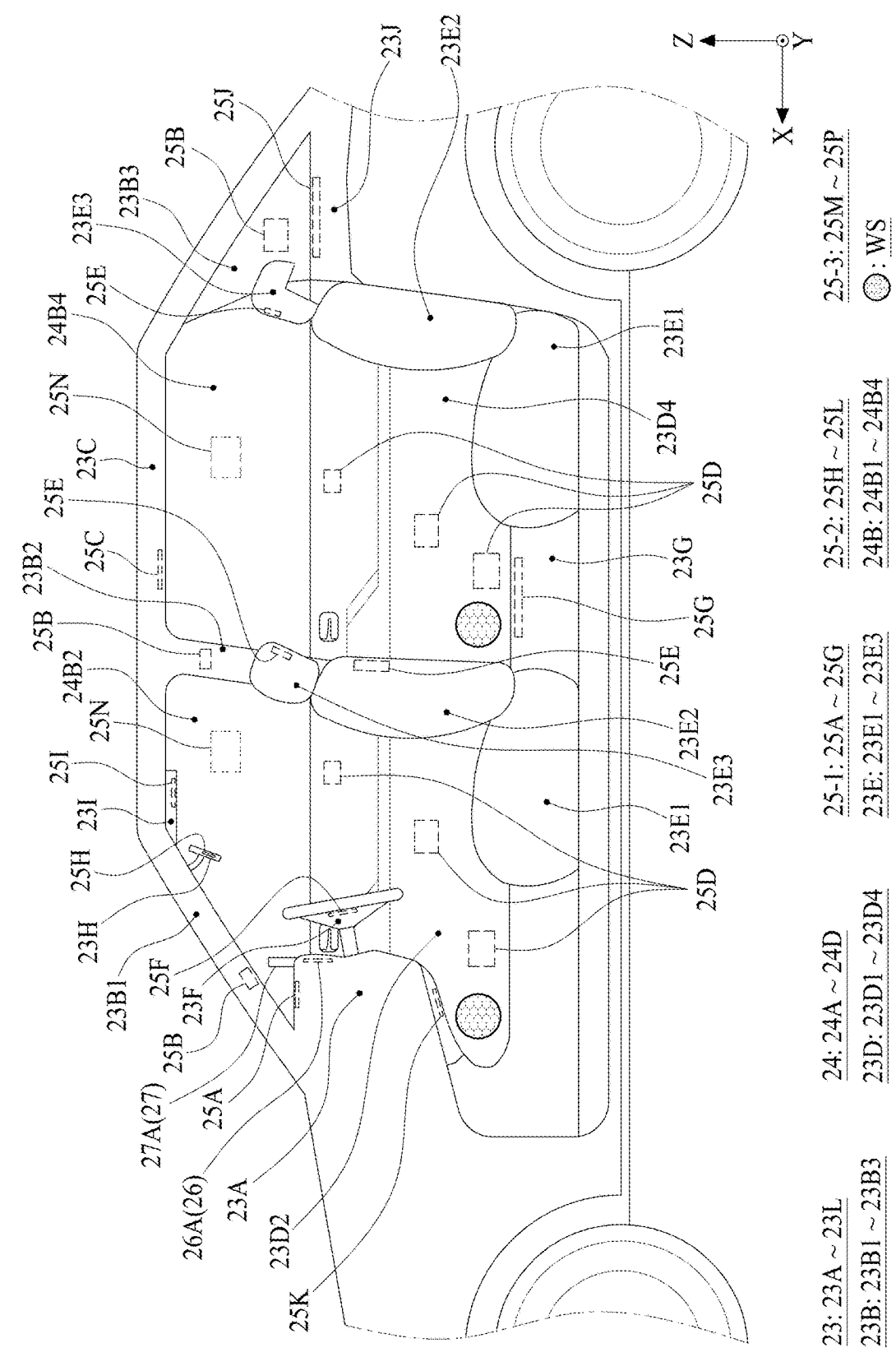
FIG. 35 is a cross-sectional view illustrating an apparatus according to a ninth example embodiment of the present disclosure.
Figure 36:
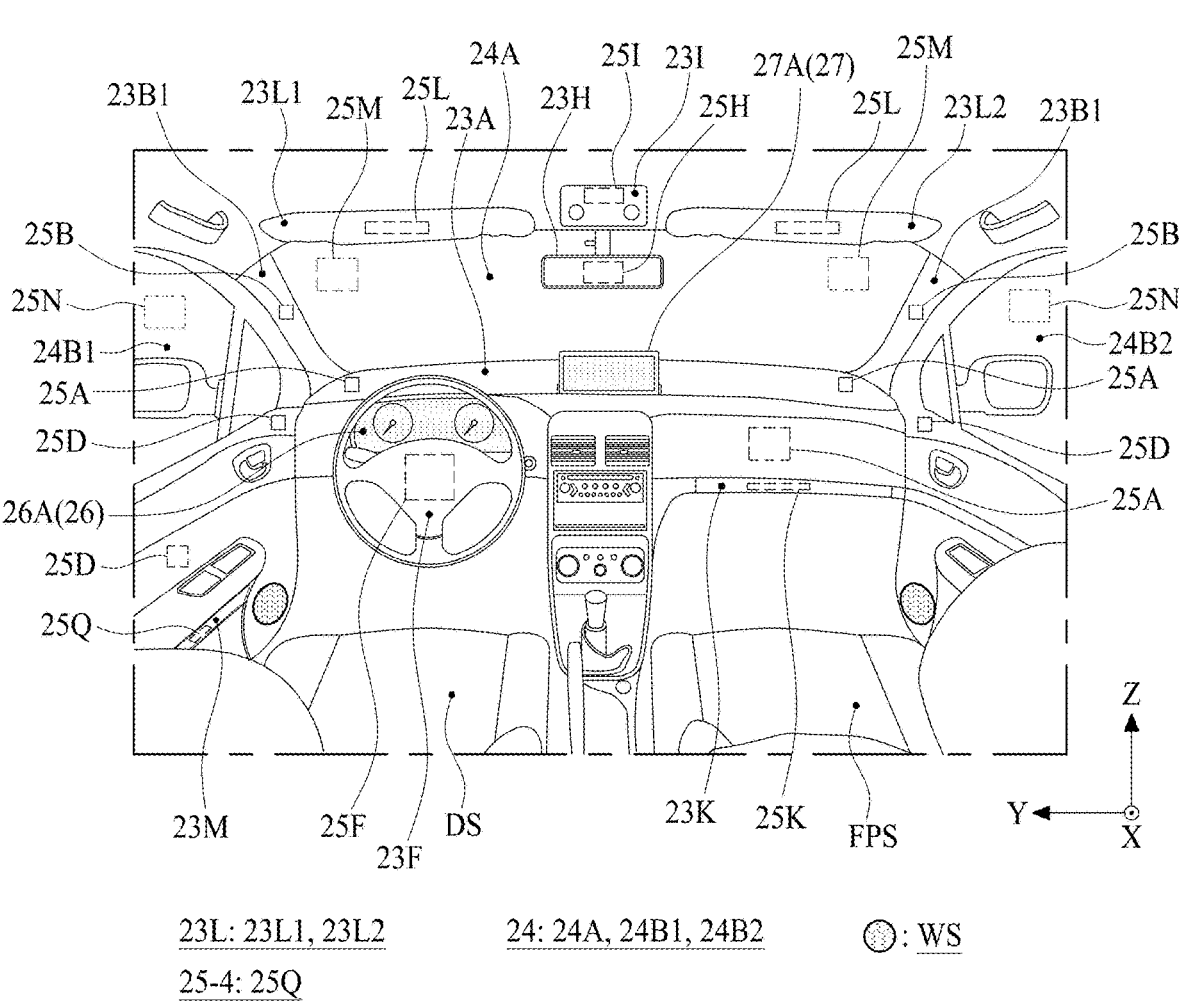
FIG. 36 illustrates an example of a sound generating apparatus disposed near a driver seat and a front passenger seat of FIGS. 34 and 35.
Figure 37:
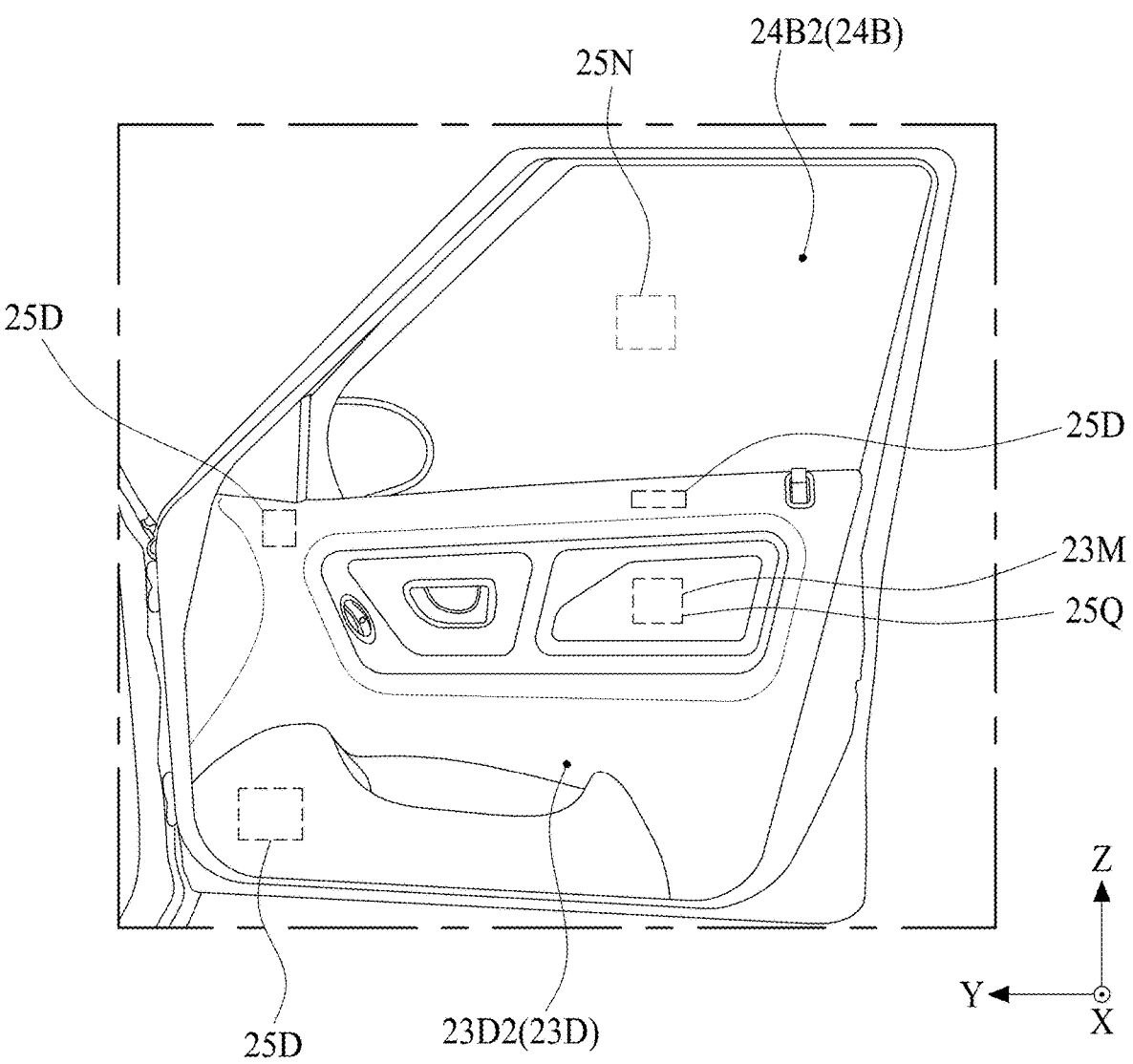
FIG. 37 illustrates an example of a sound generating apparatus at a door and a glass window of FIGS. 34 and 35.
Figure 38:
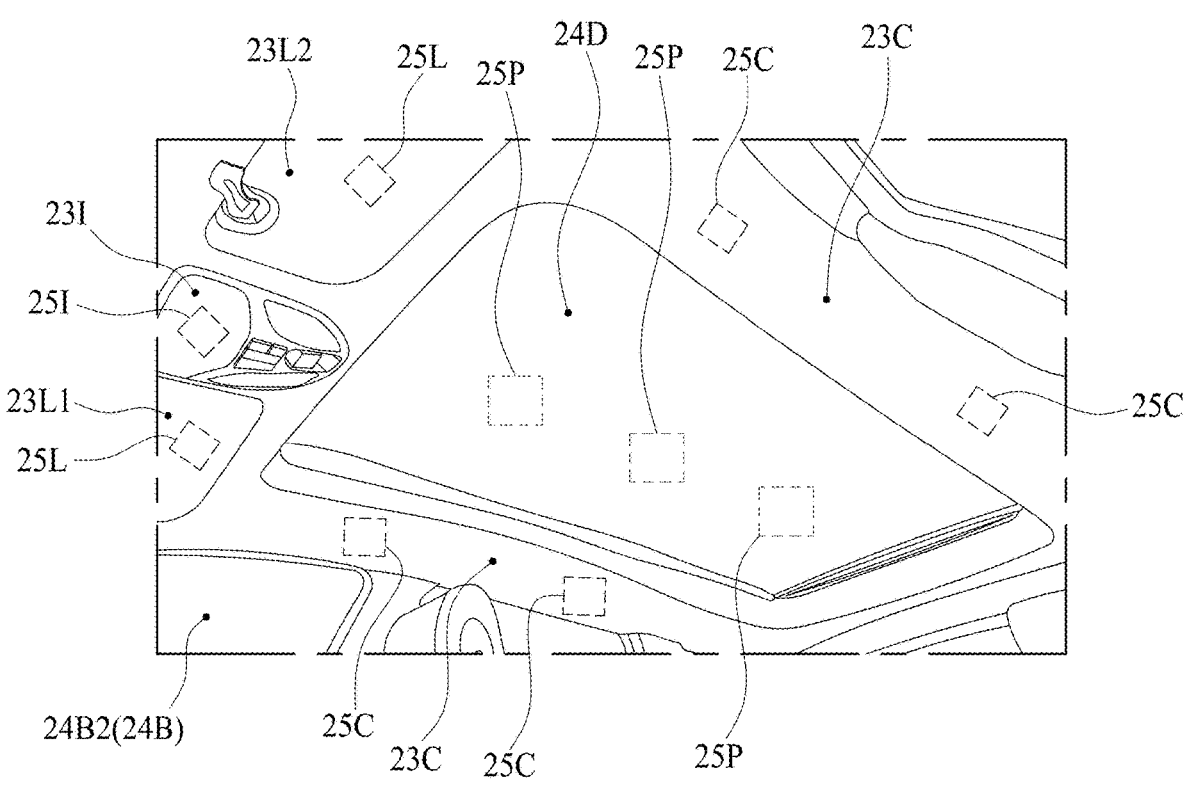
FIG. 38 illustrates an example of a sound generating apparatus at a roof panel of FIGS. 34 and 35.
Figure 39:
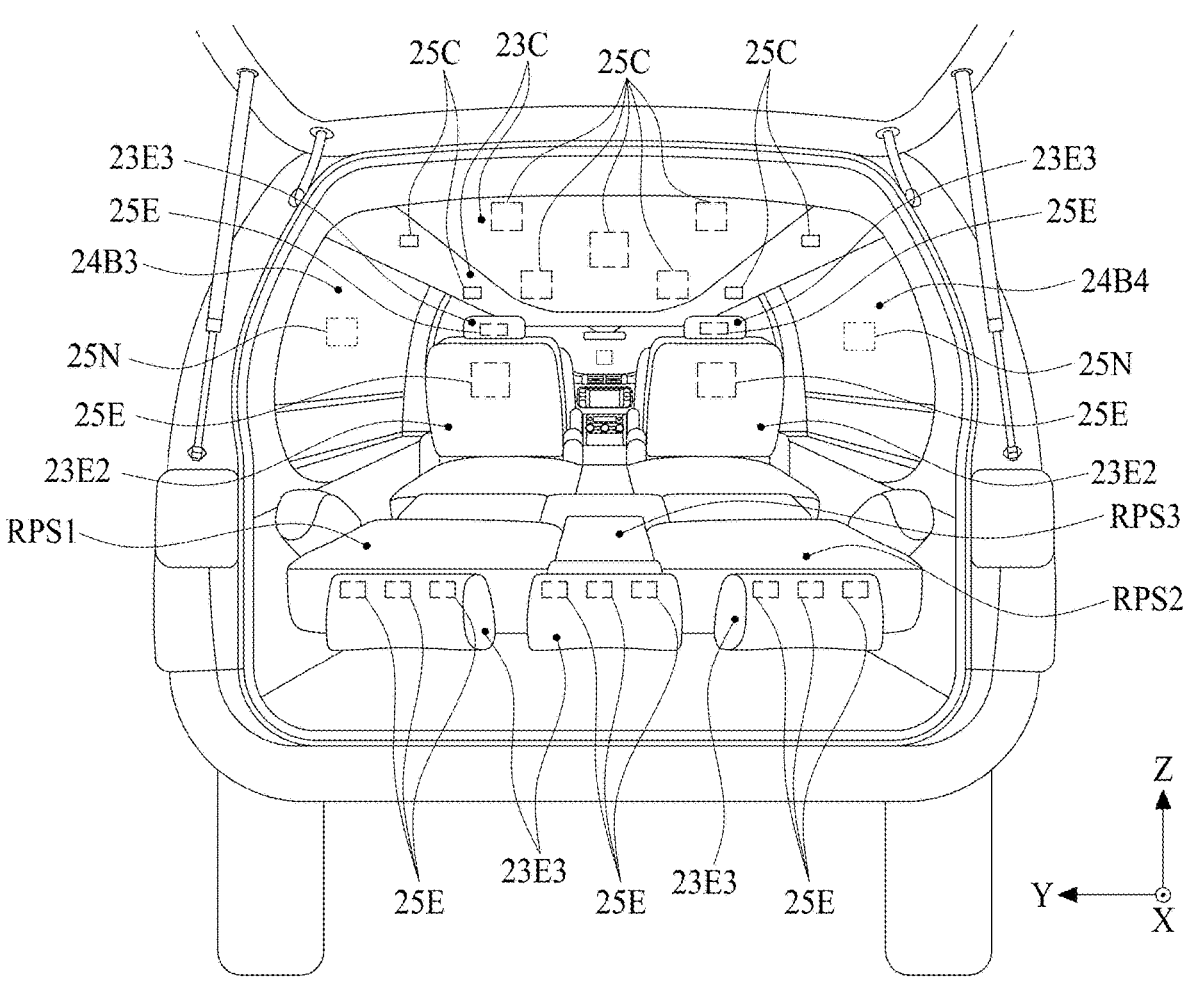
FIG. 39 illustrates an example of a sound generating apparatus at a roof panel, a glass window, and a seat of FIGS. 34 and 35.

FIG. 34 a plan view illustrating an apparatus according to a ninth example embodiment of the present disclosure. FIG. 35 is a cross-sectional view illustrating an apparatus according to a ninth example embodiment of the present disclosure. FIG. 36 illustrates an example of a sound generating apparatus disposed near a driver seat and a front passenger seat of FIGS. 34 and 35. FIG. 37 illustrates an example of a sound generating apparatus disposed at a door and a glass window of FIGS. 34 and 35. FIG. 38 illustrates an example of a sound generating apparatus disposed at a roof panel of FIGS. 34 and 35. FIG. 39 illustrates an example of a sound generating apparatus disposed at a roof panel, a glass window, and a seat of FIGS. 34 and 35.

With reference to FIGS. 37 to 39 in connection with FIG. 32, the apparatus 9 according to the ninth example embodiment of the present disclosure may include may be a vehicular apparatus which includes one or more seats and one or more glass windows. For example, the vehicular apparatus may include a vehicle, a train, a ship, or an aircraft, or the like, but embodiments of the present disclosure are not limited thereto.

The apparatus 9 according to the ninth example embodiment of the present disclosure may include a first sound generating apparatus 25-1 configured to output a sound between the main structure 20*a*, the exterior material 20*b*, and the interior material 20*c* of the vehicular apparatus. For example, the first sound generating apparatus 25-1 may be disposed at a region between the main structure 20*a* and the exterior material 20*b*, a region between the main structure 20*a* and the interior material 20*c*, or a region between the exterior material 20*b* and the interior material 20*c* to output a sound.

The first sound generating apparatus 25-1 may include at least one or more vibration generating devices 25A to 25G which are disposed between the main structure (or the exterior material) and one or more of a dashboard 23A, a pillar interior material 23B, a roof interior material 23C, a door interior material 23D, a seat interior material 23E, a handle interior material 23F, and a floor interior material 23G. For example, the first sound generating apparatus 25-1 may include at least one or more of the first to seventh vibration generating devices 25A to 25G and may output sounds of one or more channels by the one or more vibration generating devices.

With reference to FIGS. 34 to 36, the first vibration generating device 25A according to an example embodiment of the present disclosure may be disposed between the dashboard 23A and a dash panel and may be configured to indirectly or directly vibrate the dashboard 23A to output a sound. For example, the first vibration generating device 25A may include the apparatus 5 and 6 described above with reference to FIGS. 27 to 31, and thus, the repetitive description thereof may be omitted for brevity. For example, the first vibration generating device 25A may be referred to as the term such as a dashboard speaker or a first speaker, or the like, but embodiments of the present disclosure are not limited thereto.

According to an example embodiment of the present disclosure, at least one or more of the dash panel and the dashboard 23A may include a first region corresponding to a driver seat DS, a second region corresponding to a passenger seat FPS, and a third region (or a middle region) between the first region and the second region. At least one or more of the dash panel and the dashboard 23A may further include a fourth region which is inclined to face the passenger seat FPS.

According to an example embodiment of the present disclosure, the first vibration generating device 25A may be configured to vibrate at least one or more among the first to fourth regions of the dashboard 23A. For example, the first vibration generating device 25A may be disposed at each of the first and second regions of the dashboard 23A, or may be disposed at each of the first to fourth regions of the dashboard 23A. For example, the first vibration generating device 25A may be disposed at each of the first and second regions of the dashboard 23A, or may be disposed at at least one or more of the first to fourth regions of the dashboard 23A. For example, the first vibration generating device 25A may be configured to output a sound of about 150 Hz to about 20 kHz. For example, the first vibration generating device 25A configured to vibrate at least one or more among the first to fourth regions of the dashboard 23A may have the same sound output characteristic or different sound output characteristics. For example, the first vibration generating device 25A configured to vibrate each of the first to fourth regions of the dashboard 23A may have the same sound output characteristic or different sound output characteristics.

The second vibration generating device 25B according to an example embodiment of the present disclosure may be disposed between the pillar interior material 23B and a pillar panel and may be configured to indirectly or directly vibrate the pillar interior material 23B to output a sound. For example, the second vibration generating device 25B may include the apparatus 5 and 6 described above with reference to FIGS. 27 to 31, and thus, the repetitive description thereof may be omitted for brevity. For example, the second vibration generating device 25B may be referred to as the term such as a pillar speaker, a tweeter speaker, or a second speaker, or the like, but embodiments of the present disclosure are not limited thereto.

According to an example embodiment of the present disclosure, the pillar panel may include a first pillar (or an A pillar) disposed at both sides of a front glass window, a second pillar (or a B pillar) disposed at both sides of a center of a vehicle body, and a third pillar (or a C pillar) disposed at both sides of a rear portion of the vehicle body. The pillar interior material 23B may include a first pillar interior material 23B1 covering the first pillar, a second pillar interior material 23B2 covering the second pillar, and a third pillar interior material 23B3 covering the third pillar.

According to an example embodiment of the present disclosure, the second vibration generating device 25B may be disposed in at least one or more among a region between the first pillar and the first pillar interior material 23B1, a region between the second pillar and the second pillar interior material 23B2, and a region between the third pillar and the third pillar interior material 23B3, and thus, may vibrate at least one or more among the first to third pillar interior materials 23B1 to 23B3. For example, the second vibration generating device 25B may be configured to output a sound at about 2 kHz to about 20 kHz, but embodiments of the present disclosure are not limited thereto. For example, the second vibration generating device 25B may be configured to output a sound at about 150 Hz to about 20 kHz. For example, the second vibration generating device 25B configured to vibrate at least one or more among the first to third pillar interior materials 23B1 to 23B3 may have the same sound output characteristic or different sound output characteristics.

With reference to FIGS. 35, 38, and 39, the third vibration generating device 25C according to an example embodiment of the present disclosure may be disposed between the roof interior material 23C and a roof panel and may be configured to indirectly or directly vibrate the pillar interior material 23B to output a sound. For example, the third vibration generating device 25C may include the apparatus 5 and 6 described above with reference to FIGS. 27 to 31, and thus, the repetitive description thereof may be omitted for brevity. For example, the third vibration generating device 25C may be referred to as the term such as a roof speaker or a third speaker, or the like, but embodiments of the present disclosure are not limited thereto.

According to an example embodiment of the present disclosure, at least one or more of the roof panel and the roof interior material 23C covering the roof panel may include the first region corresponding to the driver seat DS, the second region corresponding to the passenger seat FPS, a third region corresponding to a region between the driver seat DS and the passenger seat FPS, a fourth region corresponding to a first rear seat RPS1 behind the driver seat DS, a fifth region corresponding to a second rear seat RPS2 behind the passenger seat FPS, a sixth region corresponding to a region between the first rear seat RPS1 and the second rear seat RPS2, and a seventh region between the third region and the sixth region.

According to an example embodiment of the present disclosure, the third vibration generating device 25C may be configured to vibrate at least one or more among the first to seventh regions of the roof interior material 23C. For example, the third vibration generating device 25C may be configured to output a sound of about 150 Hz to about 20 kHz. For example, the third vibration generating device 25C configured to vibrate at least one or more among the first to seventh regions of the roof interior material 23C may have the same sound output characteristic or different sound output characteristics. For example, the third vibration generating device 25C configured to vibrate each of the first to seventh regions of the roof interior material 23C may have the same sound output characteristic or different sound output characteristics. For example, at least one or more third vibration generating devices 25C configured to vibrate at least one or more among the first to seventh regions of the roof interior material 23C may be configured to output a sound of about 2 kHz to about 20 kHz, and the other third vibration generating devices 25C may be configured to output a sound at about 150 Hz to about 20 kHz. For example, at least one or more among third vibration generating devices 25C configured to vibrate each of the first to seventh regions of the roof interior material 23C may be configured to output a sound of about 2 kHz to about 20 kHz, and the other third vibration generating devices 25C may be configured to output a sound at about 150 Hz to about 20 KHz.

With reference to FIGS. 34 to 37, the fourth vibration generating device 25D according to an example embodiment of the present disclosure may be disposed between the door frame and the door interior material 23D and may be configured to indirectly or directly vibrate the door interior material 23D to output a sound. For example, the fourth vibration generating device 25D may include the apparatus 5 and 6 described above with reference to FIGS. 27 to 31, and thus, the repetitive description thereof may be omitted for brevity. For example, the fourth vibration generating device 25D may be referred to as the term such as a door speaker or a fourth speaker, or the like, but embodiments of the present disclosure are not limited thereto.

According to an example embodiment of the present disclosure, at least one or more of the door frame and the door interior material 23D may include an upper region, a middle region, and a lower region with respect to a height direction Z of the apparatus 20. For example, the fourth vibration generating device 25D may be disposed at at least one or more of an upper region, a middle region, and a lower region between the door frame and the door interior material 23D, and thus, may vibrate at least one or more among an upper region, a middle region, and a lower region of the door interior material 23D.

According to an example embodiment of the present disclosure, the door frame may include a first door frame (or a left front door frame), a second door frame (or a right front door frame), a third door frame (or a left rear door frame), and a fourth door frame (or a right rear door frame). According to an example embodiment of the present disclosure, the door interior material 23D may include a first door interior material (or a left front door interior material) 23D1 covering the first door frame, a second door interior material (or a right front door interior material) 23D2 covering the second door frame, a third door interior material (or a left rear door interior material) 23D3 covering the third door frame, and a fourth door interior material (or a right rear door interior material) 23D4 covering the fourth door frame. For example, the fourth vibration generating device 25D may be disposed at at least one or more among an upper region, a middle region, and a lower region between each of the first to fourth door frames and the first to fourth door interior materials 23D1 to 23D4 and may vibrate at least one or more among an upper region, a middle region, and a lower region of each of the first to fourth door interior materials 23D1 to 23D4.

According to an example embodiment of the present disclosure, the fourth vibration generating device 25D configured to vibrate the upper region of each of the first to fourth door interior materials 23D1 to 23D4 may be configured to output a sound of about 2 kHz to about 20 kHz, or may be configured to output a sound of about 150 Hz to about 20 kHz. For example, the fourth vibration generating device 25D configured to vibrate the upper regions of at least one or more among the first to fourth door interior materials 23D1 to 23D4 may be configured to output a sound of about 2 kHz to about 20 kHz, or may be configured to output a sound of about 150 Hz to about 20 kHz.

According to an example embodiment of the present disclosure, the fourth vibration generating device 25D configured to vibrate the middle regions or/and the lower regions of at least one or more among the first to fourth door interior materials 23D1 to 23D4 may be configured to output a sound of about 150 Hz to about 20 kHz. For example, the fourth vibration generating device 25D configured to vibrate the middle region or/and the lower region of each of the first to fourth door interior materials 23D1 to 23D4 may be configured to output a sound of about 150 Hz to about 20 kHz. For example, the fourth vibration generating device 25D configured to vibrate the middle regions or/and the lower regions of at least one or more among the first to fourth door interior materials 23D1 to 23D4 may be one or more of a woofer, a mid-woofer, and a sub-woofer. For example, the fourth vibration generating device 25D configured to vibrate the middle region or/and the lower region of each of the first to fourth door interior materials 23D1 to 23D4 may be one or more of a woofer, a mid-woofer, and a sub-woofer.

Sounds, which are respectively output from the fourth vibration generating device 25D disposed at the first door interior material 23D1 and the fourth vibration generating device 25D disposed at the second door interior material 23D2, may be combined and output. For example, sounds, which are output from at least one or more of the fourth vibration generating device 25D disposed at the first door interior material 23D1 and the fourth vibration generating device 25D disposed at the second door interior material 23D2, may be combined and output. In addition, a sound output from the fourth vibration generating device 25D disposed at the third door interior material 23D3 and a sound output from the fourth vibration generating device 25D disposed at the fourth door interior material 23D4 may be combined and output.

According to an example embodiment of the present disclosure, the upper region of each of the first to fourth door interior materials 23D1 to 23D4 may include a first upper region adjacent to the dashboard 23A, a second upper region adjacent to the rear seats RPS1, RPS2, and RPS3, and a third upper region between the first upper region and the second upper region. For example, the fourth vibration generating device 25D may be disposed at one or more among the first to third upper regions of each of the first to fourth door interior materials 23D1 to 23D4.

According to an example embodiment of the present disclosure, the fourth vibration generating device 25D may be disposed at the first upper region of each of the first and second door interior materials 23D1 and 23D2 and may be disposed at one or more among the second and third upper regions of each of the first and second door interior materials 23D1 and 23D2. For example, the fourth vibration generating device 25D may be disposed at one or more among the first to third upper regions of one or more among the first to fourth door interior materials 23D1 to 23D4. For example, the fourth vibration generating device 25D configured to vibrate the first upper regions of one or more among the first and second door interior materials 23D1 and 23D2 may be configured to output a sound of about 2 kHz to about 20 kHz, and the fourth vibration generating device 25D configured to vibrate one or more among the second and third upper regions of each of the first and second door interior materials 23D1 and 23D2 may be configured to output a sound of about 2 kHz to about 20 kHz, or may be configured to output a sound of about 150 Hz to about 20 kHz. For example, the fourth vibration generating device 25D configured to vibrate one or more among the second and third upper regions of one or more among the first and second door interior materials 23D1 and 23D2 may be configured to output a sound of about 2 kHz to about 20 kHz, or may be configured to output a sound of about 150 Hz to about 20 KHz.

With reference to FIGS. 34, 35, and 39, the fifth vibration generating device 25E according to an example embodiment of the present disclosure may be disposed between a seat frame and the seat interior material 23E and may be configured to indirectly or directly vibrate the seat interior material 23E to output a sound. For example, the fifth vibration generating device 25E may include the apparatus 5 and 6 described above with reference to FIGS. 27 to 31, and thus, the repetitive description thereof may be omitted for brevity. For example, the fifth vibration generating device 25E may be referred to as the term such as a sheet speaker, a headrest speaker, or a fifth speaker, or the like, but embodiments of the present disclosure are not limited thereto.

According to an example embodiment of the present disclosure, the seat frame may include a first seat frame (or a driver seat frame), a second seat frame (or a passenger seat frame), a third seat frame (or a first rear seat frame), a fourth seat frame (or a second rear seat frame), and a fifth seat frame (or a third rear seat frame). According to an example embodiment of the present disclosure, the seat interior material 23E may include a first seat interior material surrounding the first seat frame, a second seat interior material surrounding the second seat frame, a third seat interior material surrounding the third seat frame, a fourth seat interior material surrounding the fourth seat frame, and a fifth seat interior material surrounding the fifth seat frame.

According to an example embodiment of the present disclosure, at least one or more among the first to fifth seat frames may include a seat bottom frame, a seat back frame, and a headrest frame. The seat interior material 23E may include a seat bottom interior material 23E1 surrounding the seat bottom frame, a seat back interior material 23E2 surrounding the seat back frame, and a headrest interior material 23E3 surrounding the headrest frame. At least one or more among the seat bottom interior material 23E1, the seat back interior material 23E2, and the headrest interior material 23E3 may include a seat inner interior material and a seat outer interior material. The seat inner interior material may include a foam layer. The seat outer interior material may include a surface layer including a fiber or leather. The outer seat interior material may further include a base layer including a plastic material which supports the surface layer.

According to an example embodiment of the present disclosure, the fifth vibration generating device 25E may be disposed at at least one or more among a region between the seat back frame and the seat back interior material 23E2 and a region between the headrest frame and the headrest interior material 23E3, and thus, may vibrate at least one or more among the seat outer interior material of the seat back interior material 23E2 and the seat outer interior material of the headrest interior material 23E3.

According to an example embodiment of the present disclosure, the fifth vibration generating device 25E disposed at at least one or more of the driver seat DS and the passenger seat FPS may be disposed at at least one or more among the region between the seat back frame and the seat back interior material 23E2 and the region between the headrest frame and the headrest interior material 23E3.

According to an example embodiment of the present disclosure, the fifth vibration generating device 25E disposed at at least one or more among the first to third rear seats RPS1, RPS2, and RPS3 may be disposed between the headrest frame and the headrest interior material 23E3. For example, at least one or more among the first to third rear seats RPS1, RPS2, and RPS3 may include at least one or more fifth vibration generating devices 25E disposed between the headrest frame and the headrest interior material 23E3.

According to an example embodiment of the present disclosure, the fifth vibration generating device 25E vibrating the seat back interior materials 23E2 of at least one or more among the driver seat DS and the passenger seat FPS may be configured to output a sound of about 150 Hz to about 20 kHz.

According to an example embodiment of the present disclosure, the fifth vibration generating device 25E vibrating the headrest interior materials 23E3 of at least one or more among the driver seat DS, the passenger seat FPS, and the first to third rear seats RPS1, RPS2, and RPS3 may be configured to output a sound of about 2 kHz to about 20 kHz, or may be configured to output a sound of about 150 Hz to about 20 kHz.

With reference to FIGS. 34 to 36, the sixth vibration generating device 25F according to an example embodiment of the present disclosure may be disposed between a handle frame and the handle interior material 23F and may be configured to indirectly or directly vibrate the handle interior material 23F to output a sound. For example, the sixth vibration generating device 25F may include the apparatus 5 and 6 described above with reference to FIGS. 27 to 31, and thus, the repetitive description thereof may be omitted for brevity. For example, the sixth vibration generating device 25F may be referred to as the term such as a handle speaker, a steering speaker, or a sixth speaker, or the like, but embodiments of the present disclosure are not limited thereto.

According to an example embodiment of the present disclosure, the sixth vibration generating device 25F may be configured to indirectly or directly vibrate the handle interior material 23F to provide a driver with a sound. For example, a sound output by the sixth vibration generating device 25F may be a sound which is the same as or different from a sound output from each of the first to fifth vibration generating devices 25A to 25E. For example, a sound output by the sixth vibration generating device 25F may be a sound which is the same as or different from sounds output from at least one or more among the first to fifth vibration generating devices 25A to 25E.

As an example embodiment of the present disclosure, the sixth vibration generating device 25F may output a sound which is to be provided to only the driver. As another example embodiment of the present disclosure, the sound output by the sixth vibration generating device 25F and a sound output by each of the first to fifth vibration generating devices 25A to 25E may be combined and output. For example, the sound output by the sixth vibration generating device 25F and the sound output by at least one or more among the first to fifth vibration generating devices 25A to 25E may be combined and output.

With reference to FIGS. 34 and 35, the seventh vibration generating device 25G may be disposed between the floor panel and the floor interior material 23G and may be configured to indirectly or directly vibrate the floor interior material 23G to output a sound. The seventh vibration generating device 25G may be disposed between the floor interior material 23G and the floor panel disposed between the front seats DS and FPS and the third rear seat RPS3. For example, the seventh vibration generating device 25G may include the apparatus 5 and 6 described above with reference to FIGS. 27 to 31, and thus, the repetitive description thereof may be omitted for brevity. For example, the seventh vibration generating device 25G may be configured to output a sound of about 150 Hz to about 20 kHz. For example, the seventh vibration generating device 25G may be referred to as the term such as a floor speaker, a bottom speaker, an under speaker, or a seventh speaker, or the like, but embodiments of the present disclosure are not limited thereto.

With reference to FIGS. 34 to 38 in connection with FIG. 32, the apparatus 9 according to the ninth example embodiment of the present disclosure may further include a second sound generating apparatus 25-2 which is disposed at the interior material 20*c* exposed at an indoor space. For example, the apparatus 9 according to the ninth example embodiment of the present disclosure may include only the second sound generating apparatus 25-2 instead of the first sound generating apparatus 25-1, or may include all of the first sound generating apparatus 25-1 and the second sound generating apparatus 25-2.

According to an example embodiment of the present disclosure, the interior material 20*c* may further include a rear view mirror 23H, an overhead console 23I, a rear package interior material 23J, a glove box 23K, and a sun visor 23L, or the like.

The second sound generating apparatus 25-2 according to an example embodiment of the present disclosure may include at least one or more vibration generating devices 25H to 25L which are disposed at at least one among the rear view mirror 23H, the overhead console 23I, the rear package interior material 23J, the glove box 23K, and the sun visor 23L. For example, the second sound generating apparatus 25-2 may include at least one or more among eighth to twelfth vibration generating devices 25H to 25L, and thus, may output sounds of one or more channels.

With reference to FIGS. 34 to 38, the eighth vibration generating device 25H may be disposed at the rear view mirror 23H and may be configured to indirectly or directly vibrate the rear view mirror 23H to output a sound. The eighth vibration generating device 25H may be disposed between a mirror housing connected to the main structure and the rear view mirror 23H supported by the mirror housing. For example, the eighth vibration generating device 25H may include the apparatus 5 and 6 described above with reference to FIGS. 27 to 31, and thus, the repetitive description thereof may be omitted for brevity. For example, the eighth vibration generating device 25H may be configured to output a sound of about 150 Hz to about 20 kHz. For example, the eighth vibration generating device 25H may be referred to as the term such as a mirror speaker or an eighth speaker, or the like, but embodiments of the present disclosure are not limited thereto.

With reference to FIGS. 35, 36, and 38, the ninth vibration generating device 25I may be disposed at the overhead console 23I and may be configured to indirectly or directly vibrate a console cover of the overhead console 23I to output a sound. According to an example embodiment of the present disclosure, the overhead console 23I may include a console box buried (or embedded) into the roof panel, a lighting device disposed at the console box, and a console cover covering the lighting device and the console box.

The ninth vibration generating device 25I may be disposed between the console box of the overhead console 23I and the console cover and may vibrate the console cover. For example, the ninth vibration generating device 25I may be disposed between the console box of the overhead console 23I and the console cover and may directly vibrate the console cover. For example, the ninth vibration generating device 25I may include the apparatus 5 and 6 described above with reference to FIGS. 27 to 31, and thus, the repetitive description thereof may be omitted for brevity. For example, the ninth vibration generating device 25I may be configured to output a sound of about 150 Hz to about 20 kHz. For example, the ninth vibration generating device 25I may be referred to as the term such as a console speaker, a lighting speaker, or a ninth speaker, or the like, but embodiments of the present disclosure are not limited thereto.

The apparatus 9 according to the ninth example embodiment of the present disclosure may further include a center lighting box disposed at a center region of the roof interior material 23C, a center lighting device disposed at the center lighting box, and a center lighting cover covering the center lighting device. For example, the ninth vibration generating device 25I may be further disposed between the center lighting box and the center lighting cover of the center lighting device and may additionally vibrate the center lighting cover.

With reference to FIGS. 34 and 35, the tenth vibration generating device 25J may be disposed at the rear package interior material 23J and may be configured to indirectly or directly vibrate the rear package interior material 23J to output a sound. The rear package interior material 23J may be disposed behind (or back portion) the first to third rear seats RPS1, RPS2, and RPS3. For example, a portion of the rear package interior material 23J may be disposed under a rear glass window 24C.

The tenth vibration generating device 25J may be disposed at a rear surface of the rear package interior material 23J and may vibrate the rear package interior material 23J. For example, the tenth vibration generating device 25J may directly vibrate the rear package interior material 23J. For example, the tenth vibration generating device 25J may include the apparatus 5 and 6 described above with reference to FIGS. 27 to 31, and thus, the repetitive description thereof may be omitted for brevity. For example, the tenth vibration generating device 25J may be referred to as the term such as a rear speaker or a tenth speaker, or the like, but embodiments of the present disclosure are not limited thereto.

According to an example embodiment of the present disclosure, the rear package interior material 23J may include a first region corresponding to a rear portion of the first rear seat RPS1, a second region corresponding to a rear portion of the second rear seat RPS2, and a third region corresponding to a rear portion of the third passenger seat RPS3.

According to an example embodiment of the present disclosure, the tenth vibration generating device 25J may be disposed to vibrate at least one or more among the first to third regions of the rear package interior material 23J. For example, the tenth vibration generating device 25J may be disposed at each of the first and second regions of the rear package interior material 23J, or may be disposed at each of the first to third regions of the rear package interior material 23J. For example, the tenth vibration generating device 25J may be disposed at at least one or more among the first and second regions of the rear package interior material 23J, or may be disposed at at least one or more among the first to third regions of the rear package interior material 23J. For example, the tenth vibration generating device 25J may be configured to output a sound at about 150 Hz to about 20 kHz. For example, the tenth vibration generating device 25J configured to vibrate each of the first to third regions of the rear package interior material 23J may have the same sound output characteristic or different sound output characteristics. For example, the tenth vibration generating device 25J configured to vibrate at least one or more among the first to third regions of the rear package interior material 23J may have the same sound output characteristic or different sound output characteristics.

With reference to FIGS. 34 to 36, the eleventh vibration generating device 25K may be disposed at a glove box 23K and may be configured to indirectly or directly vibrate the glove box 23K to output a sound. The glove box 23K may be disposed at a dashboard 23A corresponding to a front portion of the passenger seat FPS.

The eleventh vibration generating device 25K may be disposed at an inner surface of the glove box 23K and may vibrate the glove box 23K. For example, the eleventh vibration generating device 25K may include the apparatus 5 and 6 described above with reference to FIGS. 27 to 31, and thus, the repetitive description thereof may be omitted for brevity. For example, the eleventh vibration generating device 25K may be configured to output a sound of about 150 Hz to about 20 kHz, or may be one or more of a woofer, a mid-woofer, and a sub-woofer. For example, the eleventh vibration generating device 25K may be referred to as the term such as a glove box speaker or an eleventh speaker, or the like, but embodiments of the present disclosure are not limited thereto.

With reference to FIG. 36, the twelfth vibration generating device 25L may be disposed at the sun visor 23L and may be configured to indirectly or directly vibrate the sun visor 23L to output a sound. The sun visor 23L may include a first sun visor 23L1 corresponding to the driver seat DS and a second sun visor 23L2 corresponding to the passenger seat FPS.

The twelfth vibration generating device 25L may be disposed at at least one or more of the first sun visor 23L1 and the second sun visor 23L2 and may indirectly or directly vibrate at least one or more of the first sun visor 23L1 and the second sun visor 23L2. For example, the twelfth vibration generating device 25L may include the apparatus 5 and 6 described above with reference to FIGS. 27 to 31, and thus, the repetitive description thereof may be omitted for brevity. For example, the twelfth vibration generating device 25L may be configured to output a sound of about 150 Hz to about 20 kHz. For example, the twelfth vibration generating device 25L may be referred to as the term such as a sun visor speaker or a twelfth speaker, or the like, but embodiments of the present disclosure are not limited thereto.

According to an example embodiment of the present disclosure, at least one or more of the first sun visor 23L1 and the second sun visor 23L2 may further include a sun visor mirror. For example, the twelfth vibration generating device 25L may be configured to indirectly or directly vibrate a sun visor mirror of at least one or more of the first sun visor 23L1 and the second sun visor 23L2. The twelfth vibration generating device 25L vibrating the sun visor mirror may include the apparatus 5 and 6 described above with reference to FIGS. 27 to 31, and thus, the repetitive description thereof may be omitted for brevity.

With reference to FIGS. 34 to 38 in connection with FIG. 33, the apparatus 9 according to the ninth example embodiment of the present disclosure may further include a third sound generating apparatus 25-3 disposed at the glass window 20d. For example, the apparatus 9 according to the ninth example embodiment of the present disclosure may include the third sound generating apparatus 25-3 instead of at least one or more of the first and second sound generating apparatuses 25-1 and 25-2, or may include all of the first to third sound generating apparatuses 25-1, 25-2, and 25-3.

The third sound generating apparatus 25-3 may include at least one or more vibration generating devices 25M to 25P disposed at the glass window 20d. For example, the third sound generating apparatus 25-3 may include at least one or more of thirteenth to sixteenth vibration generating devices 25M to 25P, and thus, may output sounds of one or more channels. For example, the third sound generating apparatus 25-3 may be referred to as the term such as a window speaker, a transparent sound generating apparatus, a transparent speaker, or an opaque speaker, or the like, but embodiments of the present disclosure are not limited thereto.

At least one or more of the thirteenth to sixteenth vibration generating devices 25M to 25P according to an example embodiment of the present disclosure may be configured to indirectly or directly vibrate the glass window 20d. For example, at least one or more of the thirteenth to sixteenth vibration generating devices 25M to 25P may include the apparatus 5 and 6 described above with reference to FIGS. 27 to 31, and may be configured to be transparent, semi-transparent, or opaque, and thus, their repetitive descriptions may be omitted for brevity.

According to an example embodiment of the present disclosure, the glass window 20d may include a front glass window 24A, a side glass window 24B, and a rear glass window 24C. According to an example embodiment of the present disclosure, the glass window 20d may further include a roof glass window 24D. For example, when the apparatus 9 according to the ninth example embodiment of the present disclosure includes the roof glass window 24D, a portion of a region of the roof frame and the roof interior material 23C may be replaced with the roof glass window 24D. For example, when the apparatus 9 according to the ninth example embodiment of the present disclosure includes the roof glass window 24D, the third vibration generating device 25C may be configured to indirectly or directly vibrate a periphery portion of the roof interior material 23C surrounding the roof glass window 24D.

With reference to FIGS. 34 to 36, the thirteenth vibration generating device 25M according to an example embodiment of the present disclosure may be disposed at the front glass window 24A and may be configured to output a sound by vibrating itself or may be configured to indirectly or directly vibrate the front glass window 24A to output a sound.

According to an example embodiment of the present disclosure, the front glass window 24A may include a first region corresponding to the driver seat DS, a second region corresponding to the passenger seat FPS, and a third region (or a middle region) between the first region and the second region.

According to an example embodiment of the present disclosure, the thirteenth vibration generating device 25M may be disposed at at least one or more among the first to third regions of the front glass window 24A. For example, the thirteenth vibration generating device 25M may be disposed at each of the first and second regions of the front glass window 24A, or may be disposed at each of the first to third regions of the front glass window 24A. For example, the thirteenth vibration generating device 25M may be disposed at at least one or more among the first and second regions of the front glass window 24A, or may be disposed at at least one or more among the first to third regions of the front glass window 24A. For example, the thirteenth vibration generating device 25M disposed in each of the first to third regions of the front glass window 24A may have the same sound output characteristic or different sound output characteristics. For example, the thirteenth vibration generating device 25M disposed at at least one or more among the first to third regions of the front glass window 24A may have the same sound output characteristic or different sound output characteristics. For example, the thirteenth vibration generating device 25M may be configured to output a sound of about 150 Hz to about 20 kHz. For example, the thirteenth vibration generating device 25M may be referred to as the term such as a front window speaker or a thirteenth speaker, or the like, but embodiments of the present disclosure are not limited thereto.

With reference to FIGS. 35 to 37 and 39, the fourteenth vibration generating device 25N according to an example embodiment of the present disclosure may be disposed at the side glass window 24B and may be configured to output a sound by vibrating itself or may be configured to indirectly or directly vibrate the side glass window 24B to output a sound.

According to an example embodiment of the present disclosure, the side glass window 24B may include a first side glass window (or a left front window) 24B1, a second side glass window (or a right front window) 24B2, a third side glass window (or a left rear window) 24B3, and a fourth side glass window (or a right rear window) 24B4.

According to an example embodiment of the present disclosure, the fourteenth vibration generating device 25N may be disposed at at least one or more of the first to fourth side glass windows 24B1 to 24B4. For example, at least one or more of the first to fourth side glass windows 24B1 to 24B4 may include at least one or more fourteenth vibration generating devices 25N.

According to an example embodiment of the present disclosure, the fourteenth vibration generating device 25N may be disposed at at least one or more of the first to fourth side glass windows 24B1 to 24B4 and may be configured to output a sound by vibrating itself or may be configured to indirectly or directly vibrate a corresponding side glass window to output the sound S. For example, the fourteenth vibration generating device 25N may be configured to output a sound of about 150 Hz to about 20 kHz. For example, the fourteenth vibration generating device 25N disposed at at least one or more of the first to fourth side glass windows 24B1 to 24B4 may have the same sound output characteristic or different sound output characteristics. For example, the fourteenth vibration generating device 25N may be configured to output a sound of about 150 Hz to about 20 kHz. For example, the fourteenth vibration generating device 25N may be a side window speaker or a fourteenth speaker, or the like, but embodiments of the present disclosure are not limited thereto.

With reference to FIG. 34, the fifteenth vibration generating device 25O according to an example embodiment of the present disclosure may be disposed at the rear glass window 24C and may be configured to output a sound by vibrating itself or may be configured to indirectly or directly vibrate the rear glass window 24C to output a sound.

According to an example embodiment of the present disclosure, the rear glass window 24C may include a first region corresponding to a rear portion of the first rear seat RPS1, a second region corresponding to a rear portion of the second rear seat RPS2, and a third region corresponding to a rear portion of the third rear seat RPS3.

According to an example embodiment of the present disclosure, the fifteenth vibration generating device 25O may be disposed at each of first to third regions of the rear glass window 24C. For example, the fifteenth vibration generating device 25O may be disposed at at least one or more of the first to third regions of the rear glass window 24C. For example, the fifteenth vibration generating device 25O may be disposed at each of the first and second regions of the rear glass window 24C, or may be disposed at each of the first to third regions of the rear glass window 24C. For example, the fifteenth vibration generating device 25O may be disposed at at least one or more of the first and second regions of the rear glass window 24C, or may be disposed at at least one or more of the first to third regions of the rear glass window 24C. For example, the fifteenth vibration generating device 25O may be configured to output a sound of about 150 Hz to about 20 kHz. For example, the fifteenth vibration generating device 25O disposed at each of the first to third regions of the rear glass window 24C may have the same sound output characteristic or different sound output characteristics. For example, the fifteenth vibration generating device 25O disposed at at least one or more of the first to third regions of the rear glass window 24C may have the same sound output characteristic or different sound output characteristics. For example, the fifteenth vibration generating device 25O disposed at at least one or more of the first to third regions of the rear glass window 24C may be configured to output a sound of about 150 Hz to about 20 kHz, or may be one or more of a woofer, a mid-woofer, and a sub-woofer. For example, the fifteenth vibration generating device 25O may be referred to as the term such as a rear window speaker or a fifteenth speaker, or the like, but embodiments of the present disclosure are not limited thereto.

With reference to FIG. 38, the sixteenth vibration generating device 25P according to an example embodiment of the present disclosure may be disposed at the roof glass window 24D and may output a sound by vibrating itself or may be configured to indirectly or directly vibrate the roof glass window 24D to output a sound.

The roof glass window 24D according to an example embodiment of the present disclosure may be disposed over the front seats DS and FPS. For example, the sixteenth vibration generating device 25P may be disposed at a middle region of the roof glass window 24D. For example, the sixteenth vibration generating device 25P may be configured to output a sound of about 150 Hz to about 20 kHz. For example, the sixteenth vibration generating device 25P may be referred to as the term such as a roof window speaker or a sixteenth speaker, or the like, but embodiments of the present disclosure are not limited thereto.

According to another example embodiment of the present disclosure, the roof glass window 24D may be disposed on the front seats DS and FPS or may be disposed on the front seats DS and FPS and the rear seats RPS1, RPS2, and RPS3. For example, the roof glass window 24D may include a first region corresponding to the front seats DS and FPS and a second region corresponding to the rear seats RPS1, RPS2, and RPS3. In addition, the roof glass window 24D may include a third region between the first region and the second region.

According to another example embodiment of the present disclosure, the sixteenth vibration generating device 25P may be disposed at at least one or more of the first and second regions of the roof glass window 24D or may be disposed at at least one or more of the first to third regions of the roof glass window 24D. For example, the sixteenth vibration generating device 25P may be configured to output a sound of about 150 Hz to about 20 kHz. For example, the sixteenth vibration generating device 25P disposed at at least one or more of the first to third regions of the roof glass window 24D may have the same sound output characteristic or different sound output characteristics.

With reference to FIGS. 34 to 36, the apparatus 9 according to the ninth example embodiment of the present disclosure may further include a woofer speaker WS which is disposed at at least one or more of a dashboard 23A, a door frame, and a rear package interior material 23J.

The woofer speaker WS according to an example embodiment of the present disclosure may include at least one or more of a woofer, a mid-woofer, and a sub-woofer. For example, the woofer speaker WS may be referred to as the term such as a speaker or the like which outputs a sound of about 60 Hz to about 150 Hz, but embodiments of the present disclosure are not limited thereto. Therefore, the woofer speaker WS may output a sound of about 60 Hz to about 150 Hz, and thus, may enhance a low-pitched sound band characteristic of a sound which is output to an indoor space.

According to an example embodiment of the present disclosure, the woofer speaker WS may be disposed at at least one or more among first and second regions of the dashboard 23A. According to an example embodiment of the present disclosure, the woofer speaker WS may be disposed at each of first to fourth door frames of the door frame and may be exposed at a lower region among each of the first to fourth door interior materials 23D1 to 23D4 of the door interior material 23D.

According to an example embodiment of the present disclosure, the woofer speaker WS may be disposed at at least one or more among the first to fourth door frames of the door frame and may be exposed at the lower regions of at least one or more among the first to fourth door interior materials 23D1 to 23D4 of the door interior material 23D. According to another example embodiment of the present disclosure, the woofer speaker WS may be disposed at at least one or more among the first and second regions of the rear package interior material 23J. For example, the fourth vibration generating device 25D disposed at the lower region of each of the first to fourth door interior materials 23D1 to 23D4 may be replaced by the woofer speaker WS. For example, the fourth vibration generating device 25D disposed in the lower regions of at least one or more among the first to fourth door interior materials 23D1 to 23D4 may be replaced by the woofer speaker WS.

With reference to FIGS. 36 and 37 in connection with FIG. 32, the apparatus 9 according to the ninth example embodiment of the present disclosure may further include a garnish member 23M which covers a portion of the interior material 20c exposed at the indoor space and a fourth sound generating apparatus 25-4 disposed at the interior material 20c.

The garnish member 23M may be configured to cover a portion of the door interior material 23D exposed at an indoor space, but embodiments of the present disclosure are not limited thereto. For example, the garnish member 23M may be configured to cover a portion of one or more among the dashboard 23A, the pillar interior material 23B, and the roof interior material 23C, which are exposed at the indoor space.

The garnish member 23M according to an example embodiment of the present disclosure may include a metal material or a nonmetal material (or a composite nonmetal material) having a material characteristic suitable for generating a sound based on a vibration. For example, the metal material of the garnish member 23M may include any one or more materials of stainless steel, aluminum (Al), an Al alloy, a magnesium (Mg), a Mg alloy, and a magnesium-lithium (Mg—Li) alloy, but embodiments of the present disclosure are not limited thereto. The nonmetal material (or the composite nonmetal material) of the garnish member 23M may include one or more of plastic, fiber, leather, rubber, wood, cloth, and paper, but embodiments of the present disclosure are not limited thereto. For example, the garnish member 23M may include a metal material having a material characteristic suitable for generating a sound of a high-pitched sound band, but embodiments of the present disclosure are not limited thereto. For example, the high-pitched sound band may have a frequency of 1 kHz or more or 3 kHz or more, but embodiments of the present disclosure are not limited thereto.

The fourth sound generating apparatus 25-4 may include one or more vibration generating apparatus 25Q disposed between the garnish member 23M and the interior material 20c. For example, the fourth sound generating apparatus 25-4 may include a seventeenth vibration generating apparatus 25Q. For example, the fourth sound generating apparatus 25-4 or the seventeenth vibration generating apparatus 25Q may be referred to as the term such as a garnish speaker or a seventeenth speaker, or the like, but embodiments of the present disclosure are not limited thereto.

The seventeenth vibration generating apparatus 25Q may include the apparatus 5 and 6 described above with reference to FIGS. 27 to 31, and thus, the repetitive description thereof may be omitted for brevity. The seventeenth vibration generating apparatus 25Q may be disposed between the interior material 20c and the garnish member 23M and may be connected or coupled to the garnish member 23M through a coupling member.

The seventeenth vibration generating apparatus 25Q according to an example embodiment of the present disclosure may be configured to indirectly or directly vibrate the garnish member 23M to output a sound into the indoor space of the apparatus 20. For example, the seventeenth vibration generating apparatus 25Q may be configured to output a sound of a high-pitched sound band, but embodiments of the present disclosure are not limited thereto.

With reference to FIG. 36 in connection with FIG. 32, the apparatus 9 according to the ninth example embodiment of the present disclosure may further include a fifth sound generating apparatus 25-5 disposed at an inner surface of the exterior material 20b.

The fifth sound generating apparatus 25-5 may include one or more vibration generating apparatuses 25R, 25S, and 25T disposed between the main structure 20a and one or more among a hood panel 22A, a front fender panel 22B, and a trunk panel 22C. For example, the fifth sound generating apparatus 25-5 may include at least one or more among one or more eighteenth to twentieth vibration generating apparatuses 25R, 25S, and 25T, and thus, may output sounds of one or more channels.

The one or more eighteenth vibration generating apparatuses 25R according to an example embodiment of the present disclosure may be connected or coupled to an inner surface of the hood panel 22A and may indirectly or directly vibrate the hood panel 22A to output a sound into an outdoor space of the apparatus 9. For example, the one or more eighteenth vibration generating apparatuses 25R may be configured to be connected or coupled to one or more among a center portion and a periphery portion of the inner surface of the hood panel 22A.

The one or more eighteenth vibration generating apparatuses 25R according to an example embodiment of the present disclosure may include the apparatus 5 and 6 described above with reference to FIGS. 27 to 31, and thus, the repetitive description thereof may be omitted for brevity. The one or more eighteenth vibration generating apparatuses 25R may be connected or coupled to the inner surface of the hood panel 22A through a coupling member. For example, the one or more eighteenth vibration generating apparatuses 25R may be configured to output a sound of about 150 Hz to about 20 kHz. For example, the one or more eighteenth vibration generating apparatuses 25R may be referred to as the term such as a hood panel speaker or an eighteenth speaker, or the like, but embodiments of the present disclosure are not limited thereto.

The one or more nineteenth vibration generating apparatuses 25S according to an example embodiment of the present disclosure may be connected or coupled to an inner surface of the front fender panel 22B and may be configured to indirectly or directly vibrate the front fender panel 22B to output a sound to the outdoor space of the apparatus 9. For example, the one or more nineteenth vibration generating apparatuses 25S may be disposed to have a certain interval at the inner surface of the front fender panel 22B.

The one or more nineteenth vibration generating apparatuses 25S according to an example embodiment of the present disclosure may include the apparatus 5 and 6 described above with reference to FIGS. 27 to 31, and thus, the repetitive description thereof may be omitted for brevity. The one or more nineteenth vibration generating apparatuses 25S may be connected or coupled to the inner surface of the front fender panel 22B through a coupling member. For example, the one or more nineteenth vibration generating apparatuses 25S may be configured to output a sound of about 150 Hz to about 20 kHz. For example, the one or more nineteenth vibration generating apparatuses 25S may be referred to as the term such as a fender panel speaker or a nineteenth speaker, or the like, but embodiments of the present disclosure are not limited thereto.

The one or more twentieth vibration generating apparatuses 25T according to an example embodiment of the present disclosure may be connected or coupled to an inner surface of the trunk panel 22C and may be configured to indirectly or directly vibrate the trunk panel 22C to output a sound to the outdoor space of the apparatus 9. For example, the one or more twentieth vibration generating apparatuses 25T may be configured to be connected or coupled to one or more among a center portion and a periphery portion of the trunk panel 22C.

The one or more twentieth vibration generating apparatuses 25T according to an example embodiment of the present disclosure may include the apparatus 5 and 6 described above with reference to FIGS. 27 to 31, and thus, the repetitive description thereof may be omitted for brevity. The one or more twentieth vibration generating apparatuses 25T may be connected or coupled to the inner surface of the trunk panel 22C through a coupling member. For example, the one or more twentieth vibration generating apparatuses 25T may be configured to output a sound of about 150 Hz to about 20 kHz. For example, the one or more twentieth vibration generating apparatuses 25T may be referred to as the term such as a trunk panel speaker or a nineteenth speaker, or the like, but embodiments of the present disclosure are not limited thereto.

Additionally, the fifth sound generating apparatus 25-5 may further include one or more vibration generating apparatuses disposed between the main structure 20a and at least one or more of the door inner panel and the door outer panel.

With reference to FIGS. 34 to 38 in connection with FIG. 32, the apparatus 9 according to the ninth example embodiment of the present disclosure may further include an instrument panel apparatus 26 and an infotainment apparatus 27.

The instrument panel apparatus 26 according to an example embodiment of the present disclosure may be disposed in a first region of the dashboard 23A to face the driver seat DS. The instrument panel apparatus 26 may include a display (or a first display) 26A which is disposed in the first region of the dashboard 23A to face the driver seat DS.

The first display 26A may include any one of the apparatus 1 and 2 described above with reference to FIGS. 1 to 21D, and thus, the repetitive description thereof may be omitted for brevity. For example, the instrument panel apparatus 26 may output a sound, generated by a vibration of a vibration member (or a display panel) 100 based on a vibration of one or more vibration apparatuses 500 included in the first display 26A, toward the driver seat DS. For example, the vibration apparatus 500 disposed in the first display 26A of the instrument panel apparatus 26 may be configured to output a sound of about 150 Hz to about 20 kHz.

The infotainment apparatus 27 may be disposed in a third region of the dashboard 23A.

The infotainment apparatus 27 according to an example embodiment of the present disclosure may be fixed on the third region of the dashboard 23A in an upright state.

The infotainment apparatus 27 according to another example embodiment of the present disclosure may be installed to be raised and lowered at the third region of the dashboard 23A. For example, the infotainment apparatus 27 may be received or accommodated into the dashboard 23A based on the power turn-off of the apparatus 9 or the manipulation of a vehicle passenger and may protrude to a region on the dashboard 23A based on the power turn-on of the apparatus 9 or the manipulation of the vehicle passenger.

The infotainment apparatus 27 according to an example embodiment of the present disclosure may include a display (or a second display) 27A disposed at the third region of the dashboard 23A, and a display elevation device.

The second display 27A may include any one of the apparatus 1 to 4 described above with reference to FIGS. 1 to 21D, and thus, the repetitive description thereof may be omitted for brevity. For example, the infotainment apparatus 27 may output a sound, generated by a vibration of a vibration member (or a display panel) based on a vibration of one or more vibration apparatuses 500 included in the second display 27A toward the driver seat DS. For example, the one or more vibration apparatuses 500 disposed at the second display 27A of the infotainment apparatus 27 may be configured to output a sound of about 150 Hz to about 20 KHz.

The display elevation device may be disposed into the third region of the dashboard 23A and may support the second display 27A so as to be raised and lowered. For example, the display elevation device may raise the second display 27A based on the power turn-on of the apparatus 9 or the manipulation of the vehicle passenger, thereby allowing the second display 27A to protrude to a region on the dashboard 23A. In addition, the display elevation device may lower the second display 27A based on the power turn-off of the apparatus 9 or the manipulation of the vehicle passenger, thereby allowing the second display 27A to be received or accommodated into the dashboard 23A.

With reference to FIGS. 32 to 39, the apparatus 9 according to the ninth example embodiment of the present disclosure may output a sound S to one or more of the indoor space IS and the outdoor space OS through at least one or more among the first sound generating apparatus 25-1 disposed between the main structure 20a and the interior material 20c, the second sound generating apparatus 25-2 disposed at the interior material 20c exposed at the indoor space IS, the third sound generating apparatus 25-3 disposed at the glass window 20d, the fourth sound generating apparatus 25-4 disposed at the garnish member 23M, and the fifth sound generating apparatus 25-5 disposed at the exterior material 20*b*, and thus, may output the sound S by one or more of the exterior material 20*b* and the interior material 20*c* as a sound vibration plate, thereby outputting a multichannel surround stereo sound. In addition, the apparatus 9 according to the ninth example embodiment of the present disclosure may output a sound S by, as a sound vibration plate, a display panel of at least one or more among the displays 26A and 27A of at least one or more among the instrument panel apparatus 26 and the infotainment apparatus 27 and may output a more realistic multi-channel surround stereo sound through each of the first to fourth sound generating apparatuses 25-1 to 25-4, the instrument panel apparatus 26, and the infotainment apparatus 27.

Additionally, with reference to FIG. 34, an apparatus 9 according to the ninth example embodiment of the present disclosure may further include a sound bar 28 disposed on a rear package interior material 23J. The sound bar 28 may be configured to output a sound in conjunction with the infotainment apparatus 27. The sound bar 28 may include any one of the apparatuses 3 or 4 according to the third embodiment or fourth example embodiment of the present disclosure described above with reference to FIGS. 22 to 26, and thus, the repetitive description thereof may be omitted for brevity.

Figure 40:
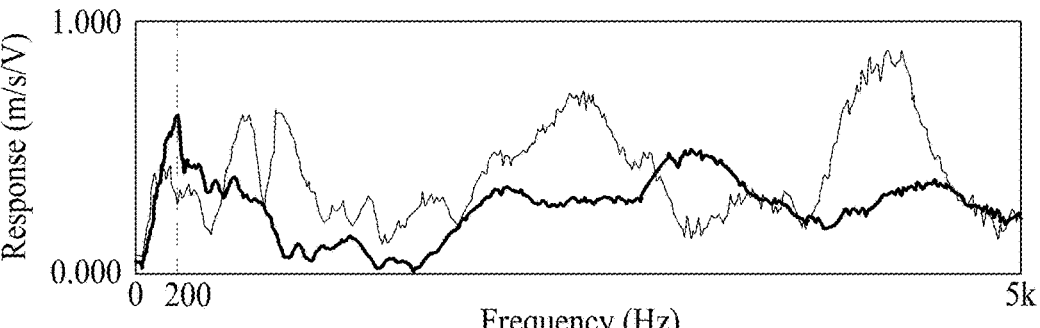
FIG. 40 illustrates a result obtained by comparing a peak response time of an apparatus according to an example embodiment of the present disclosure with a peak response time of an apparatus according to an experimental example.

FIG. 40 illustrates a result obtained by comparing a peak response time of an apparatus according to an example embodiment of the present disclosure with a peak response time of an apparatus according to an experimental example. In FIG. 40, the abscissa axis represents a frequency (Hz), and the ordinate axis represents a response time (m/s/V). A thick solid line of FIG. 40 represents a peak response time of an apparatus according to an example embodiment of the present disclosure where a vibration apparatus is provided at a curved portion of a supporting portion, and a solid line represents a peak response time of an apparatus according to an experimental example where a vibration apparatus is provided at a flat rear portion of a cover member.

As seen in FIG. 40, comparing with a solid line, it may be seen in the thick solid line that a peak response time is high in a band of 200 Hz. For example, comparing with a peak response time of the solid line, it may be seen that a peak response time of the thick solid line is high by 10 times in a band of 200 Hz.

Therefore, according to an example embodiment of the present disclosure, because a vibration apparatus is provided at a curved portion of a supporting portion, a response time in a low-pitched sound band may increase, thereby providing an apparatus including a vibration apparatus where a sound characteristic of the low-pitched sound band is enhanced.

Figure 41:
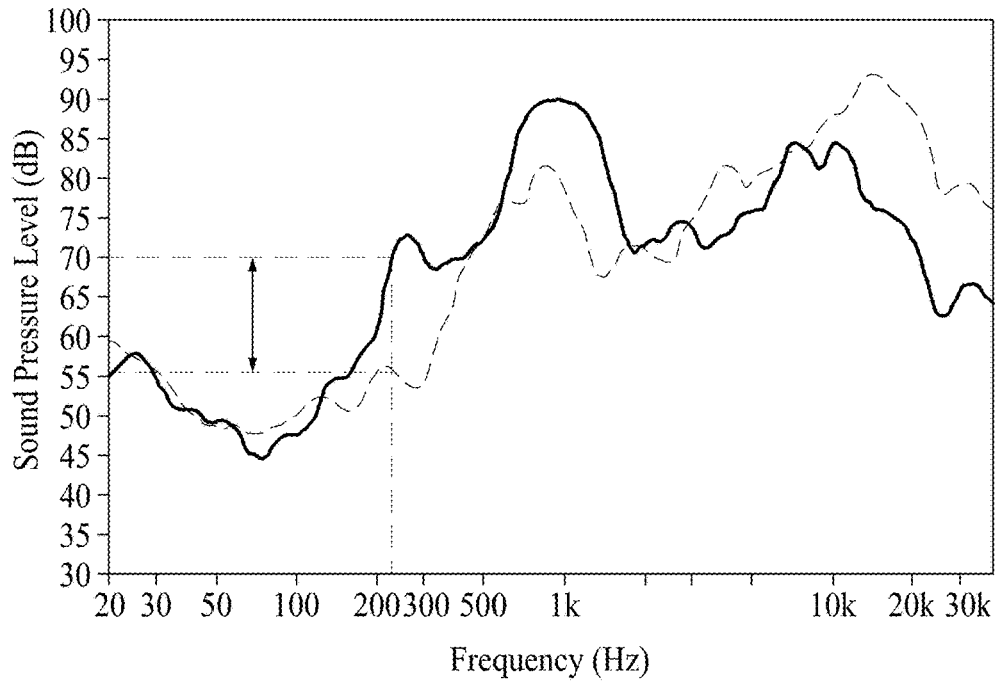
FIG. 41 illustrates a result obtained by comparing a sound output characteristic of an apparatus according to an example embodiment of the present disclosure with a sound output characteristic of an apparatus according to an experimental example.

FIG. 41 is a diagram showing a result obtained by comparing a sound output characteristic of an apparatus according to an example embodiment of the present disclosure with a sound output characteristic of an apparatus according to an experimental example. In FIG. 41, the abscissa axis represents a frequency (Hz), and the ordinate axis represents a sound pressure level (SPL) in decibels (dB). In FIG. 41, a thick solid line represents a sound pressure level characteristic of an example embodiment where a vibration apparatus is provided at a curved portion of a supporting portion, and a dotted line represents a sound pressure level characteristic of an experimental embodiment where a vibration apparatus is provided at a flat rear portion of a cover member.

As seen in FIG. 41, comparing with a dotted line, it may be seen in the thick solid line that a sound pressure level is high in a band of 200 Hz. For example, comparing with a sound pressure level of the dotted line, it may be seen that a sound pressure level of the thick solid line increases by 15 dB in about 200 Hz.

Accordingly, according to an example embodiment of the present disclosure, a vibration apparatus may be provided at a curved portion of a supporting portion, and thus, a sound pressure level in a low-pitched sound band may increase, thereby providing an apparatus including a vibration apparatus having an enhanced sound characteristic and/or sound pressure level characteristic of the low-pitched sound band.

Figure 42:
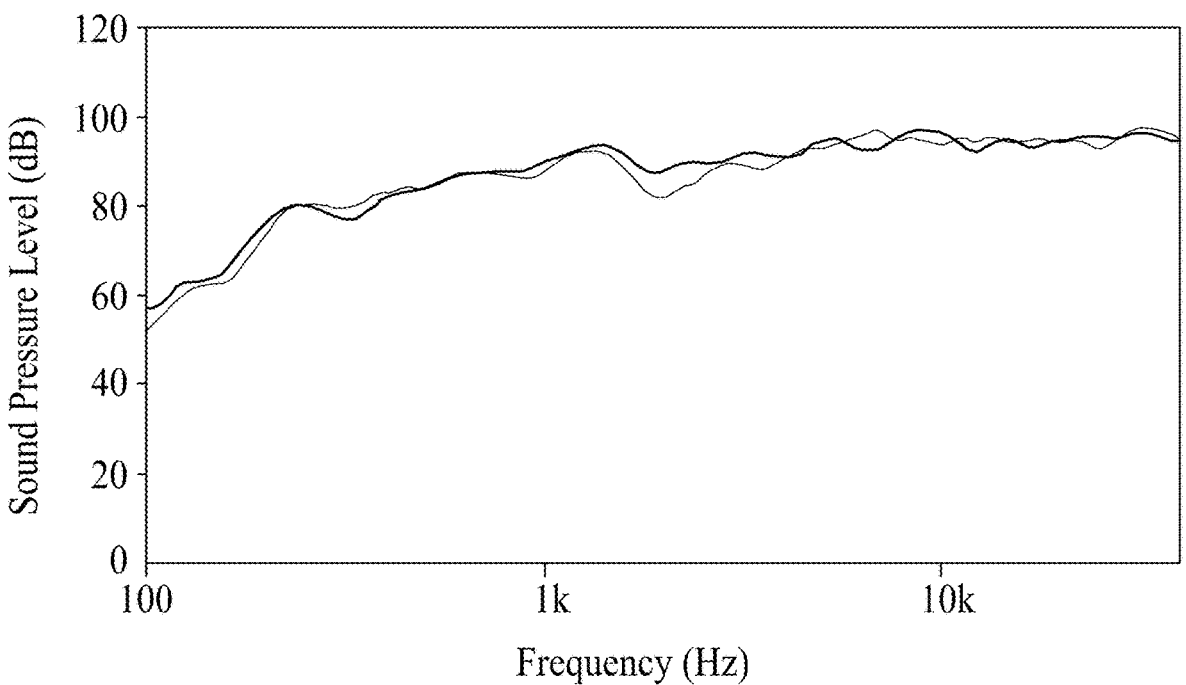
FIG. 42 illustrates a result obtained by comparing a sound output characteristic of an apparatus according to a first example embodiment of the present disclosure with a sound output characteristic of an apparatus according to an experimental example.

FIG. 42 is a diagram showing a result obtained by comparing a sound output characteristic of an apparatus according to a first example embodiment of the present disclosure with a sound output characteristic of an apparatus according to an experimental example. In FIG. 42, the abscissa axis represents a frequency (Hz), and the ordinate axis represents a sound pressure level (SPL) in decibels (dB). In FIG. 42, a thick solid line represents a sound pressure level characteristic of an apparatus according to an example embodiment of the present disclosure where a vibration apparatus is provided in a region upward apart from a lengthwise center line of a cover member, and a thin solid line represents a sound pressure level characteristic of an apparatus according to an experimental embodiment where a vibration apparatus is provided in a lengthwise center line of a cover member.

As seen in FIG. 42, comparing with a solid line, it may be seen in the thick solid line that a sound pressure level is high in about 250 Hz or less. For example, comparing with a sound pressure level of the solid line, it may be seen that a sound pressure level of the thick solid line increases by 2 dB in 100 Hz.

Accordingly, according to one or more example embodiments of the present disclosure, a vibration apparatus may be provided in a region upward apart from a lengthwise center line of a cover member, and thus, a sound pressure level in the low-pitched sound band may increase, thereby providing an apparatus including a vibration apparatus having an enhanced sound characteristic and/or sound pressure level characteristic of the low-pitched sound band.

An apparatus according to one or more example embodiments of the present disclosure are described below.

An apparatus according to one or more example embodiments of the present disclosure may comprise a vibration member, a supporting portion at a rear surface of the vibration member, the supporting portion including a curved portion, and a vibration apparatus at the curved portion to face the rear surface of the vibration member.

According to one or more example embodiments of the present disclosure, the vibration apparatus may comprise a film-type vibration apparatus, and the film-type vibration apparatus may be bent in a curved shape by a curved surface of the curved portion.

According to one or more example embodiments of the present disclosure, the supporting portion may comprise one or more of a metal material, a plastic material, and an elastic material.

According to one or more example embodiments of the present disclosure, the apparatus may further comprise a gap space provided between the rear surface of the vibration member and the vibration apparatus by the supporting portion.

According to one or more example embodiments of the present disclosure, the supporting portion may comprise a pair of supporting bars arranged in parallel at the rear surface of the vibration member and including the curved portion.

According to one or more example embodiments of the present disclosure, the vibration member may comprise one or more holes overlapping the vibration apparatus, and the one or more holes may be between the pair of supporting bars.

According to one or more example embodiments of the present disclosure, the supporting portion may comprise a pair of first supporting members arranged in parallel at the rear surface of the vibration member, the pair of first supporting members including the curved portion, and a pair of second supporting members between the pair of first supporting members.

According to one or more example embodiments of the present disclosure, the vibration member may comprise one or more holes overlapping the vibration apparatus, and the one or more holes may be surrounded by the pair of first supporting members and the pair of second supporting members.

According to one or more example embodiments of the present disclosure, a distance between a center portion of the vibration apparatus and the vibration member may differ from a distance between a periphery portion of the vibration apparatus and the vibration member.

According to one or more example embodiments of the present disclosure, the vibration apparatus may comprise a plate connected to the curved portion, and a vibration generator connected to the plate.

According to one or more example embodiments of the present disclosure, the vibration generator may comprise a vibration layer including a piezoelectric material, a first electrode layer at a first surface of the vibration layer, and a second electrode layer at a second surface different from the first surface of the vibration layer.

According to one or more example embodiments of the present disclosure, the vibration generator may comprise a vibration layer including a plurality of inorganic material portions and a plurality of organic material portions between the plurality of inorganic material portions, a first electrode layer at a first surface of the vibration layer, and a second electrode layer at a second surface different from the first surface of the vibration layer.

According to one or more example embodiments of the present disclosure, the plate may comprise one or more of metal, plastic, wood, rubber, paper, fiber, cloth, and leather.

According to one or more example embodiments of the present disclosure, the vibration apparatus may further comprise a mass member at a rear surface of the vibration generator.

According to one or more example embodiments of the present disclosure, the vibration member may comprise one or more of a display panel including a pixel configured to display an image, a screen panel on which an image is to be projected from a display apparatus, a light emitting diode lighting panel, an organic light emitting lighting panel, an inorganic light emitting lighting panel, and a signage panel, or may comprise one or more of metal, wood, rubber, plastic, glass, fiber, cloth, paper, mirror, and leather.

According to one or more example embodiments of the present disclosure, the vibration member may comprise a display member including a display panel having a pixel configured to display an image, and a cover member at a rear surface of the display member. The supporting portion may be connected to a rear surface of the cover member, and the display member may be configured to vibrate based on a vibration of the vibration apparatus and output a sound.

According to one or more example embodiments of the present disclosure, the display panel may be one of a liquid crystal display panel, a light emitting display panel, an electrophoresis display panel, a micro light emitting diode display panel, an electro-wetting display panel, and a quantum dot light emitting display panel.

According to one or more example embodiments of the present disclosure, the display member may further comprise a backlight between the display panel and the cover member, the vibration apparatus may be configured to vibrate the backlight, and the display panel may be configured to vibrate based on a vibration of the backlight and output a sound.

An apparatus according to one or more example embodiments of the present disclosure may comprise a base member, a supporting portion including a pair of supporting bars connected to the base member, and a vibration apparatus at the pair of supporting bars and including a curved shape.

According to one or more example embodiments of the present disclosure, the vibration apparatus may comprise a film-type vibration apparatus.

According to one or more example embodiments of the present disclosure, the supporting portion may comprise one or more of a metal material, a plastic material, and an elastic material.

According to one or more example embodiments of the present disclosure, the based member may comprise one or more holes overlapping the vibration apparatus.

According to one or more example embodiments of the present disclosure, the supporting portion further may comprise another pair of second supporting bars between the pair of supporting bars.

According to one or more example embodiments of the present disclosure, the vibration apparatus may comprise a plate connected to the supporting portion; and a vibration generator connected to the plate.

According to one or more example embodiments of the present disclosure, the vibration generator may comprise a vibration layer including a piezoelectric material, a first electrode layer at a first surface of the vibration layer, and a second electrode layer at a second surface different from the first surface of the vibration layer.

According to one or more example embodiments of the present disclosure, the vibration generator may comprise a vibration layer including a plurality of inorganic material portions and a plurality of organic material portions between the plurality of inorganic material portions, a first electrode layer at a first surface of the vibration layer, and a second electrode layer at a second surface different from the first surface of the vibration layer.

According to one or more example embodiments of the present disclosure, the plate may comprise one or more of metal, plastic, wood, rubber, paper, fiber, cloth, and leather.

An apparatus according to one or more example embodiments of the present disclosure may comprise a passive vibration member, and a vibration generating apparatus connected to the passive vibration member and configured to vibrate the passive vibration member. The vibration generating apparatus may comprise a vibration member, a supporting portion at a rear surface of the vibration member, the supporting portion including a curved portion, and a vibration apparatus at the curved portion to face the rear surface of the vibration member.

An apparatus according to one or more example embodiments of the present disclosure may comprise a passive vibration member, and a vibration generating apparatus connected to the passive vibration member and configured to vibrate the passive vibration member. The vibration generating apparatus may comprise a base member, a supporting portion including a pair of supporting bars connected to the base member, and a vibration apparatus at the pair of supporting bars and including a curved shape.

According to one or more example embodiments of the present disclosure, the passive vibration member may comprise a material comprising one or more of metal, plastic, wood, rubber, paper, fiber, cloth, leather, glass, and mirror.

According to one or more example embodiments of the present disclosure, the passive vibration member may comprise one or more of a display panel including a pixel configured to display an image, a screen panel on which an image is to be projected from a display apparatus, a light emitting diode lighting panel, an organic light emitting lighting panel, an inorganic light emitting lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror.

According to one or more example embodiments of the present disclosure, the passive vibration member may be a vehicle interior material. The vehicle interior material may comprise one or more of a dashboard, a pillar interior material, a roof interior material, a door interior material, a seat interior material, a handle interior material, a floor interior material, a rear package interior material, a rear view mirror, an overhead console, a glove box, and a sun visor. The vibration generating apparatus may be configured to vibrate at least one or more of the dashboard, the pillar interior material, the roof interior material, the door interior material, the seat interior material, the handle interior material, the floor interior material, the rear package interior material, the rear view mirror, the overhead console, the glove box, and the sun visor.

According to one or more example embodiments of the present disclosure, a display apparatus may comprise a display member including a display panel having a pixel configured to display an image, a supporting portion at a rear surface of the display member, the supporting portion including a curved portion, a vibration apparatus at the curved portion to face the rear surface of the display member, and a cover member at a rear surface of the display member. The supporting portion may be connected to a rear surface of the cover member. The display member may be configured to vibrate based on a vibration of the vibration apparatus and output a sound.

According to one or more example embodiments of the present disclosure, a vehicle may comprise a vehicle interior material and a vibration generating apparatus connected to the vehicle interior material and configured to vibrate the vehicle interior material. The vibration generating apparatus may comprise a base member, a supporting portion including a pair of supporting bars connected to the base member, and a vibration apparatus at the pair of supporting bars and including a curved shape.

A vibration apparatus or a vibration generating apparatus according to one or more example embodiments of the present disclosure may be applied to a vibration apparatus or a vibration generating apparatus disposed at an apparatus. The apparatus according to one or more example embodiments of the present disclosure may be applied to mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, and home appliances, or the like. In addition, the vibration apparatus or the vibration generating apparatus according to one or more example embodiments of the present disclosure may be applied to organic light-emitting lighting apparatuses or inorganic light-emitting lighting apparatuses. When the vibration apparatus or the vibration generating apparatus of an example embodiment of the present disclosure is applied to lighting apparatuses, the lighting apparatuses may act as lighting and a speaker. In addition, when the vibration apparatus or the vibration generating apparatus according to one or more example embodiments of the present disclosure is applied to a mobile device, or the like, the vibration apparatus or the vibration generating apparatus may be one or more of a speaker, a receiver, and a haptic device, but embodiments of the present disclosure are not limited thereto.

It will be apparent to those skilled in the art that various modifications and variations can be made in the present disclosure without departing from the technical idea or scope of the present disclosure. Thus, it is intended that the present disclosure covers the modifications and variations of this disclosure provided they come within the scope of the appended claims and their equivalents.

What is claimed is:

1. An apparatus, comprising:
a vibration member;
a supporting portion at a rear surface of the vibration member, the supporting portion including a curved portion; and
a vibration apparatus at the curved portion to face the rear surface of the vibration member,
wherein the supporting portion comprises:
a pair of first supporting members arranged in parallel at the rear surface of the vibration member, the pair of first supporting members including the curved portion; and
a pair of second supporting members between the pair of first supporting members,
wherein the vibration member comprises one or more holes overlapping the vibration apparatus, and
wherein the one or more holes are between the pair of first supporting members.

2. The apparatus of claim 1,
wherein the vibration apparatus comprises a film-type vibration apparatus, and
wherein the film-type vibration apparatus is bent in a curved shape by a curved surface of the curved portion.

3. The apparatus of claim 1, wherein the supporting portion comprises one or more of a metal material, a plastic material, and an elastic material.

4. The apparatus of claim 1, further comprising a gap space provided between the rear surface of the vibration member and the vibration apparatus by the supporting portion.

5. The apparatus of claim 1,
wherein the one or more holes are surrounded by the pair of first supporting members and the pair of second supporting members.

6. The apparatus of claim 1, wherein a distance between a center portion of the vibration apparatus and the vibration member differs from a distance between a periphery portion of the vibration apparatus and the vibration member.

7. The apparatus of claim 1, wherein the vibration apparatus comprises:

a plate connected to the curved portion; and a vibration generator connected to the plate.

8. The apparatus of claim 7, wherein the vibration generator comprises:

a vibration layer including a piezoelectric material;

a first electrode layer at a first surface of the vibration layer; and a second electrode layer at a second surface different from the first surface of the vibration layer.

9. The apparatus of claim 7, wherein the vibration generator comprises:

a vibration layer including a plurality of inorganic material portions and a plurality of organic material portions between the plurality of inorganic material portions;

a first electrode layer at a first surface of the vibration layer; and a second electrode layer at a second surface different from the first surface of the vibration layer.

10. The apparatus of claim 7, wherein the plate comprises one or more of metal, plastic, wood, rubber, paper, fiber, cloth, and leather.

11. The apparatus of claim 7, wherein the vibration apparatus further comprises a mass member at a rear surface of the vibration generator.

12. The apparatus of claim 1, wherein the vibration member comprises one or more of a display panel including a pixel configured to display an image, a screen panel on which an image is to be projected from a display apparatus, a light emitting diode lighting panel, an organic light emitting lighting panel, an inorganic light emitting lighting panel, and a signage panel, or comprises one or more of metal, wood, rubber, plastic, glass, fiber, cloth, paper, mirror, and leather.

13. The apparatus of claim 1, wherein the vibration member comprises:

a display member including a display panel having a pixel configured to display an image; and a cover member at a rear surface of the display member, wherein the supporting portion is connected to a rear surface of the cover member, and wherein the display member is configured to vibrate based on a vibration of the vibration apparatus and output a sound.

14. The apparatus of claim 13, wherein the display panel is one of a liquid crystal display panel, a light emitting display panel, an electrophoresis display panel, a micro light emitting diode display panel, an electro-wetting display panel, and a quantum dot light emitting display panel.

15. The apparatus of claim 13, wherein:

the display member further comprises a backlight between the display panel and the cover member;

the vibration apparatus is configured to vibrate the backlight; and the display panel is configured to vibrate based on a vibration of the backlight and output a sound.

16. An apparatus, comprising:

a base member;

a supporting portion including a pair of first supporting bars connected to the base member, and a vibration apparatus at the pair of first supporting bars and including a curved shape, wherein the supporting portion comprises:

the pair of first supporting bars arranged in parallel at a rear surface of the base member, the pair of first supporting bars including a curved portion; and a pair of second supporting bars between the pair of first supporting bars, wherein the base member comprises one or more holes overlapping the vibration apparatus, and wherein the one or more holes are between the pair of first supporting bars.

17. The apparatus of claim 16, wherein the vibration apparatus comprises a film-type vibration apparatus.

18. The apparatus of claim 16, wherein the supporting portion comprises one or more of a metal material, a plastic material, and an elastic material.

19. The apparatus of claim 16, wherein the vibration apparatus comprises:

a plate connected to the supporting portion; and a vibration generator connected to the plate.

20. The apparatus of claim 19, wherein the vibration generator comprises:

a vibration layer including a piezoelectric material;

a first electrode layer at a first surface of the vibration layer; and a second electrode layer at a second surface different from the first surface of the vibration layer.

21. The apparatus of claim 19, wherein the vibration generator comprises:

a vibration layer including a plurality of inorganic material portions and a plurality of organic material portions between the plurality of inorganic material portions;

a first electrode layer at a first surface of the vibration layer; and a second electrode layer at a second surface different from the first surface of the vibration layer.

22. The apparatus of claim 19, wherein the plate comprises one or more of metal, plastic, wood, rubber, paper, fiber, cloth, and leather.

23. An apparatus, comprising:

a passive vibration member; and a vibration generating apparatus connected to the passive vibration member and configured to vibrate the passive vibration member, wherein the vibration generating apparatus comprises the apparatus of claim 16.

24. The apparatus of claim 23, wherein the passive vibration member comprises a material comprising one or more of metal, plastic, wood, rubber, paper, fiber, cloth, leather, glass, and mirror.

25. The apparatus of claim 23, wherein the passive vibration member comprises one or more of a display panel including a pixel configured to display an image, a screen panel on which an image is to be projected from a display apparatus, a light emitting diode lighting panel, an organic light emitting lighting panel, an inorganic light emitting lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror.

26. The apparatus of claim 23, wherein:

the passive vibration member is a vehicle interior material;

the vehicle interior material comprises one or more of a dashboard, a pillar interior material, a roof interior material, a door interior material, a seat interior material, a handle interior material, a floor interior material, a rear package interior material, a rear view mirror, an overhead console, a glove box, and a sun visor; and the vibration generating apparatus is configured to vibrate at least one or more of the dashboard, the pillar interior material, the roof interior material, the door interior material, the seat interior material, the handle interior material, the floor interior material, the rear package interior material, the rear view mirror, the overhead console, the glove box, and the sun visor.

27. A vehicle, comprising:

a vehicle interior material; and a vibration generating apparatus connected to the vehicle interior material and configured to vibrate the vehicle interior material, wherein the vibration generating apparatus comprises the apparatus of claim 16.

28. A display apparatus, comprising:

a display member including a display panel having a pixel configured to display an image;

a supporting portion at a rear surface of the display member, the supporting portion including a curved portion;

a vibration apparatus at the curved portion to face the rear surface of the display member, and a cover member at a rear surface of the display member, wherein the supporting portion is connected to a rear surface of the cover member, wherein the display member is configured to vibrate based on a vibration of the vibration apparatus and output a sound, wherein the supporting portion comprises:

a pair of first supporting members arranged in parallel at the rear surface of the cover member, the pair of first supporting members including the curved portion; and a pair of second supporting members between the pair of first supporting members, wherein the cover member comprises one or more holes overlapping the vibration apparatus, and wherein the one or more holes are between the pair of first supporting members.

* * * * *